(12) United States Patent
Matsumoto et al.

(10) Patent No.: US 6,847,371 B2
(45) Date of Patent: Jan. 25, 2005

(54) TEXTURE INFORMATION ASSIGNMENT METHOD, OBJECT EXTRACTION METHOD, THREE-DIMENSIONAL MODEL GENERATING METHOD, AND APPARATUS THEREOF

(75) Inventors: Yukinori Matsumoto, Tsukuba (JP); Hajime Terasaki, Tsukuba (JP); Kazuhide Sugimoto, Tsukuba (JP); Tsutomu Arakawa, Ryugasaki (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 396 days.

(21) Appl. No.: 09/754,282

(22) Filed: Jan. 5, 2001

(65) Prior Publication Data

US 2001/0005204 A1 Jun. 28, 2001

Related U.S. Application Data

(62) Division of application No. 09/254,127, filed as application No. PCT/JP97/02997 on Aug. 28, 1997.

(30) Foreign Application Priority Data

| Aug. 29, 1996 | (JP) | 8-248739 |
| Aug. 30, 1996 | (JP) | 8-248946 |
| Aug. 30, 1996 | (JP) | 8-248958 |
| Jul. 23, 1997 | (JP) | 9-214104 |
| Aug. 12, 1997 | (JP) | 9-217486 |
| Aug. 12, 1997 | (JP) | 9-217550 |

(51) Int. Cl.[7] .............................................. G09G 5/00
(52) U.S. Cl. ...................................................... 345/582
(58) Field of Search ................................ 345/419–425, 345/427, 430, 435, 437, 442, 582–588, 781; 382/108, 268, 271, 272, 275, 285

(56) References Cited

U.S. PATENT DOCUMENTS

| 4,982,438 A | | 1/1991 | Usami et al. .................. 382/25 |
| 5,594,846 A | * | 1/1997 | Donovan ..................... 395/130 |
| 5,747,822 A | * | 5/1998 | Sinclair et al. ......... 250/559.19 |
| 6,356,272 B1 | | 3/2002 | Matsumoto et al. ........ 345/419 |
| 2001/0005204 A1 | | 6/2001 | Matsumoto et al. ........ 345/418 |
| 2002/0048399 A1 | | 4/2002 | Lee et al. ................... 382/165 |

FOREIGN PATENT DOCUMENTS

| EP | 0 735 512 A2 | 10/1996 |
| JP | 61-138377 | 6/1986 |
| JP | 5-135155 | 6/1993 |
| JP | 6-258048 | 9/1994 |
| JP | 6-309023 | 11/1994 |

(List continued on next page.)

OTHER PUBLICATIONS

"Shape Measurement and Description of Curved Objects" by Yukio Sato and Hiroichi Fujita, Denshi Tsushin Gakkai, '79/1 vol. J62–D No. 1.

(List continued on next page.)

Primary Examiner—Matthew C. Bella
Assistant Examiner—G. F. Cunningham
(74) Attorney, Agent, or Firm—Armstrong, Kratz, Quintos, Hanson & Brooks, LLP.

(57) ABSTRACT

A method and apparatus for representing a three-dimensional shape model by polygons according to a plurality of object images information obtained by rotating a real object arbitrary angles to assign texture information on each polygon. The texture information is assigned according to the amount of texture information for a particular polygon. Various criteria are disclosed as factors in determining the amount of texture information.

30 Claims, 43 Drawing Sheets

FOREIGN PATENT DOCUMENTS

| | | | |
|---|---|---|---|
| JP | 6-311405 | 11/1994 | |
| JP | 6-337998 | 12/1994 | |
| JP | 7-287756 | 10/1995 | |
| JP | 7-109626 | 11/1995 | |
| JP | 7-320035 | 12/1995 | |
| JP | 7-336694 | 12/1995 | |
| JP | 8-14858 | 1/1996 | |
| JP | 8014858 A2 * | 1/1996 | G01B/11/24 |
| JP | 8-147494 | 6/1996 | |
| JP | 8-331607 | 12/1996 | |
| JP | 9-231369 | 9/1997 | |
| WO | WP 98/09253 | 3/1998 | |

OTHER PUBLICATIONS

"Recovering 3D Models from Silhouette Sequence and Detecting Unexposed Regions" by Jiang Yu Zheng and Fumio Kishino, Denshi Joho Tsushin Gakkai, '93/6 vol. J76–D–11 No. 6.

"Fundamental Study of Input Method of 3D digital Image" by Yoshiaki Usami and Misato Nio, Computer Vision 37–2, Jul. 18, 1985.

"Recent Tendency in Image Processing Algorithm" by Naokazu Yokoya, pp. 227–233, Shin Gijutsu Communications, O Plus E, Nov., 1986, edited by Takagi et al.

"3.4 Range Information From Geometry" pp. 88–93, Computer Vision edited by Dana H. Ballard and Christopher M. Brown.

"An Iterative Procedure for the Polygonal Approximation of Plane Curves" by Urs Ramer, pp. 244–256, Computer Graphics and Image Processing (1972) I.

"Estimation of Shape and Color from Bi–directional Voting Using a Sequence of Color Frames" by Hisayoshi Zaima and Tsuyoshi Yamamoti, Joho Shori Gakkai (1996).

"Photorealistic Scene Reconstruction by Voxel Coloring" by Steven M. Seitz and Charles R. Dyer, pp. 1067–1073, 1997 IEEE.

Office Action dated Jan. 13, 2004.

Notice of Ground of Rejection Office Action and the reference (JP 6–309023) cited in the corresponding application filed in Japan dated Apr. 27, 2004.

Office Action dated Apr. 5, 2004 and the references cited in a Divisional application U.S. Ser. No. 09/994,829 of the parent case.

(2) Office Actions both dated Aug. 3, 2004 entitled Notice of Ground of Rejection on Nos. 217550/1997 and 234829/1997.

Jiang Yu Zheng et al., Recovering 3D Models from Silhouette Sequence and Detecting Unexposed Regions, Denshi joho Tsushin Gakkai, Jun. 25, 1993, vol. J76–D–2, No. 6, pp. 1114–1122.

Takahiro Muraki et al., Study on virtual viewpoint image generation using multi viewpoing image selection method, 1996 Proceedings of the Institute of Electronics, Information and Communication Engineers of Japan, Information System 2, Aggregate Corporation Institute of Electronics, Information and Communication Engineers of Japan, Mar. 28, 1996, p.228.

Notice of Ground of Rejection dated Jun. 22, 2004 with translation.

* cited by examiner

IMAGE SHOOTING

SILHOUETTE IMAGE PRODUCTION

VOTING PROCESS

POLYGON PRODUCTION

TEXTURE MAPPING

FIG. 16
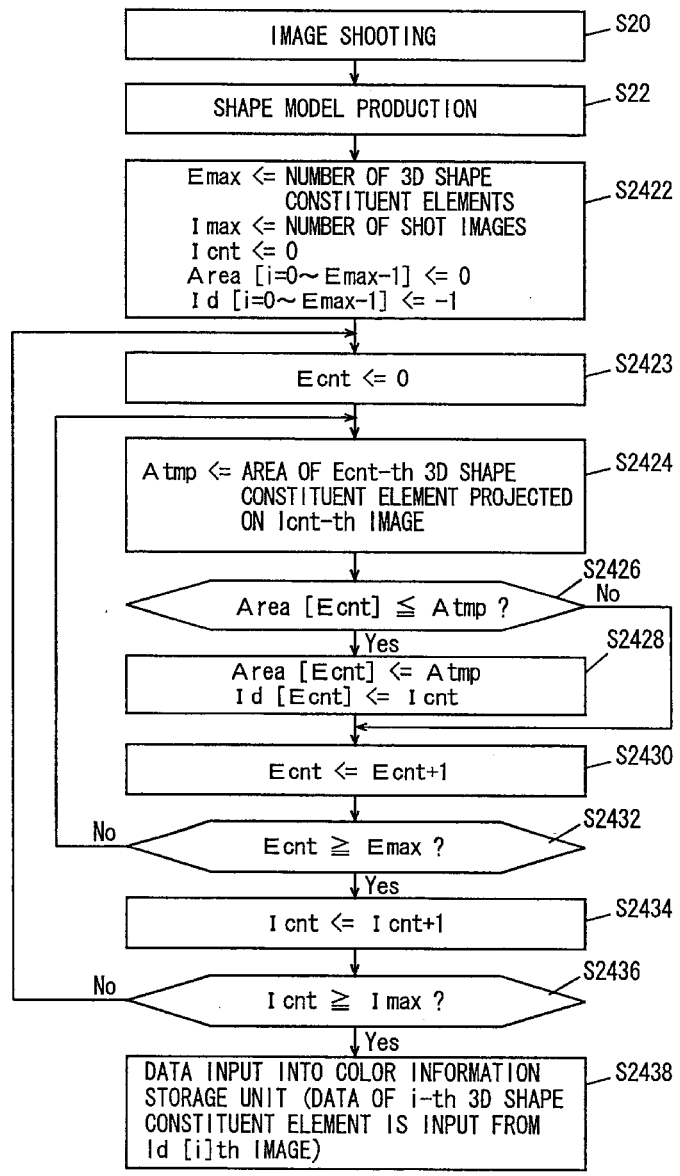
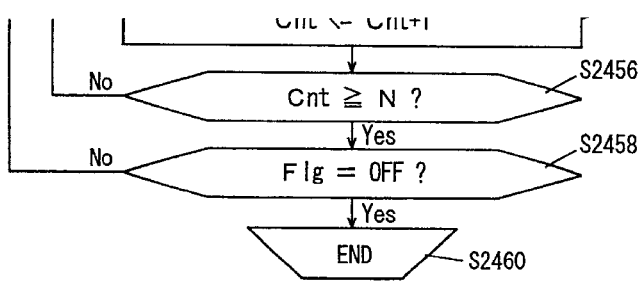

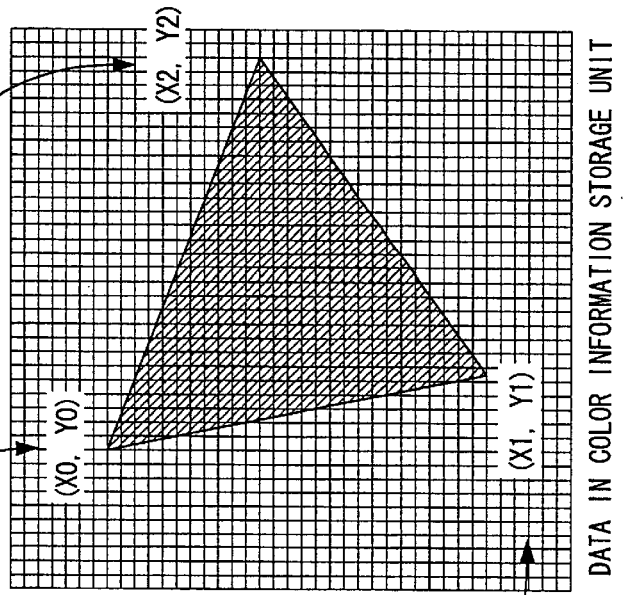
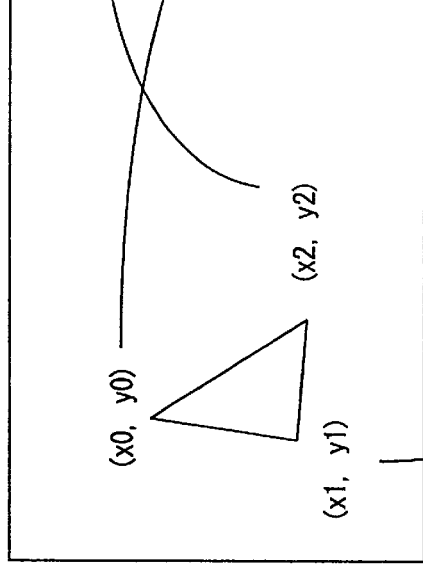
FIG. 18 POLYGON PROJECTED ON IMAGE

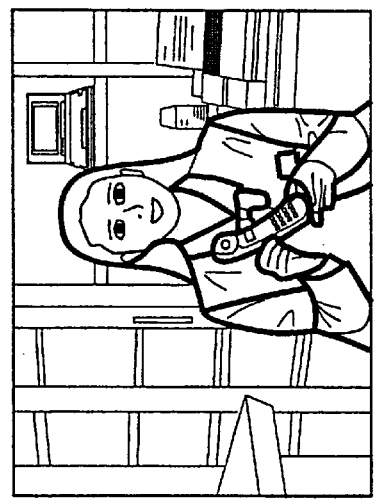
FIG. 27C CUT OUT IMAGE
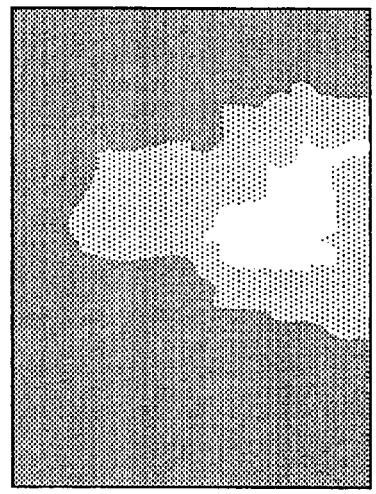
FIG. 27B DEPTH INFORMATION IMAGE
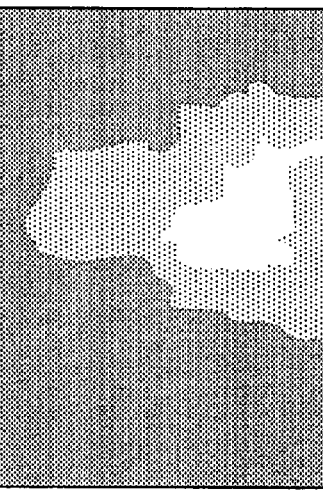
FIG. 27A REGION SEGMENTATION IMAGE F I G. 2 8
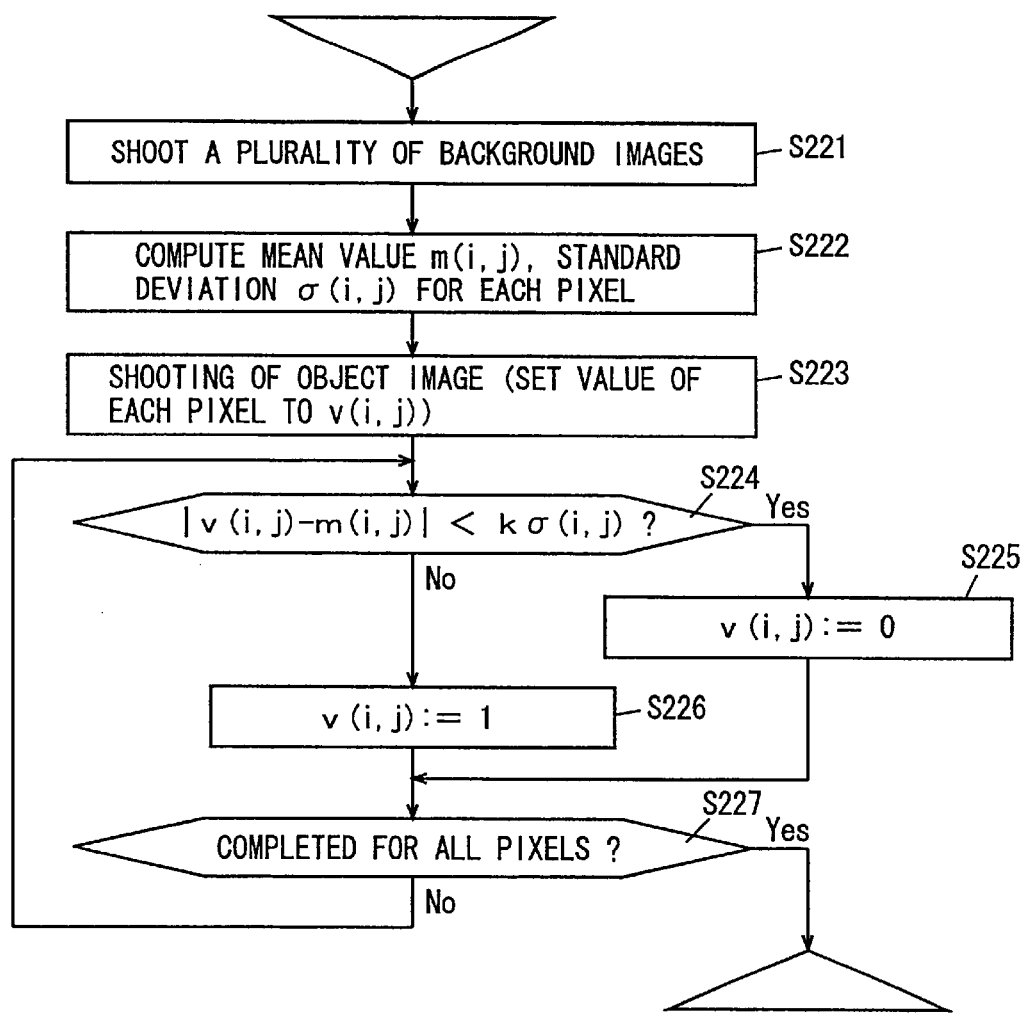

F I G. 4 2
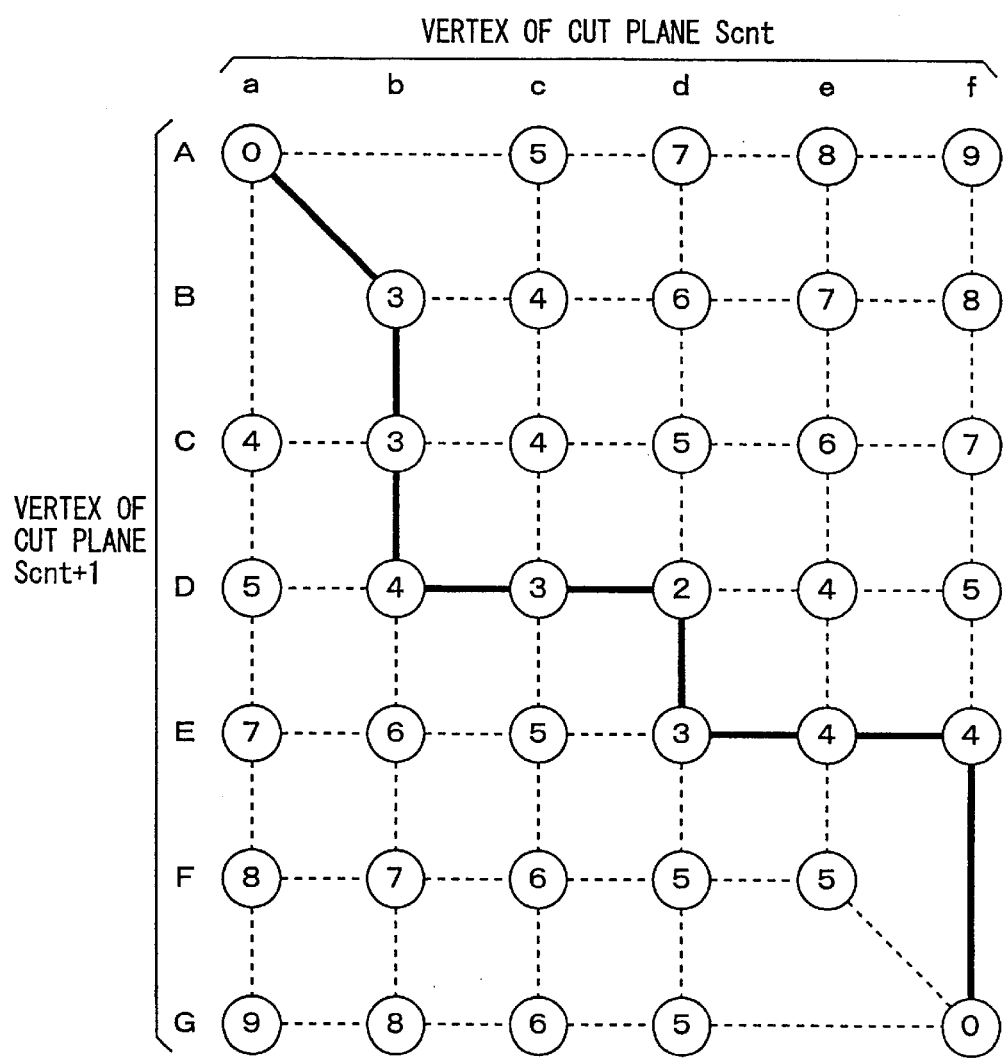

TEXTURE INFORMATION ASSIGNMENT METHOD, OBJECT EXTRACTION METHOD, THREE-DIMENSIONAL MODEL GENERATING METHOD, AND APPARATUS THEREOF

This application is a divisional of prior application Ser. No. 09/254,127 filed Nov. 1, 1999; which is a national stage application under §371 of international application PCT/JP97/02997 filed Aug. 28, 1997.

TECHNICAL FIELD

The present invention relates to a texture information assignment method of assigning texture information to a shape model of a real object of interest according to an object image obtained by shooting that real object of interest, an object extraction method of extracting an object portion by removing an undesired portion such as the background from the object image, a three-dimensional model generation method of generating a three-dimensional model of an object of interest, and apparatus of these methods.

BACKGROUND ART

In accordance with the development of computer graphics and the like, there has been intensive efforts to provide a system for practical usage in three-dimensional graphics. However, one appreciable problem in accordance with the spread of such a system of practical usage is the method of obtaining shape data. More specifically, the task of entering the complicated three-dimensional shape of an object having a free-form surface or that resides in the natural world into a computer is extremely tedious and difficult.

Furthermore, in reconstructing an object with a computer and the like, it is difficult to express the texture of the surface of the object in a more realistic manner by just simply reconstructing the shape of the object.

Three-dimensional image information can be handled more easily if the shape information and color/texture information can be reconstructed within the computer based on image information that is obtained by shooting an actual object.

In three-dimensional image communication such as by, for example, the Internet, the opportunity of a general user to create a three-dimensional image who is the transmitter of information will increase. Therefore, the need arises for a simple and compact apparatus that produces a three-dimensional image.

(1) Japanese Patent Laying-Open No. 5-135155 discloses a three-dimensional model generation apparatus that can construct a three-dimensional model from a series of silhouette images of an object of interest placed on a turntable under the condition of normal illumination.

According to this three-dimensional model construction apparatus, an object of interest that is rotated on a turntable is continuously shot by a camera. The silhouette image of the object of interest is extracted from the obtained image by an image processing computer. By measuring the horizontal distance from the contour of the silhouette image to the vertical axis of rotation for the silhouette image, a three-dimensional model is generated according to this horizontal distance and the angle of rotation. More specifically, the contour of the object of interest is extracted from the continuously shot silhouette images to be displayed as a three-dimensional model.

FIG. 1 is a diagram representing the concept of assigning texture information to the three-dimensional model generated as described above according to the image information continuously picked up by a camera.

Japanese Patent Laying-Open No. 5-135155 discloses the case of obtaining image information by continuously rotating an object of interest and shooting the same, i.e., obtaining image information in the resolution level of shape recognition with respect to a three-dimensional model of a human figure. More specifically, an image is picked up for every 1° of rotation to obtain 360 images with respect to the object of interest.

For the sake of simplifying the description, the case of shooting an image for every larger stepped angle will be described hereinafter. However, the essence is identical.

Consider the case of picking up a total of n images by rotating an object of interest for every predetermined angle of rotation, as shown in FIG. 1. In this case, each image information corresponds to the label number of 1, 2, 3 ..., n.

The object of interest is represented as a shape model (wire frame model) 300 using a polygon (triangular patch). When texture information is to be assigned to shape model 300, color information (texture information) of the image information of a corresponding label number is assigned for each triangular patch according to the direction of the camera shooting the object of interest.

More specifically, based upon the vector towards the target triangular patch from the axis of rotation of shape model 300, the texture information with respect to the triangular patch is captured from the image that has the direction of the shooting direction vector and this vector most closely matched. Alternatively, from the standpoint of intuition, a plurality of lines such as the circles of longitude of a terrestrial globe can be assumed with respect to the surface of the model. Texture information can be captured from the first image information for the triangular patch in the range of 0° to 1×360/n°, from the second image information for the triangular patch in the range of 1×360/n° to 2×360/n°, and so on. This method of capturing texture information will be referred to as the central projection system hereinafter.

The central projection system is advantageous in that image information can be provided in a one-to-one correspondence with respect to each triangular patch or the constituent element forming the shape model (referred to as "three-dimensional shape constituent element" hereinafter), and that this correspondence can be determined easily.

However, the central projection system is disadvantageous in that the joint of the texture is noticeable when the gloss or the texture of the color information is slightly different due to the illumination and the like since the texture information is assigned from different image information (image information of a different label number) to a three-dimensional shape constituent element that is not present within the same range of rotation angle when viewed from the axis of rotation.

Furthermore, a corresponding three-dimensional shape constituent element may be occluded in the image information obtained from a certain direction of pickup depending upon the shape of the object of interest. There is a case where no texture information corresponding to a certain three-dimensional shape constituent element is included in the corresponding image information.

FIG. 2 is a diagram for describing such a situation. In FIG. 2, the relationship is shown of the axis of rotation, the cross section of the object of interest and the object image projected in the camera at a vertical plane including the axis of rotation of the object of interest. When the object of interest takes a shape that has an occluded region that cannot be viewed from the camera as shown in FIG. 2, the image information picked up from this angle direction is absent of the texture information corresponding to this occluded region. However, texture information of this occluded region can be captured from another pickup direction that has a certain angle with respect to the previous direction of pickup.

(2) As a conventional method, extraction of an object portion from an image of an object can be effected manually using an auxiliary tool. More specifically, the image of an object obtained by shooting the target object together with the background is divided into a plurality of regions. The operator selects the background area in the image of the object to erase the background area using a mouse or the like. However, this method is disadvantageous in that the burden on the operator for the manual task is too heavy.

Another conventional method of object extraction employs the chroma-key technique. More specifically, the portion of the object is extracted from the image of the object using a backboard of the same color. However, this method is disadvantageous in that a special environment of a backboard of the same color has to be prepared.

A further conventional method of object extraction employs the simple difference method. More specifically, difference processing is effected between an object image and a background image in which only the background of the object of interest is shot to obtain the difference. The area having an absolute value of the difference greater than the threshold value is extracted as the portion of the object. However, there is a problem that, when the object of interest includes an area of a color identical to the color of the background, that portion cannot be extracted as a portion of the object. In other words, this method is advantageous in that the extraction accuracy of the object portion is poor.

Another conventional method of object extraction takes advantage of the depth information by the stereo method. More specifically, the area with the depth information that is smaller than a threshold value is extracted as the portion of an object of interest from an image of the object obtained by shooting the object together with the background. However, the difference in depth is so great in the proximity of the boundary between the object of interest and the background that proper depth information cannot be obtained reliably. There is a problem that a portion of the background is erroneously extracted as a portion of the object.

All of the above-described conventional methods require the determination of a threshold value in advance. It is extremely difficult to determine an appropriate threshold value on account of the conversion property of the A/D converter for converting the image and the property of the illumination. There is also the problem that the threshold value must be reselected when the conversion characteristic of the A/D converter or the property of the illumination is changed.

(3) A three-dimensional digitizer is known as a conventional apparatus of reading out the shape of an object of interest. The three-dimensional digitizer includes an arm with a plurality of articulations and a pen. The operator provides control so as to bring the pen in contact with the object of interest. The pen is moved along on the object of interest. The angle of the articulation of the arm varies as the pen is moved. A three-dimensional shape of the object of interest is obtained according to the angle information of the articulation of the arm. However, such a digitizer is disadvantageous in that the time and the labor of the task of measurement by manual means are too great and heavy.

The laser scanner is known as another conventional apparatus. The laser scanner directs a laser beam on an object of interest to scan the object. As a result, a three-dimensional shape of the object of interest is obtained. There is a problem that a three-dimensional model of an object of interest formed of a substance that absorbs light cannot be obtained with such a laser scanner. There is also the problem that the apparatus is extremely complex and costly. Furthermore, there is a problem that the environment for pickup is limited since measurement of the object of interest must be carried out in a dark room. There is also the problem that color information cannot be easily input.

U.S. Pat. No. 4,982,438 discloses a three-dimensional model generation apparatus. This apparatus computes a hypothetical existing region using the silhouette image of an object of interest. This hypothetical existing region is a conical region with the projection center of the camera as the vertex and the silhouette of an object of interest as the cross section. This conical region (hypothetical existing region) is described with a voxel model. This process is carried out for a plurality of silhouette images. Then, a common hypothetical existing region is obtained to generate a three-dimensional model of the object of interest. Here, the common hypothetical existing region is the ANDed area of a plurality of hypothetical existing regions with respect to the plurality of silhouette images. However, there is a problem that a three-dimensional model of high accuracy cannot be generated when there is one inaccurate silhouette image since the three-dimensional shape is obtained by the AND operation. There is also a problem that color information is insufficient or a local concave area cannot be recognized since the object of interest is shot only from a horizontal direction (direction perpendicular to the axis of rotation).

In the above three-dimensional model generation apparatus of Japanese Patent Laying-Open No. 5-135155, an object of interest that is rotating on a turntable is shot by a camera to obtain a plurality of silhouette images. A plurality of shapes of the object of interest at a plurality of horizontal planes (a plane perpendicular to the axis of rotation) are obtained on the basis of these plurality of silhouette images. The points on the contour line of the shape of the object of interest in adjacent horizontal planes are connected as a triangular patch. The point on the contour line of the shape of the object of interest in one horizontal plane is determined for every predetermined angle. A three-dimensional model of an object of interest is generated in this way. However, there is a problem in this apparatus that a special environment for shooting is required since a backboard to generate a silhouette image is used. Furthermore, the amount of data is great since the three-dimensional model is generated using the shape of the object of interest in a plurality of horizontal planes. There was a problem that the process is time consuming.

In view of the foregoing, an object of the present invention is to provide a method and apparatus of texture information assignment that allows assignment of texture information to each three-dimensional shape constituent element forming a shape model regardless of the shape of the object of interest in the event of reconstructing a three-dimensional model within a computer and the like according to image information obtained by shooting a real object.

Another object of the present invention is to provide a method and apparatus of texture information assignment that allows assignment of texture information approximating the texture of a real object from image information obtained by shooting a real object in the assignment of texture information to a shape model according to picked up image information.

A further object of the present invention is to provide a method and apparatus of texture information assignment with less noticeable discontinuity (seam) in texture assigned to each three-dimensional shape constituent element constructing a shape model in assigning texture information to the shape model according to image information obtained by shooting a real object.

Still another object of the present invention is to provide a method and apparatus of object extraction that allows a portion, if present, of an object of image having a color identical to that of the background extracted.

A still further object of the present invention is to provide a method and apparatus of object extraction that can extract always stably and properly a portion of an object even when various characteristics change.

Yet a further object of the present invention is to provide a method and apparatus of object extraction that can have manual task reduced, and dispensable of a special shooting environment.

Yet another object of the present invention is to provide a method and apparatus of three-dimensional model generation that can have manual task reduced.

Yet a still further object of the present invention is to provide a method and apparatus of three-dimensional model generation of a simple structure with few limitation in the shooting environment and substance of the object of interest.

An additional object of the present invention is to provide a method and apparatus of three-dimensional model generation that can generate a three-dimensional model in high accuracy even if there are several inaccurate ones in a plurality of silhouette images.

Still a further object of the present invention is to provide a method and apparatus of three-dimensional model generation in which sufficient color information can be obtained and that allows recognition of a local concave portion in an object of interest.

Yet a still further object of the present invention is to provide a method and apparatus of three-dimensional model generation that can generate a three-dimensional model at high speed with fewer data to be processed, dispensable of a special shooting environment.

DISCLOSURE OF THE INVENTION

According to an aspect of the present invention, a texture information assignment apparatus for a shape model includes: means for describing the shape of an object of interest as a shape model by a set of a plurality of three-dimensional shape constituent elements; and means for assigning texture information with respect to a shape model according to the amount of texture information for a three-dimensional shape constituent element of each object image information per three-dimensional shape constituent element on the basis of a plurality of object images information captured by shooting an object of interest from different view points.

Preferably, the texture information amount is represented by the matching degree between the direction of the surface normal of each three-dimensional shape constituent element and the shooting direction of each object image information per three-dimensional shape constituent element.

Preferably, the texture information amount is represented by the area of the three-dimensional shape constituent element that is projected on each object image information per three-dimensional shape constituent element.

According to another aspect of the present invention, a texture information assignment apparatus for a shape model includes: means for describing the shape of an object of interest as a shape model by a set of a plurality of three-dimensional shape constituent elements; and means for assigning per three-dimensional shape constituent element the texture information for a shape model according to both the texture information amount for the three-dimensional shape constituent element of each object image information and the texture continuity between three-dimensional shape constituent elements on the basis of a plurality of object images information captured by shooting the object of interest from different viewpoints.

Preferably, the texture information assignment means assigns the texture information for a shape model from the object image information provided in correspondence with each three-dimensional shape constituent element so as to set minimum an evaluation function that decreases in accordance with increase of the texture information amount and that decreases in accordance with improvement in texture continuity between three-dimensional shape constituent elements.

In the above evaluation function, the texture continuity is represented as a function of difference in the shooting position and the shooting direction of respective corresponding object image information between a three-dimensional shape constituent element of interest and an adjacent three-dimensional shape constituent element.

Preferably in the above evaluation function, the texture continuity is represented as a function that increases in accordance with a greater difference between the label number assigned to a three-dimensional shape constituent element of interest and the label number assigned to a three-dimensional shape constituent element that is adjacent to the three-dimensional shape constituent element of interest when object image information is picked up according to change in position and a label number is applied to each object image information corresponding to the change in position.

Preferably in the above evaluation function, the texture continuity is represented as a function that increases in accordance with a greater difference between the label number assigned to a three-dimensional shape constituent element of interest and the label number assigned to a three-dimensional shape constituent element adjacent to the three-dimensional shape constituent element of interest when object image information is picked up according to a regular change in position and a label number is applied to each object image information corresponding to the change in position.

Preferably in the above evaluation function, the texture information amount is represented as a function of an area of a three-dimensional shape constituent element projected on each object image information per three-dimensional shape constituent element.

Preferably in the above evaluation function, the texture information amount is represented as a function of a level of match between the direction of the surface normal of each three-dimensional shape constituent element and the shooting direction of each three-dimensional shape constituent element per three-dimensional shape constituent element.

Preferably, the above evaluation function is represented as a linear combination of the total sum of the difference between the label number assigned to the i-th (i: natural number) three-dimensional shape constituent element and the label number assigned to the three-dimensional shape constituent element adjacent to the i-th three-dimensional shape constituent element for all three-dimensional shape constituent elements, and the total sum of the area of the i-th three-dimensional shape constituent element projected on the object image information corresponding to the label number assigned to the i-th three-dimensional shape constituent element for all three-dimensional shape constituent elements.

According to a further aspect of the present invention, a texture information assignment apparatus for a shape model includes: means for describing the shape of an object of interest as a shape model by a set of a plurality of three-dimensional shape constituent elements; means for providing correspondence between a label number and every three-dimensional shape constituent element so as to set minimum an evaluation function that decreases in accordance with increase of a texture information amount for each three-dimensional shape constituent element and that decreases in accordance with improvement of texture continuity in the texture information assigned to each three-dimensional shape constituent element and an adjacent three-dimensional shape constituent element when a plurality of object images information are picked up in accordance with change in position and a label number is applied to each object image information corresponding to change in position; and means for assigning texture information to a three-dimensional shape constituent element by carrying out a weighted mean process according to the area of a three-dimensional shape constituent element projected on each object image information on the basis of object image information corresponding to the related label number and the object image information corresponding to a predetermined number of label numbers including that related label number.

Preferably, the means for assigning texture information to the three-dimensional shape constituent element obtains the area projected on the object image information corresponding to the label number related to the three-dimensional shape constituent element and the object image information corresponding to the predetermined number of label numbers including the related label number for the three-dimensional shape constituent element, and uses this as the weighting factor in carrying out a weighted mean process. For the texture information of the three-dimensional shape constituent element, the portion of the three-dimensional shape constituent element projected on the object image information is obtained. The image information (color, density or luminance) of this projected portion is subjected to a weighted mean process to result in the texture information.

According to still another aspect of the present invention, a texture information assignment apparatus for a shape model includes: means for describing the shape of an object of interest as a shape model by a set of a plurality of three-dimensional shape constituent elements; means for providing correspondence between a label number and every three-dimensional shape constituent element so as to set minimum an evaluation function that decreases in accordance with increase of texture information amount for each three-dimensional shape constituent element and that decreases in accordance with improvement in texture continuity of texture information respectively assigned to each three-dimensional shape constituent element and an adjacent three-dimensional shape constituent element when a plurality of object image information are picked up according to regular change in position and a label number is applied to each object image information corresponding to change in position; and means for assigning texture information to a three-dimensional shape constituent element by carrying out a weighted means process according to an area of a three-dimensional shape constituent element projected on each object image information on the basis of the object image information corresponding to a related label number and the object image information corresponding to a predetermined number of label numbers including that related label number.

Preferably, the means for assigning texture information to a three-dimensional shape constituent element obtains the area projected on the object image information corresponding to the label number related to a three-dimensional shape constituent element and the object image information corresponding to the predetermined number of label numbers including the related label number for the three-dimensional shape constituent element, and uses this as the weighting factor for a weighted mean process. For the texture information of a three-dimensional shape constituent element, the portion where the three-dimensional shape constituent element is projected on the object image information is obtained. The image information (color, density or luminance) of this projected portion is subjected to a weighted mean process to result in the texture information.

According to a still further aspect of the present invention, a texture information assignment apparatus for a shape model includes: means for capturing a plurality of object images information by shooting an object of interest from different viewpoints; means for describing the shape of the object of interest as a shape model by a set of a plurality of three-dimensional shape constituent elements; and means for assigning texture information obtained by carrying out a weighted mean process for all the object image information according to the area corresponding to the three-dimensional shape constituent element projected on the plurality of object images information for every three-dimensional shape constituent element.

Preferably, the means for assigning texture information to the three-dimensional shape constituent element obtains the area projected on the object image information for each three-dimensional shape constituent element, and uses the obtained area as the weighting factor in carrying out the weighted mean process. For the texture information of the three-dimensional shape constituent element, the portion of the three-dimensional shape constituent element projected on the object image information is obtained. The image information (color, density or luminance) of this projected portion is subjected to a weighted means process to result in the texture information.

According to the texture information assignment apparatus, the most appropriate texture information of the actual object can be selectively assigned to the shape model, out from the plurality of image information obtained by shooting an object of interest when the shape model is reconstructed within a computer on the basis of image information obtained by shooting an actual object.

When texture information (color information) is to be assigned to the shape model represented as a set of a plurality of three-dimensional shape constituent elements, the texture information most approximating the texture information of the actual object can be selectively assigned to each three-dimensional shape constituent element while suppressing discontinuity in texture information between respective three-dimensional shape constituent elements.

Since the process of assigning texture information can be carried out by substitution with the labeling issue for each three-dimensional shape constituent element on the basis of the object image information obtained by shooting an actual object of interest, the process of applying the texture information to each three-dimensional shape constituent element can be carried out in a procedure suitable for computer processing and the like.

According to yet a further aspect of the present invention, an object extraction apparatus of extracting a portion of an object with an unwanted area removed from an object image obtained by shooting an object of interest includes: region segmentation means and extraction means. The region segmentation means divides the object image into a plurality of regions. The extraction means identifies and extracts an object portion in the object image by subjecting the information of each pixel in the object image to a process of consolidation for every region. Here, an unwanted portion is, for example, the background area.

Preferably in the extraction means, the process of consolidating the information of each pixel in the object image for every region is to average the information of each pixel in the object image for every region.

Preferably, the extraction means identifies and extracts the object portion in the object image by carrying out a thresholding process on the information of each pixel consolidated for every region.

Preferably, the information of each pixel in the object image is the difference information obtained by carrying out a difference process between a background image obtained by shooting only the background of the object of interest and an object image.

Preferably, the extraction means includes difference processing means, mean value output means, and threshold value processing means. The difference processing means carries out a difference process between the background image obtained by shooting only the background of the object of interest and the object image. The mean value output means obtains the mean value in each region for the absolute value of the difference obtained by the difference process. The threshold value processing means compares the mean value in a region with a predetermined value to extract the region where the mean value is equal to or greater than a predetermined value as the object portion.

Preferably, the extraction means comprises mean value output means, difference processing means, and threshold value processing means. The mean value output means computes the mean value of the pixel in each region of the object image. The difference processing means carries out a difference process between the mean value of the pixels in each region of the object image and the mean value of the pixels in a corresponding region of the background image. The threshold processing means compares the absolute value of the difference obtained by the difference process with a predetermined value to extract the region where the absolute value of the difference is greater than the predetermined value as the object portion.

Preferably, the information of each pixel of the object image is the depth information.

According to yet another aspect of the present invention, the object extraction apparatus of extracting an object portion with an unwanted area removed from the object image obtained by shooting the object of interest includes: depth information computation means, region segmentation means, mean value computation means, and extract means. The depth information computation means computes the depth information of the object image. The region segmentation means divides the object image into a plurality of regions. The mean value computation means computes the mean value of the depth information for each region. The extract means extracts as an object portion a region out of the plurality of regions that has a mean value within a predetermined range, i.e. a region having a mean value smaller than a predetermined value, particularly when an object located forward than the object of interest is not included in the object image.

According to yet a still further aspect of the present invention, an object extraction apparatus of extracting a portion of an object with an unwanted portion removed from the object image on the basis of an object image obtained by shooting an object of interest and a plurality of background images obtained by shooting only the background of the object of interest a plurality of times includes difference means, extraction means, and threshold value determination means. The difference means computes the difference between the object image and the background image. The extraction means extracts a portion of the object image having a difference greater than the threshold value as the object portion. The threshold value determination means determines the threshold value in a statistical manner on the basis of distribution of the plurality of background images.

According to an additional aspect of the present invention, an object extraction apparatus of extracting a portion of an object with an unwanted portion removed from an object image on the basis of an object image obtained by shooting an object of interest and a plurality of background images obtained by shooting only the background of the object of interest a plurality of times includes computation means, difference means, and extraction means. The computation means computes for every pixel the mean value and the standard deviation of the pixels located at the same coordinates in the plurality of background images. The difference means computes the difference between the value of each pixel in the object image and the mean value of the pixels in the background images corresponding to that pixel. The extraction means extracts the pixel from the object image having a difference that is greater than a predetermined times the standard deviation as the object portion.

According to yet a further aspect of the present invention, an object extraction apparatus of extracting a portion of an object with an unwanted portion removed from an object image on the basis of an object image obtained by shooting an object of interest and a plurality of background images obtained by shooting only the background of the object of interest a plurality of times includes average/standard deviation computation means, region segmentation means, difference means, average difference computation means, average standard deviation computation means, and extract means. The average/standard deviation computation means computes for every pixel the mean value and the standard deviation of pixels located at the same coordinates in a plurality of background images. The region segmentation means divides the object image into a plurality of regions. The difference means computes the difference between the value of each pixel in each region of the object image and the mean value of the corresponding pixels in the region of the background images corresponding to that region. The average difference computation means computes the average in difference for every each region. The average standard deviation computation means computes the mean value of the standard deviation for every region. The extract means extracts the region out of the plurality of regions having the mean value of the difference greater than a predetermined times the mean value of the standard deviation.

According to still another aspect of the present invention, an object extraction apparatus of extracting a portion of an image with an unwanted portion removed from an object image on the basis of an object image obtained by shooting an object of interest and a plurality of background images obtained by shooting only the background of the object of interest a plurality of times includes average/standard deviation computation means, region segmentation means, average computation means, difference means, average difference computation means, average standard deviation computation means and extract means. The average/standard deviation computation means computes for each pixel the mean value and the standard deviation of pixels located at the same coordinates in the plurality of background images. The region segmentation means divides the object image into a plurality of regions. The average computation means computes the mean value of a pixel in each region. The difference means computes the absolute value of difference between the mean value of pixels in each region of the object image and the mean value of the pixels in the region of the background images corresponding to that region. The average difference computation means computes the mean value of the absolute values of the difference for each region. The average standard deviation computation means computes the mean value of the standard deviation for each region. The extract means extracts a region out of the plurality of regions having a mean value of absolute values of difference greater than a predetermined times the mean value of the standard deviation.

According to yet another aspect of the present invention, an object extraction apparatus of extracting a portion of an object with an unwanted portion removed from an object of image on the basis of an object image obtained by shooting an object of interest and a plurality of background images obtained by shooting only the background of the object of image for a plurality of times includes average/standard deviation computation means, region segmentation means, average computation means, difference means, average standard deviation computation means, and extract means. The average/standard deviation computation means computes for each pixel the mean value and the standard deviation of pixels located at the same coordinates in the plurality of background images. The region segmentation means divides the object image into a plurality of regions. The average computation means computes the mean value of the pixels in each region of the object image, and also the mean values in each region of the mean value of the pixels in the background images. The difference means computes the absolute value of the difference between the mean value of the pixels in each region of the object image and the mean value in each region of the mean values of the pixels in the region of the background images corresponding to that region. The average standard deviation computation means computes the mean value of the standard deviation for each region. The extract means extracts a region out of the plurality of regions having an absolute value of difference greater than a predetermined times the mean value of the standard deviation as an object portion.

According to still another aspect of the present invention, an object extraction apparatus of extracting an object portion with an unwanted portion removed from an object image on the basis of a plurality of object images obtained by shooting an object of interest a plurality of times and a plurality of background images obtained by shooting only the background of the object of interest a plurality of times includes average/standard deviation computation means, average computation means, region segmentation means, difference means, average difference computation means, average standard deviation computation means, and extract means. The average/standard deviation computation means computes for each pixel the mean value and the standard deviation of pixels located at the same coordinates in the plurality of background images. The average computation means computes for each pixel the mean value of the pixels located at the same coordinate in the plurality of object images. The region segmentation means divides the object image into a plurality of regions. The difference means computes an absolute value of difference between the mean value of respective pixels in each region of the object image and the mean value of corresponding pixels in the region of the background image corresponding to the relevant region. The average difference computation means computes the mean value of the absolute values of difference for every region. The average standard deviation computation means computes the mean value of the standard deviation for each region. The extract means extracts a region out of the plurality of regions having a mean value of the absolute values of difference greater than a predetermined times the mean value of the standard deviation.

According to the above object extraction apparatus, a portion in the object of interest of a color identical to that of the background, if any, can be detected and extracted as a portion of the object. The task to be carried out manually can be reduced. Also, a special shooting environment is dispensable.

According to yet a further aspect of the present invention, a three-dimensional model generation apparatus for generating a three-dimensional model of an object of interest includes: shooting means for shooting the background of an object of interest and shooting the object of interest including the background; silhouette generation means obtaining the difference between a background image obtained by shooting only the background and a plurality of object images obtained by shooting the object of interest with the background for generating a plurality of silhouette images; and means for generating a three-dimensional model of the object of interest using the plurality of silhouette images.

The three-dimensional model generation apparatus preferably includes rotary means for rotating the object of interest.

According to yet an additional aspect of the present invention, a three-dimensional model generation apparatus of generating a three-dimensional model of an object of interest includes: silhouette generation means for generating a plurality of silhouette images of the object of interest, estimation means for estimating the existing region of the object of interest in a voxel space according to the plurality of silhouette images; and means for generating a three-dimensional model of the object of interest using the object of interest existing region obtained by the estimation means.

Preferably, the estimation means carries out a voting process on the voxel space.

Preferably, the three-dimensional model generation apparatus further includes threshold value processing means for setting the portion having a vote score greater than a predetermined threshold value as a result of the voting process.

According to the above three-dimensional model generation apparatus, a special shooting environment such as a backboard of the same color is dispensable since a three-dimensional model is generated using a silhouette image obtained by carrying out difference processing.

Since a three-dimensional model is generated by carrying out a voting process on voxel space on the basis of a plurality of silhouette images, a three-dimensional model can be generated at high accuracy even when some of the plurality of silhouette images is improper.

Since the three-dimensional model is generated by polygonal approximation of the contour line of a plurality of cut out planes obtained by cutting a three-dimensional shape of an object of image, the amount of data for three-dimensional model generation can be reduced to allow high speed processing.

Since a three-dimensional model is generated by polygonal approximation of the contour line of a plurality of cross sectional shapes of an object of interest, the amount of data for three-dimensional model generation can be reduced to allow high speed processing.

BRIEF DESCRIPTION OF THE DRAWINGS

FIG. 16 is a flow chart showing the flow of the process of the texture information assignment method according to a second embodiment of the present invention.

FIG. 18 is a diagram representing the concept of the method of storing texture information into the color information storage unit of FIG. 4.

FIG. 27A shows an object image divided into a plurality of regions R obtained in the object extraction apparatus of FIG. 26. FIG. 27B shows an image displaying depth information in luminance. FIG. 27C shows an image of an object portion extracted with the background portion removed from the object image.

FIG. 28 is a flow chart showing main components of an object extraction apparatus according to an eighth embodiment of the present invention.

FIG. 42 is a diagram to describe the local most proximity point connection strategy at step SA3 of FIG. 40.

BEST MODE FOR CARRYING OUT THE INVENTION

Figure 3:
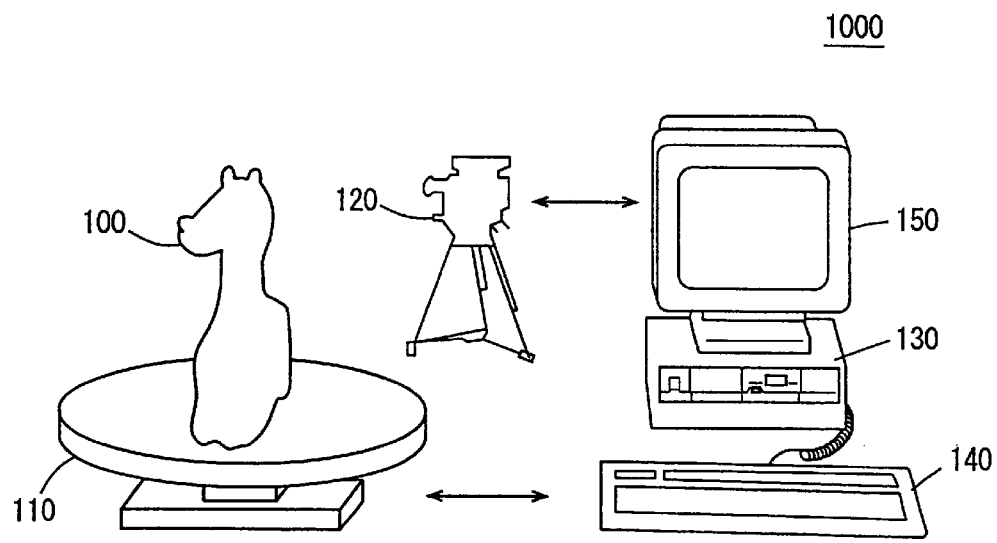
FIG. 3 is a schematic block diagram showing a structure of a three-dimensional model generation apparatus according to a first embodiment of the present invention.

Embodiments of the present invention will be described in detail with reference to the drawings. In the drawings, the same or corresponding components have the same reference characters allotted, and their description will not be repeated.
First Embodiment FIG. 3 is a schematic block diagram showing a structure of a three-dimensional model generation apparatus 1000 to reconstruct a three-dimensional model from an actual object according to a first embodiment of the present invention. Referring to FIG. 3, an object of interest 100 is mounted on a turntable 110. Turntable 110 has its angle of rotation controlled according to, for example, a control signal from a computer 130. A camera 120 shoots the rotating object of interest 100 at every specified angle. The obtained image data is applied to computer 130. Data of the shooting condition such as the rotary pitch of turntable 110 and the like is applied to computer 130 from an input device 140.

Computer 130 extracts a silhouette image from the image information corresponding to each shooting angle according to the image information applied from camera 120 to generate a three-dimensional shape model. Here, a three-dimensional shape model can be represented by a set of, for example, polygons (triangular patches). The aforementioned image information implies numeric information representing the luminance, color, or the gray level corresponding to each pixel output from camera 120. However, representation of a three-dimensional model is not limited to such a representation method. For example, a three-dimensional model can be represented as a group of surface shape elements of different shapes. Therefore, the shape that is the element for representing a shape model is generically referred to as a three-dimensional shape constituent element.

Next, computer 130 applies texture information on the reconstructed shape model according to the image information picked up at each angle. Here, color information (texture information) in the field of CG (Computer Graphics) refers to the image information to represent the asperity, design, pattern, and material quality of the surface of the object. Such a reconstructed three-dimensional model is displayed on a display device 150.

Prior to the detailed description of the method of applying color information (more generally, texture information) with respect to the three-dimensional image information, the flow of generating a three-dimensional shape model from a real object will first be described briefly.

Figure 5:
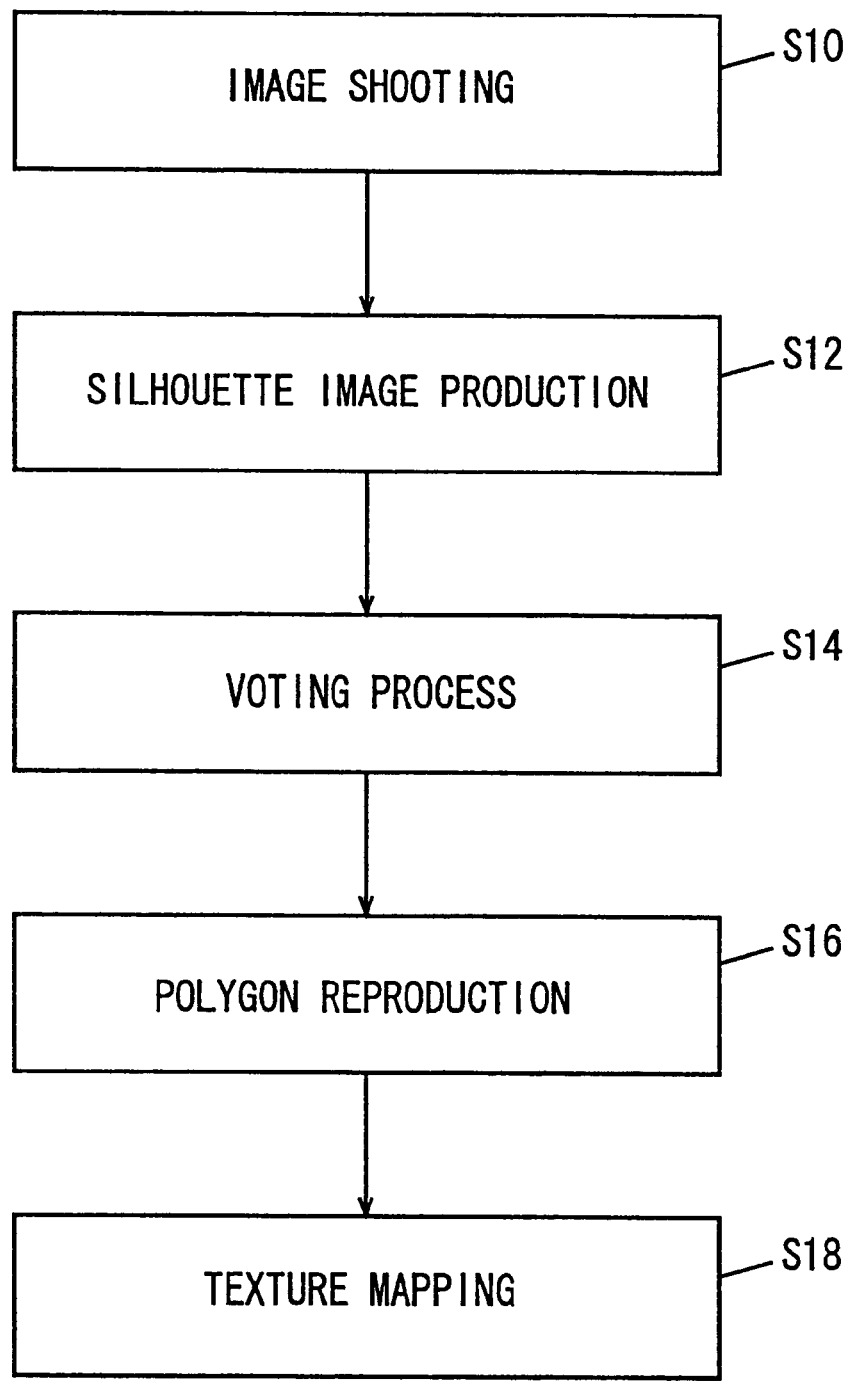
FIG. 5 is a flow chart showing the flow of the process to generate a three-dimensional model from a real object.

FIG. 5 is a flow chart showing the flow of the process from the generation of an object image up to assignment of texture information to a shape model. FIGS. 6A–6E are diagrams representing the concept of the data process of each flow.

Figure 6A:
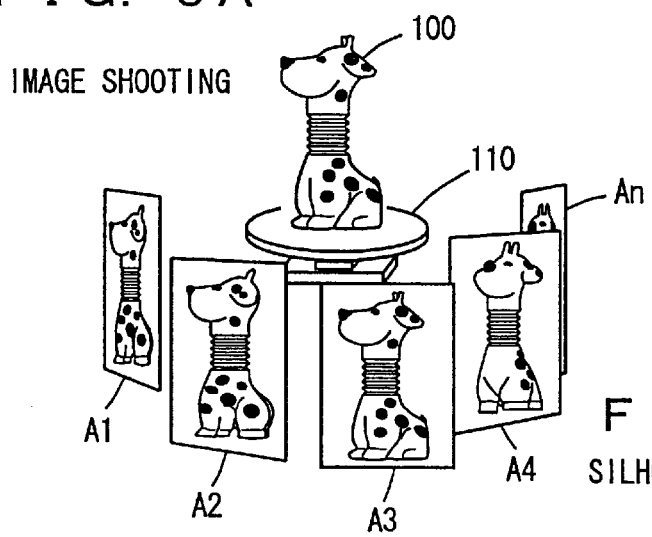
FIG. 6A is a diagram to describe image shooting of step S10 in FIG. 5.

Referring to FIG. 6A, computer 130 controls the angle of rotation of turntable 110 according to the shooting condition data applied from input device 140. Object images A1–An shot by camera 120 for every angle of rotation are input (step S10). If an object image is input from camera 120 at the angle of every 10°, 36 object images A1–An are input in one turn of rotation.

Figure 6B:
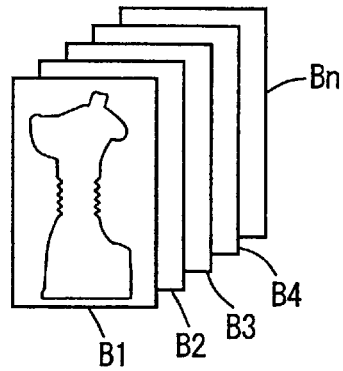
FIG. 6B is a diagram for describing silhouette image generation of step S12 in FIG. 5.

Referring to FIG. 6B, computer 130 extracts the contour of the object figure from each of the shot object images A1–An to generate silhouette images B1–Bn of the object viewed from various directions (step S12).

Figure 6C:
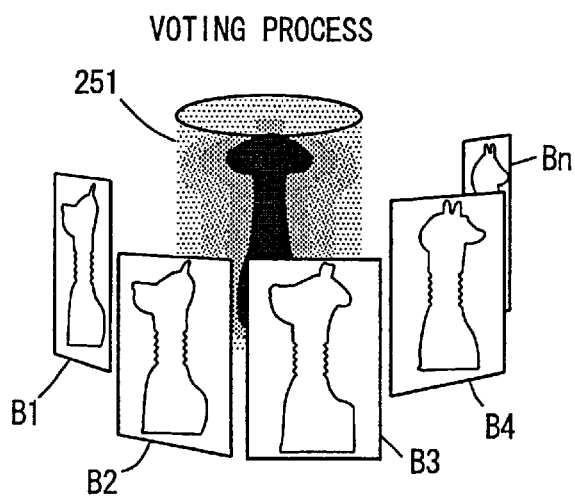
FIG. 6C is a diagram for describing a voting process of step S14 in FIG. 5.

The obtained silhouette images B1–Bn indicate the contour of object 100 viewed from various directions. As shown in FIG. 6C, a voting process that will be described afterwards is carried out on the three-dimensional space divided into virtual voxels on the basis of the contour figure of the object viewed from various directions. The existing region of object 100 within voxel space 251 is estimated (step S14).

Figure 6D:
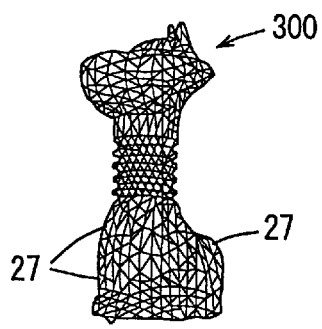
FIG. 6D is a diagram for describing polygon generation of step S16 in FIG. 5.

Referring to FIG. 6D, the object region represented by voxel space 251 is converted into the representation of shape model 300 using a polygon (triangular patch) 27 (step S16). Here, the accuracy of the representing shape must be maintained while suppressing the required number of polygons for representation. Therefore, polygon 27 can be generated according to the method set forth in the following.

In voxel space 251 represented by the cylindrical coordinate system, the contour line of the cut plane at a surface θ of the cylindrical coordinate system is approximated in polygons to determine the vertex of polygon 27. Then, a triangular patch is generated by connecting the three closest vertices of respective vertices.

Figure 6E:
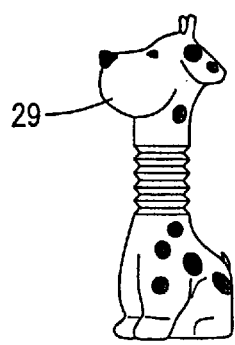
FIG. 6E is a diagram for describing texture mapping of step S18 of FIG. 5.

Referring to FIG. 6E, texture information is assigned from the image information picked up at step S10 on each triangular patch of the generated polygon 27 (step S18).

By the above flow, a three-dimensional model 27 is reconstructed in computer 130 on the basis of image information picked up by shooting a real object with camera 120.

Although the above description corresponds to a structure in which an object of interest 100 is placed in a fixed manner on rotary table 110 to pick up an image of the object with turntable 110 rotated, the method of capturing image information is not limited to such a structure.

For example, image data can be obtained by shooting object of interest 100 from a plurality of viewpoints with camera 120 carried by an operator moving around stationary object 100. By identifying the position of camera 120 and the shooting direction for each shot of an image, three-dimensional shape model 300 can be reconstructed and texture information assigned by this information by a method similar to that set forth in the following.

Now, each processing step of FIG. 5 will be described in detail.
Image Shooting and Silhouette Image Generation An image is shot by the above-described structure shown in FIG. 3 by placing target object 100 on turntable 110 and shooting a plurality of object images A1–An while table 110 is rotated. Additionally, a background image is shot to extract a silhouette image at the next step of S12.

By the difference processing between object images A1–Aa and a background image, silhouette images B1–Bn with only the cut out of the object of interest are generated.

An image difference process including a region segmentation process that will describe afterwards, not the simple difference process between images, can be carried out to eliminate the need of a special shooting environment to obtain a background image of a single color, and to allow stable silhouette image generation.

Specifically, object images A1–An are divided into regions. The difference processing with the background image is carried out on a region-by-region basis. Here, difference processing implies the process of computing the difference of the signal intensity in the shot object image information per pixel. Furthermore, the difference mean is subjected to the threshold process on a pixel-by-pixel basis to extract the object portion.

By the above-described method, a portion of an object having a color identical to that of the background in the pixel level, if any, can be detected as the object portion if there is a color differing from that of the background in the region level. Therefore, the accuracy of the generated silhouette image can be improved.

Voting Process

Silhouette image information of an object of interest 100 picked up from a plurality of viewpoints can be obtained. A voting process set forth in the following is carried out to reconstruct a three-dimensional shape of an object from these plurality of silhouette images information.

First, a voxel model and voxel space 251 to describe a three-dimensional shape will be explained with reference to FIG. 7.

A voxel model is a model that describes a three-dimensional shape according to the absence/presence of a three-dimensional lattice point. The space defined by voxels is referred to as voxel space 251. Voxel space 251 is arranged with a size and position that encloses the object to be recognized. Here, this voxel space 251 is represented with the cylindrical coordinate system that can represent the shape of a target object in a more natural manner with respect to the pickup of an image while rotating object 100 of interest.

Therefore, each voxel implies the volumeric element in which r, θ, and z are divided at equal intervals where r is the coordinate in the radial direction of the cylindrical coordinate, θ is the coordinate in the angle direction, and z is the coordinate in the direction of the axis. The voxel model is a representation of a three-dimensional shape by a set of these volumeric elements.

The procedure of reconstructing this voxel model from silhouette images B1–Bn will be described briefly hereinafter.

First, a hypothetical existing region 50 with respect to an object of interest is computed in voxel space 251 according to one silhouette image. Here, a hypothetical existing region 50 implies a conical region with the projection center 51 of camera 120 as the vertex and the object figure of the image as a cross sectional shape as shown in FIG. 7. In other words, object 100 of interest is always present inside this region.

A voting process implies the process of assigning (voting) a number 1 to each voxel residing within hypothetical existing region 50 when relevant to a hypothetical existing region 50 for one silhouette image, for example.

Figure 7:
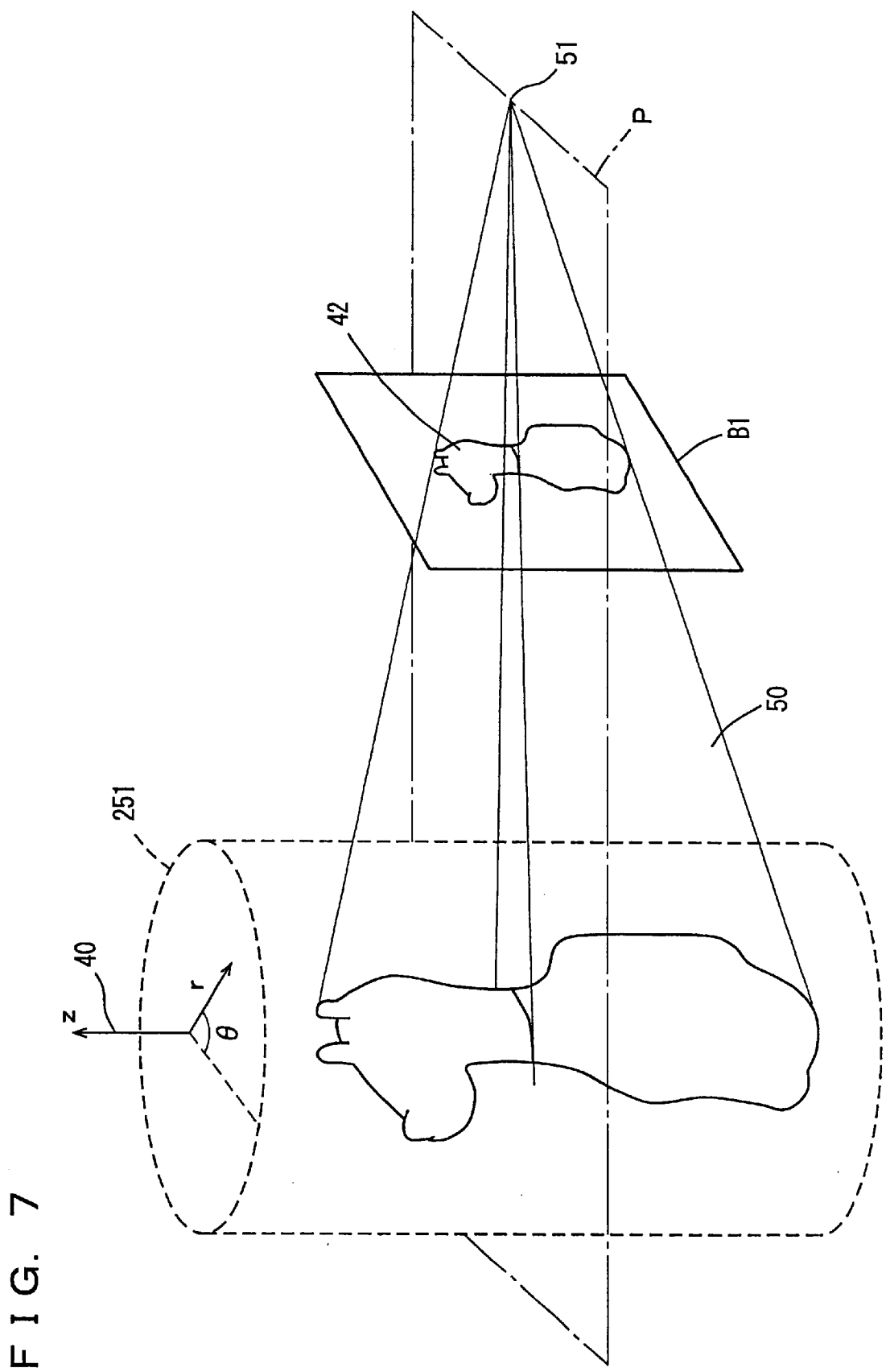
FIG. 7 is a perspective view representing the concept of the voting process.
Figure 8:
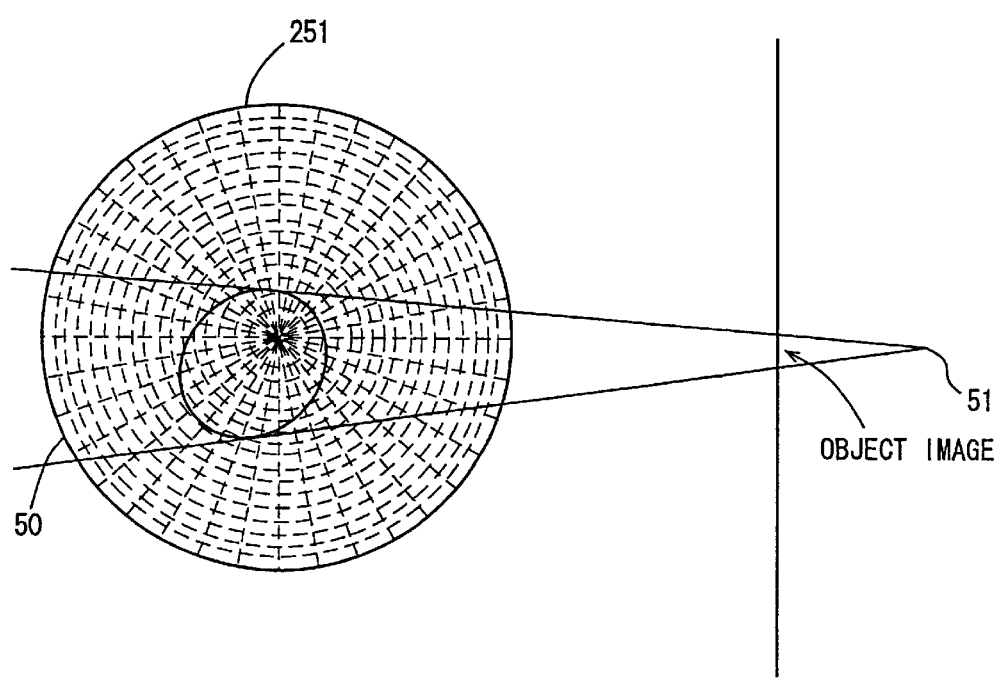
FIG. 8 is a cross section of a P plane indicating the hypothetical existing region in the voting process.

FIG. 8 shows a cross section of a silhouette image and cylindrical voxel space 251 on a plane P perpendicular to the z axis shown in FIG. 7.

Since the conical region of projection center 51 of camera 120 is pertinent to hypothetical existing region 50, the numeric of 1 is assigned to each voxel in cylindrical voxel space 251 where this region 50 exists.

Figure 9:
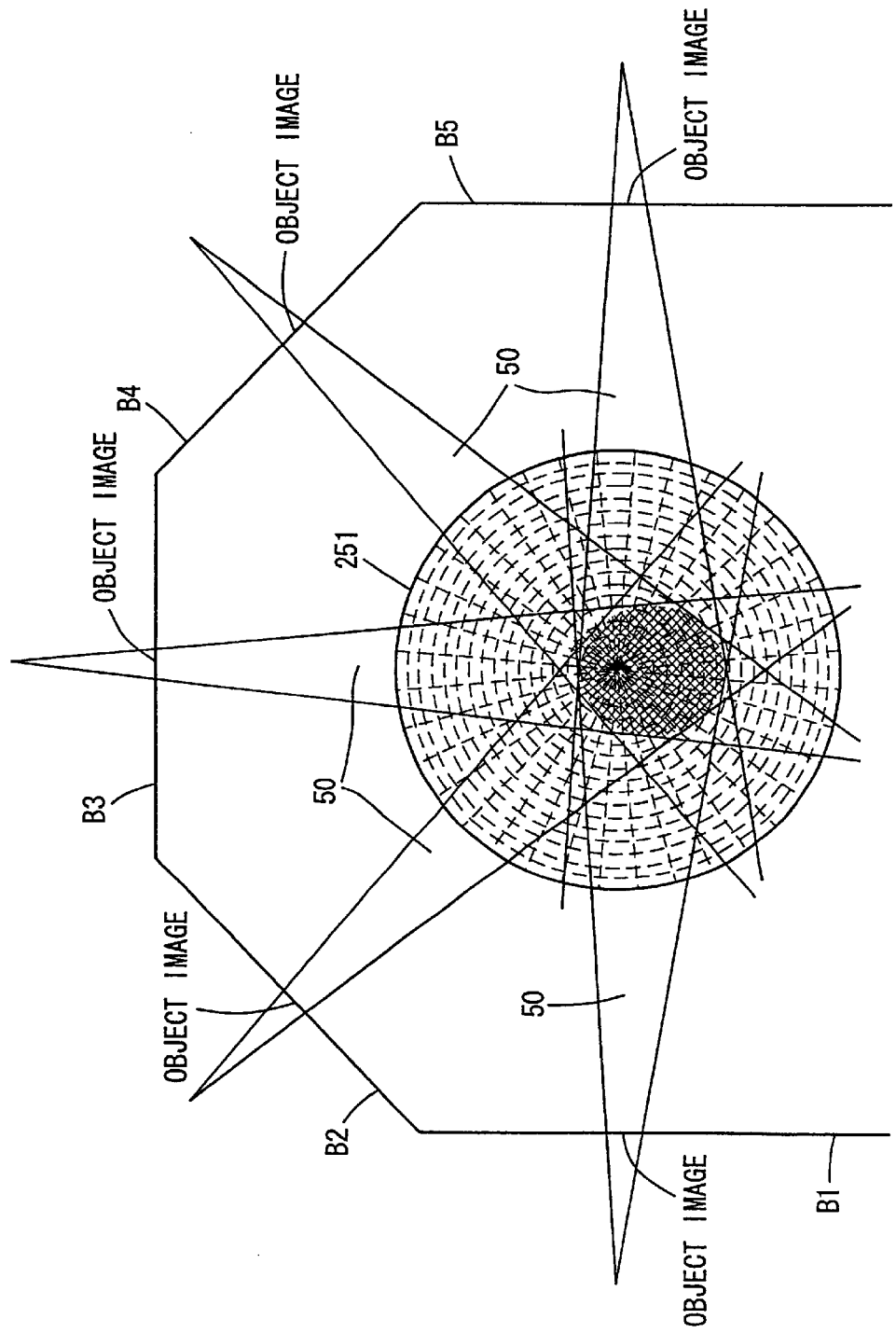
FIG. 9 is a sectional view of the P plane representing the concept of the voting process.

FIG. 9 is a cross sectional view of cylindrical voxel space 251 at the cross section of plane P for the case where voting process is carried out according to the plurality of silhouette images B1–Bn.

FIG. 9 shows the case where the voting process is carried out on cylindrical voxel space 251 according to silhouette images B1–B5 shot from 5 viewpoints. Since the numeric of 1 is assigned to each hypothetical existing region 50 for respective silhouette images in the voting process according to each silhouette image, the cross-hatched region in FIG. 9 has hypothetical existing region 50 according to all silhouette images B1–B5 overlapped thereon when the voting process is carried out according to five silhouette image B1–B5. In other words, the numeric of 5 is assigned to the voxels in the cross-hatched region as a result of the voting processing according to five silhouette images B1–B5.

Therefore, by extracting only the voxel assigned with a numeric of at least 5 among the voxels in cylindrical voxel space 251, the region where object 100 of interest exists in this cylindrical voxel space 251 can be obtained.

In general, the region where the object of interest exists in cylindrical voxel space 251 can be computed according to a voting process by setting an appropriate threshold value according to the number of shot object images. According to the above process, the region where object 100 is present in cylindrical voxel space 251 can be extracted.

As a three-dimensional model generation method using voxel space 251, a cone-silhouetting method is disclosed in U.S. Pat. No. 4,982,438. This system has the problem that any error in the generated silhouette image will directly affect the shape of the object that is reconstructed. In contrast, the three-dimensional model generation method by the voting process is characterized in that, even when there is an error in the basic silhouette image, reduction in the accuracy of the captured three-dimensional shape can be minimized by setting an appropriate threshold value.

Polygon Generation

The object region represented by voxel space 251 is transformed so as to be represented with a shape model 300 using polygons (triangular patch) 27.

Figure 10A:
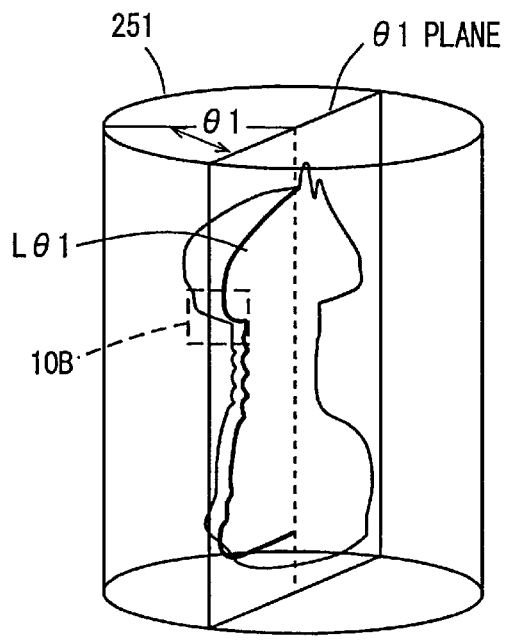
FIG. 10A is a diagram for describing the concept of a polygon generation process.
Figure 10B:
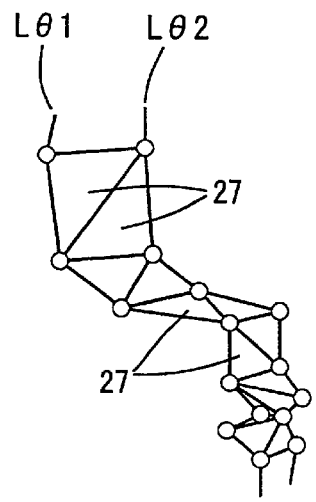
FIG. 10B is an enlargement view of the 10B portion in FIG. 10A.

FIGS. 10A and 10B represent the concept of such a polygon generation process. Referring to FIGS. 10A and 10B, the contour line of a cut plane at the cylindrical coordinate system θ1 plane (a plane where θ=θ1 in cylindrical coordinate system) of the object region represented by cylindrical voxel space 251 is subjected to polygonal approximation. Each vertex of contour line Lθ1 obtained by this polygonal approximation corresponds to the vertex of polygon 27 as will be described afterwards. Similarly, the contour line of the cut out at plane θ2 of the cylindrical coordinate system is subjected to polygonal approximation to obtain Lθ2. This operation is carried out on plane θ corresponding to all the voxels.

Then, each vertex of these contour lines is connected regarding the respective closest three vertices to generate triangular patch 27. By generating triangular patch 27 by the process of polygonal approximation of the contour line and connection of the closest three vertices, the number of polygons required for representation can be suppressed and the accuracy of the representation shape can be maintained.

Figure 11:
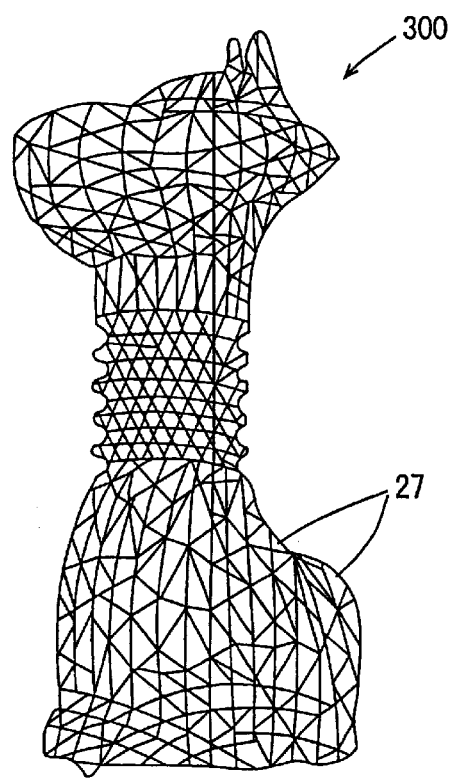
FIG. 11 shows a three-dimensional shape model by polygons.

FIG. 11 shows a three-dimensional shape model 300 representing object 100 with polygons 27.

By the above operation, the shape of the object of interest can be reconstructed within the computer.

Although the above description is provided on the basis of a cylindrical voxel space 251, an orthogonal voxel space can be used instead. By connecting adjacent voxels in the polygon generation process, the small polygons can be generated, and then consolidated to reduce the number of polygons.

Texture Mapping

In order to assign texture information to the object shape reconstructed in the computer for a more real three-dimensional model, the process of assigning texture information included in the shot object images A1–An to three-dimensional shape model 300 is carried out.

More specifically, the object image from which the texture information of each polygon 27 is to be applied (referred to as "reference image" hereinafter) is determined. Then, polygon 27 is projected on the reference image. The texture information of that projected area is assigned to the corresponding polygon 27.

Figure 12B:
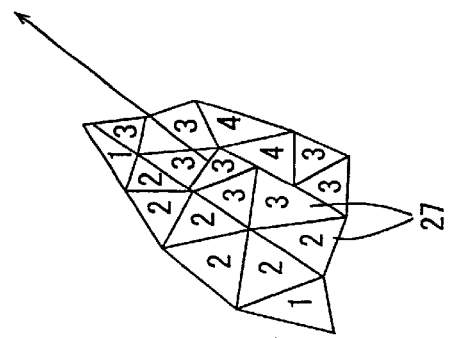
FIG. 12B is an enlarged view of the 12B portion in FIG. 12A.
Figure 12A:
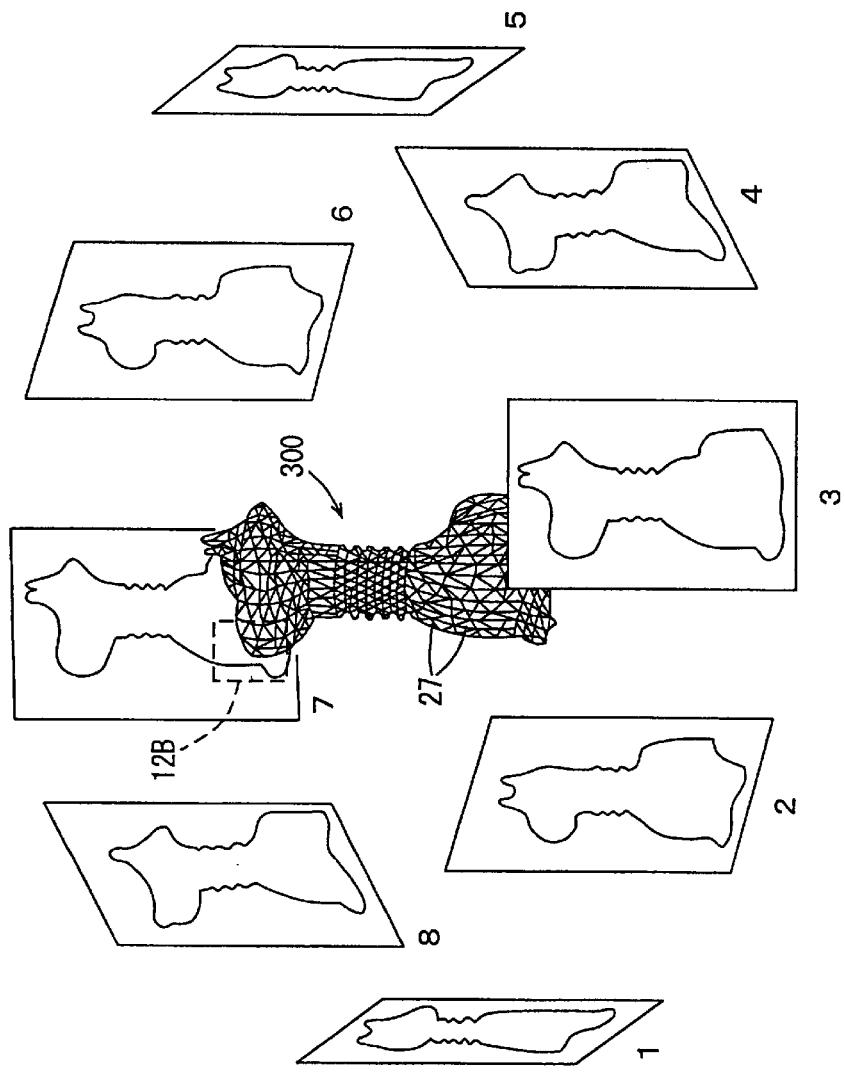
FIG. 12A is a diagram representing the concept of the process of assigning texture information.

FIGS. 12A and 12B are diagrams for describing the concept of the texture information assignment process. For the sake of simplification, it is assumed that there are eight object image information labeled 1–8 as the reference image. More specifically, there is an object image of the target object shot from the angle of every 45°. Description is provided of assigning texture information to shape model 300 according to a reference image of a target object shot at every constant angle about one axis of rotation. However, the present invention is not limited to such a case, and can be applied to the case where texture information is applied to shape model 300 according to a plurality of reference images of a target object shot from an arbitrary position and direction.

In determining which reference image is to be corresponded with respect to a target polygon 27, the approach of selecting the reference image with the greatest texture information amount for the relevant polygon 27 is to be taken into account.

By assigning a corresponding reference image, i.e. a label number, to each polygon 27 according to the above approach, texture information can be applied to shape model 300 represented by polygons 27.

Figure 4:
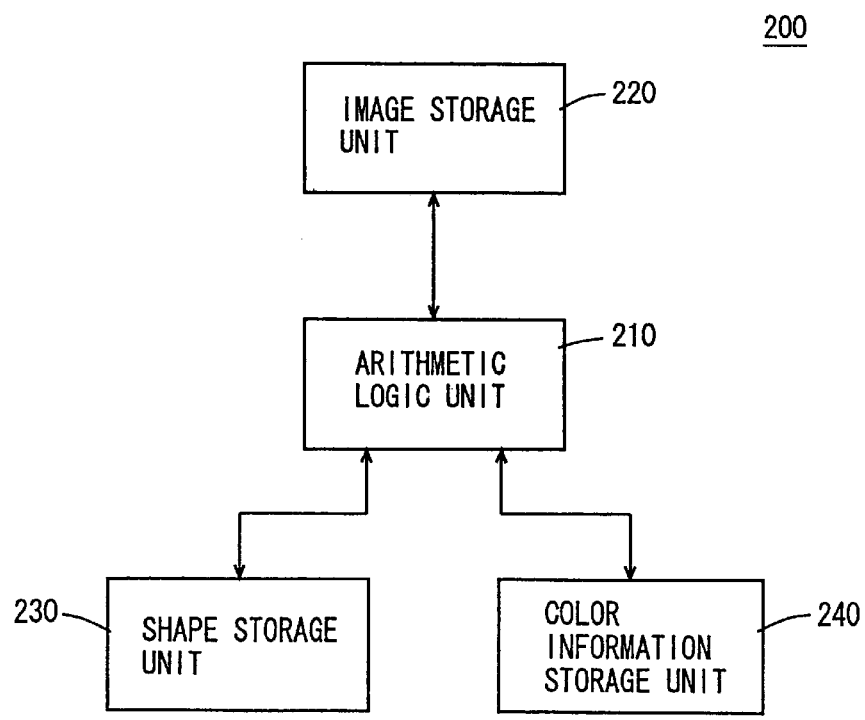
FIG. 4 is a schematic block diagram showing a structure of a color information assignment processing unit in the three-dimensional model generation apparatus of FIG. 3.
Figure 13:
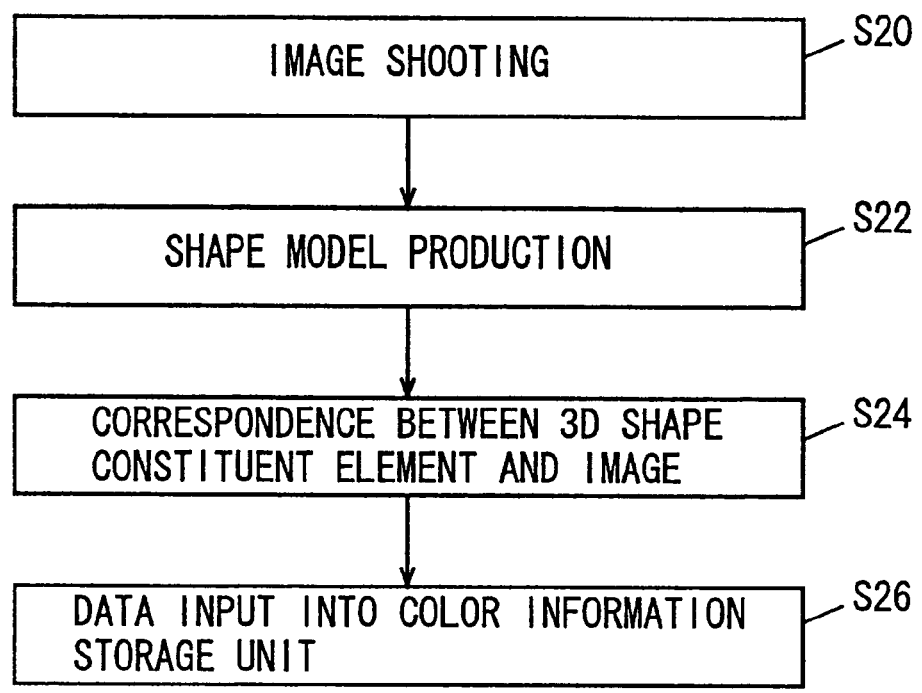
FIG. 13 is a flow chart showing the flow of the process of assigning texture information to each three-dimensional shape constituent element.

FIG. 13 is a flow chart showing the process up to texture information application. FIG. 4 is a schematic block diagram showing a structure of a color information assignment processor 200 to assign texture information in computer 130.

Color information assignment processor 200 includes an image storage unit 220 for storing object image information (reference image information) picked up by camera 120, an arithmetic logic unit 210 for generating a shape model 300 of a target object according to reference image information stored in image storage unit 220, a shape storage unit 230 for storing shape model 300 generated by arithmetic logic unit 210, i.e., the position and shape of each polygon 27, and a color information storage unit 240 for storing texture information assigned to each polygon 27 by arithmetic logic unit 210 according to the reference image information stored in image storage unit 220.

Referring to FIGS. 13 and 4, image information obtained by shooting a target object rotated at every predetermined angle is stored in image storage unit 220 (step S20).

According to the picked up image information, arithmetic logic unit 210 generates shape model 300. The shape data is stored in shape storage unit 230 (step S22).

Then, correspondence between a three-dimensional shape constituent element (for example, polygon 27) and the reference image information stored in image storage unit 220 is set by arithmetic logic unit 210 according to the procedure set forth in the following (step S24).

Arithmetic logic unit 210 has the texture information of each corresponding polygon 27 stored in color information storage unit 240 (step S26).

The process of correspondence between a three-dimensional shape constituent element and reference image information of step S24 will be described in further detail hereinafter.

Figure 14:
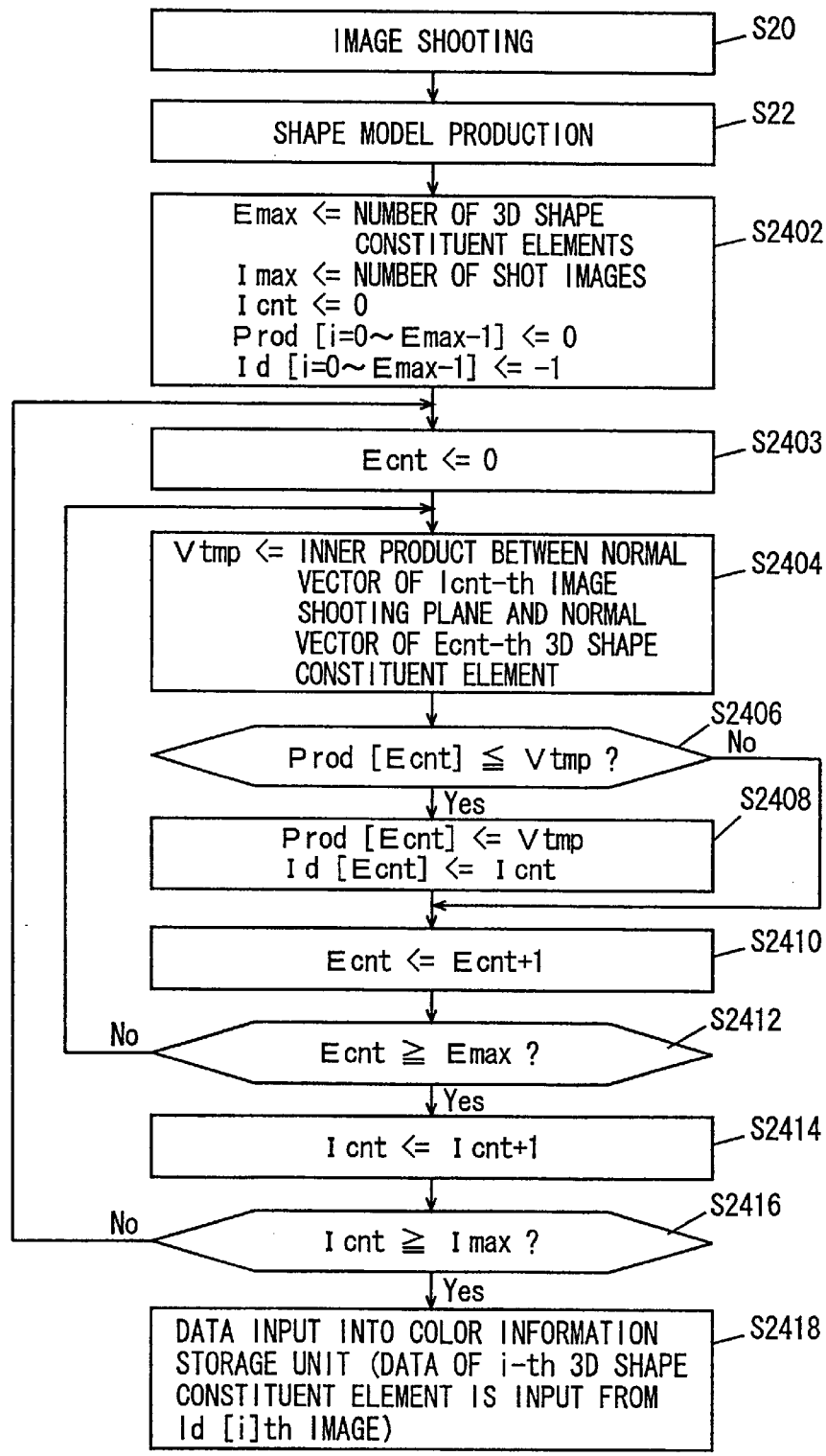
FIG. 14 is a flow chart showing the flow of the process of the texture information assignment method according to the first embodiment.

FIG. 14 is a detailed flow chart of the flow for correspondence between a three-dimensional shape constituent element and reference image information of step S24.

In the following process, the amount of texture information is determined according to the degree of match between the normal vector of each three-dimensional shape constituent element (polygon 27) and the normal vector of the image shooting plane parallel to the direction in which the reference image was shot. More specifically, the reference image that is most positively opposite the relevant polygon 27 is selected as the reference image having the greatest texture information with respect to that polygon 27.

Following the completion of each process of shooting (step S20) and shape model generation (step S22), arithmetic logic unit 210 initializes the variables used in the following calculation.

Specifically, the number of three-dimensional shape constituent elements is inserted into variable Emax, and the number of shot images is inserted into variable Imax. In the following process, the auxiliary variable Icnt that counts the corresponding label number with respect to the shot image is initialized to the value of 0.

Also, all the values of the first dimensional array variable Prod [i] respectively corresponding to the i-th (i=0~Emax−1) three-dimensional shape constituent element are initialized to the value of 0 while the values of the first dimensional array variable Id [i] to which the label number of the reference image corresponding to the i-th three-dimensional shape constituent element is inserted are all initialized to the value of −1 (step S2402).

Then, auxiliary variable Ecnt to count the number of polygon 27 is initialized to the value of 0 (step S2403).

The inner product of the normal vector of the Icnt-th image shooting plane and the normal vector of Ecnt-th three-dimensional shape constituent element is computed. This computed value is inserted into variable Vtmp (step S2404).

Arithmetic unit 210 compares the value of the Ecnt-th variable Prod [Ecnt] with the value of variable Vtmp.

When determination is made that the value of variable Prod [Ecnt] is equal to or smaller than variable Vtmp (step S2406), the value of variable Vtmp is inserted into variable Prod [Ecnt]. Simultaneously, the current value of count variable Icnt is inserted into variable Id [Ecnt] (step S2408).

When determination is made that the value of variable Prod [Ecnt] is greater than the value of variable Vtmp (step S2406), the value of variable Ecnt is incremented by one (step S2410).

When determination is made that the value of count variable Enct is smaller than the number of three-dimensional shape constituent elements Emax (step S2412), control returns to the process of step S2404. The same process is repeated on the next three-dimensional shape constituent element.

When determination is made that the value of variable Ecnt is equal to or greater than the number of three-dimensional shape constituent elements Emax (step S2412), the value of count value Icnt is incremented by 1 (step S2414).

Then, determination is made whether the value of count variable Icnt is equal to or greater than the number of shot images Imax (step S2416).

When determination is made that the value of variable Icnt is smaller than the value of Imax (step S2416), the process from step S2403 to step S2412 is repeated for the next reference image.

However, when the value of variable Icnt is identified to be equal to or greater than the number of shot images Imax (step S2416), control proceeds to the process set forth in the following.

According to the process from step S2402 to step S2416, the value of the inner product between the surface normal vector of the relevant reference image and the surface normal vector of all the three-dimensional shape constituent elements is compared for each reference image. As a result of this process, the reference image that has an inner product value greater than the inner product value of all the previous reference images process is stored in the first dimensional array variable Prod [Ecnt] for each three-dimensional shape constituent element. Then, the label number of the current reference image is stored in first dimensional array variable Id [Ecnt].

Therefore, at the transition from the process of step S2416 to the next process, the label number of the reference image information having the largest inner product value for the corresponding i-th three-dimensional shape constituent element is stored in first dimensional array variable Id [i].

Then, arithmetic logic unit 210 reads out the corresponding reference image information for each three-dimensional shape constituent element from image storage unit 220, and stores the read out information into color information storage unit 240 (step S2418).

According to the above-described structure of applying the color information (texture information) obtained from the reference image information that has the greatest amount of texture information is assigned to each three-dimensional shape constituent element (polygon 27) forming shape model 300, the texture information most approximating the actual object can be assigned to each three-dimensional shape constituent element.

Figure 15:
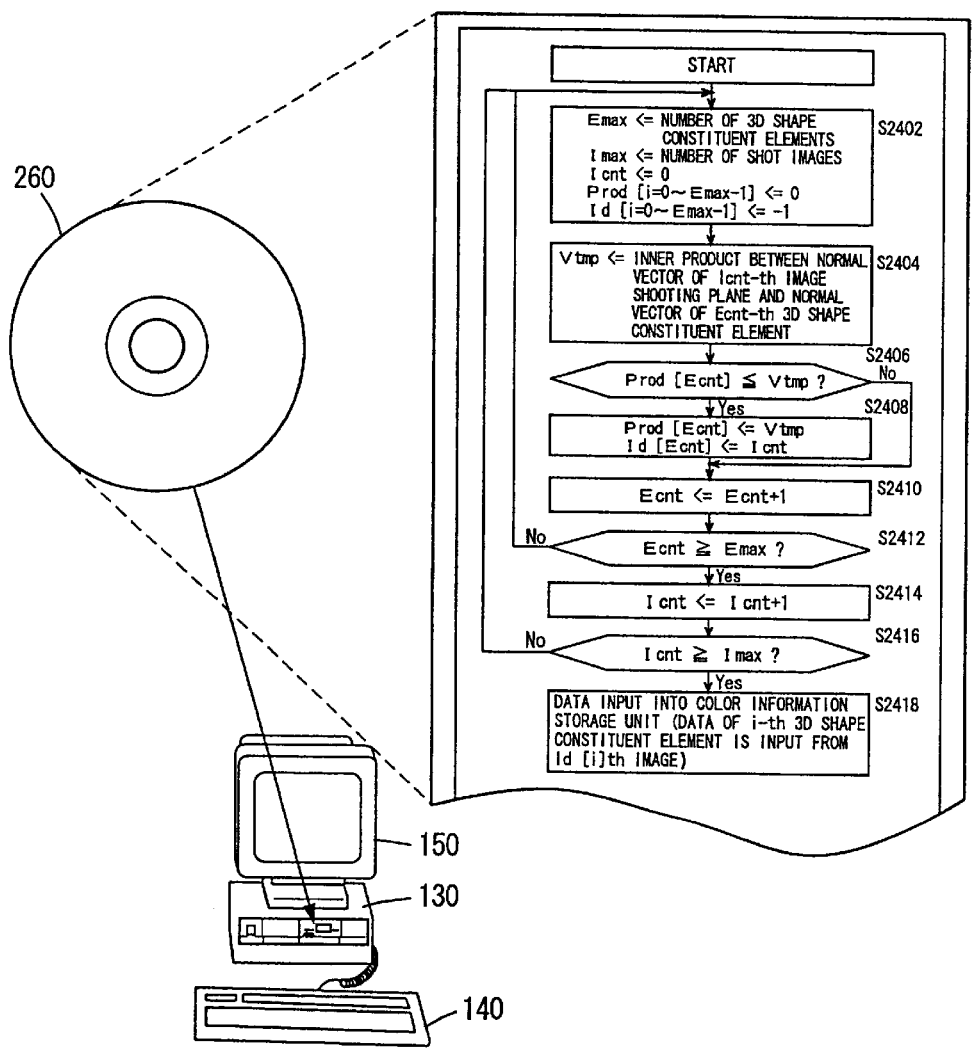
FIG. 15 is a diagram representing the concept of a recording medium in which is recorded the texture information assignment method of the first embodiment.

FIG. 15 represents the concept of the structure of a recording medium in which the program to execute the texture assignment method of FIG. 14 by computer 130 is stored.

A magneto-optical disk such as a magnetic disk or a CD-ROM (Compact Disk Read Only Memory) can be used as the recording medium. A program to have computer 130 execute the process of FIG. 14 is described in various process steps by a predetermined programming language to be coded and recorded in recording medium 260.

By operating computer 130 according to the texture information assignment program stored in recording medium 160, the effect as described above can be obtained. In other words, texture information approximating the texture of the actual object can be assigned to shape model 300 reconstructed in computer 130.

Second Embodiment

In the previous first embodiment, the reference image determined as having the greatest texture information amount according to the inner product value with respect to each three-dimensional shape constituent element is selected to apply the texture information to each three-dimensional shape constituent element.

Figure 1:
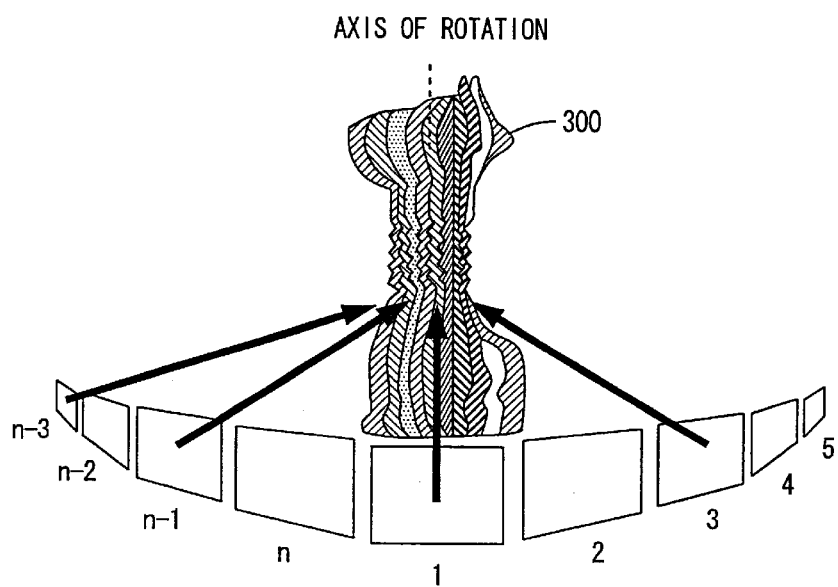
FIG. 1 is a diagram representing a concept of a conventional method of texture information assignment.
Figure 2:
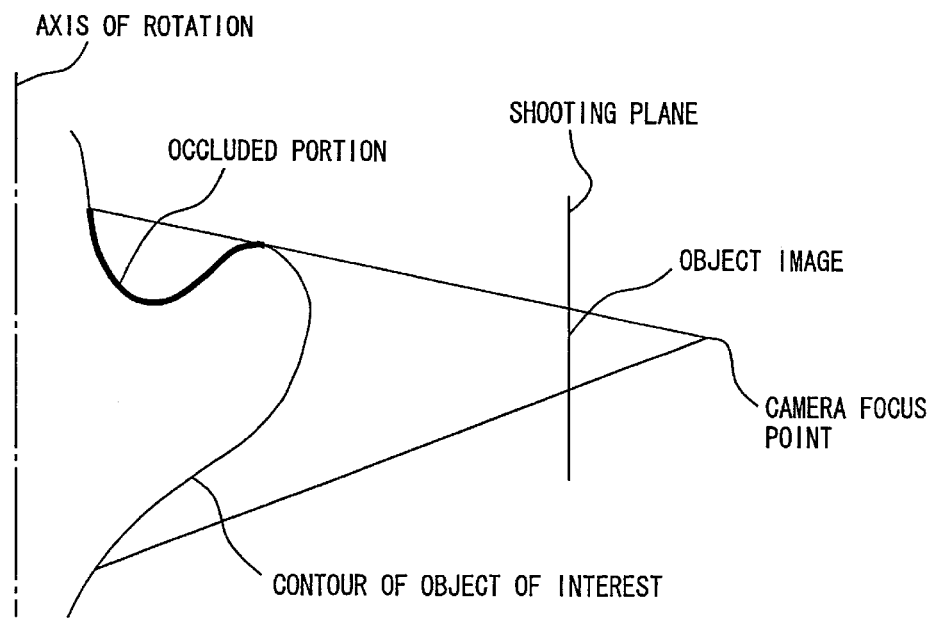
FIG. 2 is a sectional view for showing the problem in the conventional method of texture information assignment.

However, there is a case where a portion of the target object cannot be viewed in the object information shot from a certain direction depending upon the shape of the target object as described with reference to FIG. 2. In this event, there may be the case where the reference image having the greatest inner product value with respect to the surface normal vector of the three-dimensional shape constituent element corresponding to this occluded region is completely absent of the texture information.

The second embodiment provides a method and apparatus of texture information assignment that is applicable to such an event, and a medium in which the texture information assignment program is recorded.

The structure of the color information assignment processor of the second embodiment is identical to that of color information assignment processor 200 of FIG. 4. The operation carried out by arithmetic logic unit 210 differs from that of the first embodiment, as will be described hereinafter.

In contrast to the first embodiment in which the amount of the texture information is determined by comparing the inner product values between the normal vector of each polygon 27 and the normal vector of each reference image, the second embodiment evaluates the amount of texture information of each reference image information on the basis of a projection area of each polygon 27 with respect to a reference image.

FIG. 16 represents a flow chart of the process to determine the label number of the corresponding reference image information for each polygon 27 according to the projection area of polygon 27 on a reference image.

The flow chart of FIG. 16 is similar to the flow chart of FIG. 14, provided that the value of evaluation is the projection area Atmp of the three-dimensional shape constituent element projected on the reference image instead of the inner product value Vtmp between the normal vector of the reference image plane and the normal vector of three-dimensional shape constituent element.

Therefore, at the stage when the process from step S2422 to step S2436 is completed, the label number of the reference image information having the largest projection area for the corresponding i-th three-dimensional shape constituent element is stored in first dimensional array variable Id [i], and the projection area corresponding to the reference image information having the label number of Id [i] for the corresponding i-th three-dimensional shape constituent element is stored in first dimensional array variable Area [i].

Accordingly, arithmetic logic unit 210 reads out from image storage unit 220 the texture information of the corresponding reference image for every three-dimensional shape constituent element and stores the same into color information storage unit 240.

By the above-described process, texture information can be assigned to each polygon 27 from the reference image information having the greatest texture information amount with respect to shape model 300 reconstructed in a computer and the like even for an object of interest that has a relatively complicated shape. A similar effect can be provided by operating computer 130 with a medium in which the program such as from step 2422 to step S2438 of FIG. 16 is recorded.

Third Embodiment

In the above description, the correspondence between a reference image and each polygon 27 was determined according to the amount of texture information with respect to the relevant polygon 27 when target object 100 is reconstructed as shape model 300.

The issued to be taken into account in determining an appropriate reference image for each polygon 27 is not limited to the amount of the texture information. For example, when there is noticeable discontinuity in the texture information assigned between polygons 27, the boundary line of polygons will become so appreciable that the reconstructed three-dimensional model 29 will have an extremely unnatural visual result.

Therefore, the method of assigning a reference image to each three-dimensional shape constituent element, i.e. the texture information assignment method, of the third embodiment is directed to select a reference image of a great texture information amount, and suppressing the polygon boundary line at the same time.

As previously described in the second embodiment, a larger polygon projection area on a corresponding reference image is desirable in order to select a reference image of a large amount of texture information.

However, high continuity in the color information (texture information) applied between adjacent polygons 27 is desirable in order to hide the polygon boundary line.

The third embodiment is implemented so that assignment of a reference image to a polygon 27 adjacent to a target polygon 27 is carried out by selecting the same, or if different, a reference image with the smallest difference in the shooting angle, to conceal the polygon boundary line.

More specifically, for the purpose of enabling assignment of reference image information to a polygon 27 that satisfies the above-described two conditions in an optimum manner, the problem is seen as the so-called energy minimization problem that is set forth in the following.

Since each reference image is shot by altering the shooting angle for every predetermined angle, a number is assigned in order to each reference image. The correspondence between each polygon 27 and the reference image number (labeling problem) is solved by the iterative improvement process of locally minimizing the energy represented by the following equation.

When each reference image is not shot at every different predetermined angle, i.e., when the varying stepped amount of the shooting angle differs, the above numbering is to be set in correspondence with the shooting angle.

$$E = \sum_i \text{Penalty}(i) - k \times \text{area}(i) \quad (1)$$

Here, Area (i) represents the projection area of polygon i on the reference image, Penalty(i) represents the difference in the reference image number (label) between polygon i and the adjacent polygon, and k represents the coefficient of association.

More specifically, energy function E increases as the difference becomes greater between the reference image number assigned to the polygon adjacent to polygon i and the reference image number assigned to polygon i, and decreases as the projection area of polygon i on the reference image, i.e. the amount of texture information, increases.

Since the texture continuity is higher as the difference in the numbers of the reference images assigned to polygon i and the adjacent polygon becomes smaller to suppress the polygon boundary line, setting a minimum function E is equal to the assignment of the optimum reference image number to each polygon taking into account both the amount of texture information (the amount of color information) and the texture continuity.

Although the projection area of polygon i on the reference image is employed as the degree of the texture information amount in the above energy function, a structure can be employed in which evaluation is effected according to the inner product value between the surface normal vector of the polygon and the surface normal vector of the reference image as described in the first embodiment.

Regarding energy function E, coefficient of association k may be a constant or a function of each polygon (for example, a function of the area of each polygon).

Energy function E is not limited to the above-described structure. Any function that decreases in accordance with improvement in the continuity of the texture information assigned to target polygon i and an adjacent polygon, and that decreases in accordance with the increase of the amount of the texture information with respect to target polygon i can be used, in addition to the linear combination between the above function Penalty(i) and function area (i).

Figure 17:
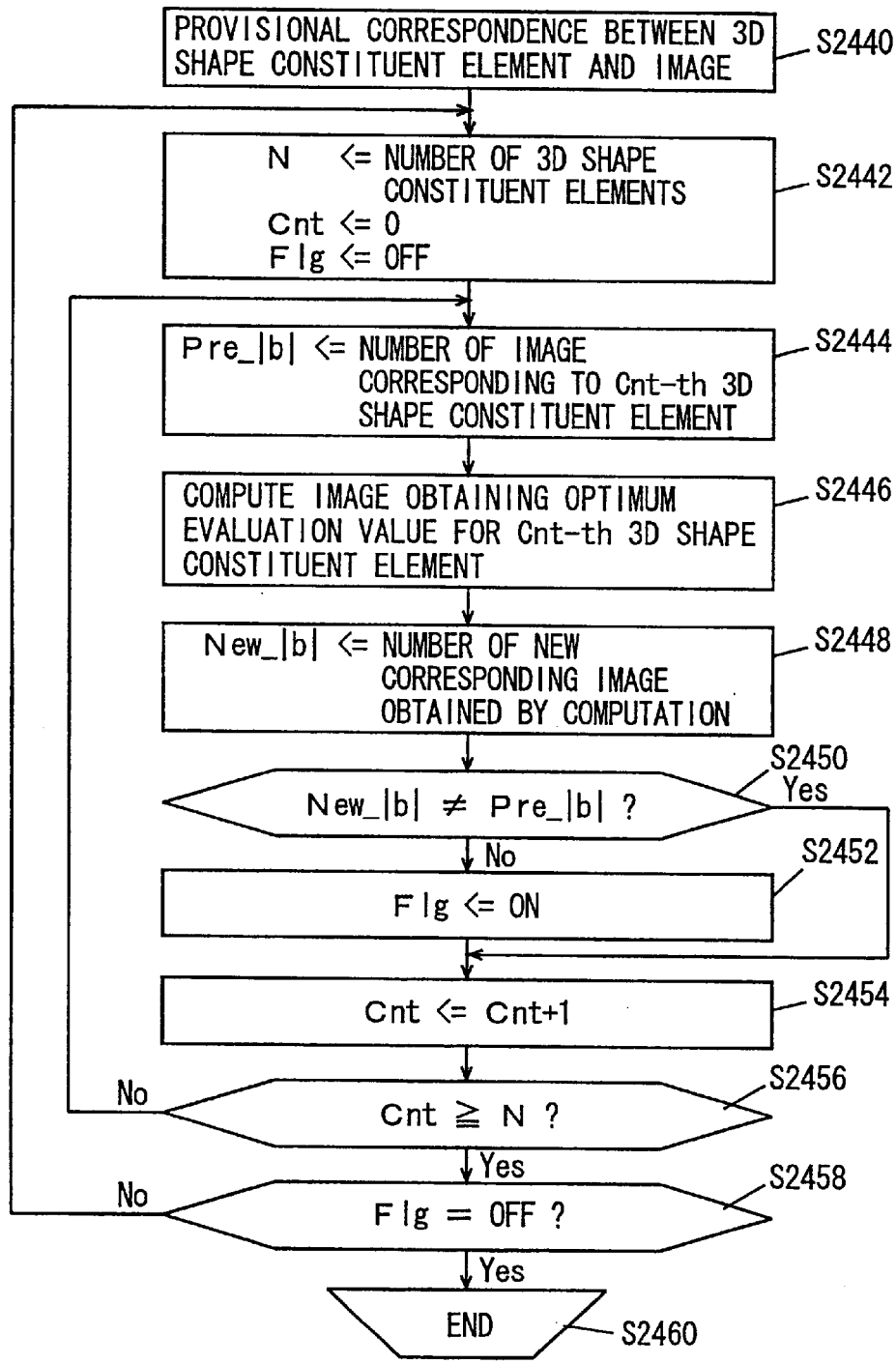
FIG. 17 is a flow chart showing the flow of the process of a texture information assignment method according to a third embodiment of the present invention.

FIG. 17 is a flow chart of the process to obtain the optimum value for the above energy function E with the iterative improvement process.

First, provisional correspondence between each polygon of the generated shape model 300 and the reference image number is carried out for initialization (step S2440).

Arithmetic logic unit 210 inserts the number of three-dimensional shape constituent elements into variable N, and initializes count variable Cnt to the value of 0. Also, flag variable Flg is set to OFF (step S2442).

The reference image number corresponding to the Cnt-th three-dimensional shape constituent element is inserted into variable Pre_lbl (step S2444).

Then, the corresponding reference image number is varied for the Cnt-th three-dimensional shape constituent element to extract the reference image number that minimizes energy function E (step S2446).

Then, the new corresponding reference image number obtained at step S2446 is inserted into variable New_lbl (step S2448).

Then, the value of variable New_lbl is compared with the value of variable Pre_lbl. When the values are not equal to each other (step S2450), determination is made that the label is altered by the minimization computation of energy function E. Flag variable Flg is set to ON (step S2452). Then, the value of count variable Cnt is incremented by 1 (step S2454).

When the values of variables New_lbl and Pre_lbl are equal, the flag variable is not altered, and only the value of count variable Cnt is incremented by 1 (step S2454).

When the value of count variable Cnt is smaller than the number of three-dimensional shape constituent elements N, control returns to the process of step S2444. If the value of count variable Cnt is equal or greater than the number of three-dimensional shape constituent elements N, control proceeds to the next process (step S2456).

Therefore, the process from step S2444 to step S2454 is repeated for all the three-dimensional shape constituent elements.

Then, flag variable Flg is compared with OFF. When flag variable Flg is not equal to OFF (step S2458), determination is made that the label has been changed at least once according to the minimization calculation of energy function E, i.e., that the correspondence setting of the label number that locally minimizes energy function E is not completed. Therefore, control returns to step S2442.

Flag variable Flg equal to OFF means that the label is not changed even when the operation of minimizing energy function E is carried out according to the process from step S2444 to step S2456. In other words, the current label number correspondence is settled so as to locally minimize energy function E. Thus, the process ends assuming that the optimum correspondence is completed (step S2460).

By the above process, texture information assignment is carried out that optimizes simultaneously the two conditions of selecting the reference image information having a great amount of texture information with each polygon and suppressing the polygon boundary line in the process of correspondence of a reference image number with respect to a plurality of polygons.

Thus, shape model 300 subsequent to assignment has a color closer to that of the real object and with a more natural texture continuity.

A similar effect can be achieved by operating computer 130 with a medium in which the program of step S2440 to step S2460 is recorded.

It is desirable to take into account an appropriate processing sequence for the repeated improvement process since the order will influence the eventual result of the improvement process. This is because the process is based on the assumption that, in improving the label number of each polygon in the iterative improvement process, the label number of an adjacent polygon is correct, or has high reliability. By carrying out sequentially the improvement process starting from a polygon of lower reliability, a more favorable improvement result can be obtained.

Evaluation of the reliability of the polygon can be based on the area of the polygon or the area of the polygon projected on the reference image.

This is because the reliability of the provisional correspondence of the reference image number carried out at step S2240 becomes lower as the polygon has a smaller area or has a smaller area projected on the reference image.

Fourth Embodiment

The texture information assignment method of the third embodiment takes into account both the texture information amount (color information amount), and suppression of the polygon boundary line, i.e., texture continuity.

However, in the event of picking up image information from a real object, the image information picked up from a particular direction may differ significantly even from the image information picked up from a nearby direction in the issue of glossiness due to the effect of illumination and the like.

Therefore, there is a case where the method by the third embodiment is not sufficient in order to assign texture information of higher texture continuity and suppressed polygon border line.

The texture information assignment method of the fourth embodiment is directed to assign texture information to a corresponding polygon from a plurality of reference images information, i.e. image information picked up from a plurality of directions, not from one reference image information with respect to one polygon.

Prior to the description of the texture information assignment method of the fourth embodiment, the method of storing texture information into color information storage unit 240 will be described in more detail.

FIG. 18 represents the concept of the method storing data into a color information storage unit.

Color information storage unit 240 stores the basic shape and texture of a three-dimensional shape constituent element. Here, the three-dimensional shape constituent element on the reference image information has a shape differing from the original shape since it is based on the shot shape.

It is therefore necessary to carry out shape transformation to store the color into color information storage unit 240.

Here, shape transformation in the case where the three-dimensional shape constituent element is a triangle will be described. Consider the case of storing the texture information of the base shape by the two dimensional discrete space. Let the vertices of the basic shape be (x0, y0), (x1, y1), (x2, y2), and the vertices of the three-dimensional shape constituent element projected on the reference image information be (X0, Y0), (X1, Y1), (X2, Y2). By subjecting these to one-order conversion with the following transformation matrix A and parallel displacement vector B, the projected triangular shape can be transformed into the original shape.

$$A = \begin{pmatrix} a & b \\ c & d \end{pmatrix}, B = \begin{pmatrix} e \\ f \end{pmatrix} \quad (2)$$

In this case, the texture information of a pixel (xn, yn) of the basic shape can be acquired from a pixel (Xn, Yn) on the reference image information computed by the following equation.

$$\begin{pmatrix} X_n \\ Y_n \end{pmatrix} = \begin{pmatrix} a & b \\ c & d \end{pmatrix} \begin{pmatrix} x_n \\ y_n \end{pmatrix} + \begin{pmatrix} e \\ f \end{pmatrix} \quad (3)$$

By the above so-called affine transformation, the texture information of the original polygon shape is acquired for the projected triangular polygon, and stored in color information storage unit 240.

Although a triangle is taken as the shape of the polygon in the above description, similar computation can be carried out for other shapes such as a rectangle.

The method of coordinate transformation can be carried out using projective transformation as well as the affine transformation. The projective transformation is computed by the following equation.

$$X_n = \frac{a_1 x_n + a_2 y_n + a_3}{a_7 x_n + a_8 x_n + 1}, Y_n = \frac{a_4 x_n + a_5 y_n + a_6}{a_7 x_n + a_8 x_n + 1} \quad (4)$$

As described above, texture information corresponding to the original polygon shape is stored in color information storage unit 240 irrespective of the shape of the polygon projected on the reference image information.

It is assumed that assignment of a reference image information number corresponding to polygon i is completed by the iterative improvement process for energy function E as indicated in the third embodiment.

The texture information assignment method of the fourth embodiment is directed to the implementation of further improving the texture continuity by carrying out a weighted mean process that will be described in the following subsequent to the completion of the label number assignment.

Figure 19:
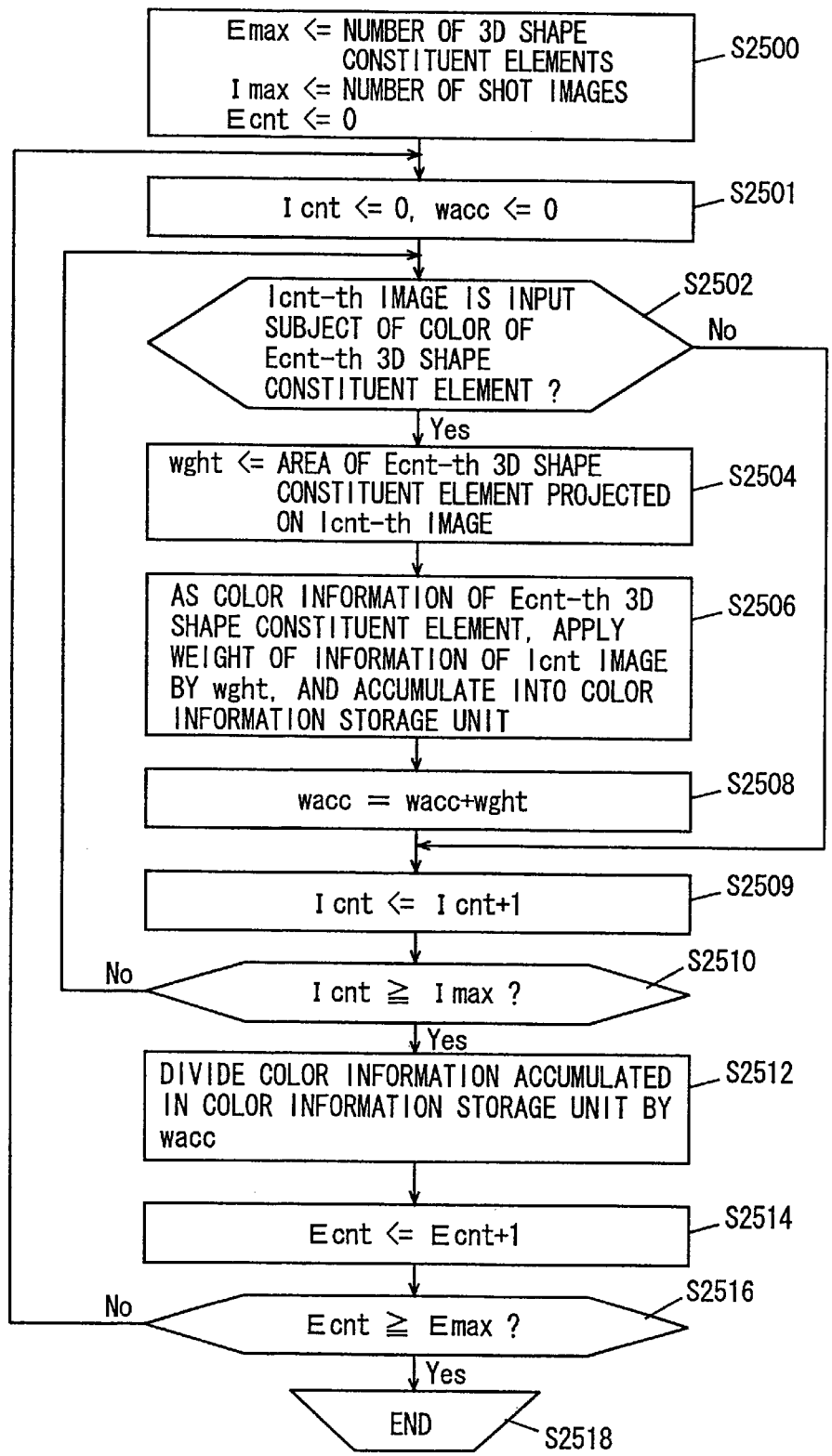
FIG. 19 is a flow chart showing the flow of the process of the texture information assignment method according to a fourth embodiment of the present invention.

FIG. 19 is a flow chart of the weighted mean process carried out after assignment of a reference image information number with respect to each polygon i.

Therefore, this process is continuous from step S2460 of the flow shown in FIG. 17.

Initialization is carried out by inserting the number of three-dimensional shape constituent elements into variable Emax, and the number of reference image information shot into variable Imax. The value of count variable Ecnt is initialized to 0 (step S2500).

Then, the values of count variable Icnt and variable wacc are initialized to 0 (step S2501).

Determination is made whether the Icnt-th reference image information is the input subject of the texture information of the Ecnt-th three-dimensional shape constituent element (step S2502).

If the Icnt-th image is the input subject of the texture information, not only the assigned image information that is already carried out by the assignment of a reference image number to a polygon (three-dimensional shape constituent element), but also a predetermined number of reference image information adjacent thereto, for example, the reference image information of one immediate preceding and succeeding images, are included in the input subject.

Then, the value of the area of the Ent-th three-dimensional shape constituent element projected on the Icnt-th reference image information is inserted into variable wght (step S2504).

The Icnt-th reference image information subjected to a weight of variable wght is stored in color information storage unit 240 as the texture information of the Ecnt-th three-dimensional shape constituent element (step S2506).

The values of variable wght are accumulated for variable wacc (step S2508). The value of count variable Icnt is incremented by 1 (step S2509).

The value of count variable Icnt is compared with the number of shot reference images Imax (step S2510).

When the value of variable Icnt is smaller than variable Imax, control returns to the process of step S2502.

When determination is made that the Icnt-th reference image information is not the input subject of the texture of the Ecnt-th three-dimensional shape constituent element at step S2502, control proceeds to step S2509. The value of variable Icnt is incremented by 1 (step S2509). Comparison between the values of variables Icnt and Imax is carried out.

By repeating the process from step S2500 to step S2510, texture information that is weighted from a predetermined number of reference image information is acquired with respect to the Ecnt-th three-dimensional shape constituent element. The texture information thereof is accumulated in color information storage unit 240.

Then, the texture information accumulated in color information storage unit 240 is divided by the value of variable wacc (step S2512).

By the above process, texture information with respect to the Ecnt-th three-dimensional shape constituent element is stored in color information storage unit 240 as the weighted mean of the texture information from the corresponding predetermined number of reference image information.

In the above process, the area of the polygon projected on the reference image information corresponding to respective assigned reference image numbers for each polygon and adjacent predetermined number of object image information is obtained, which is used as the weighting factor for the weighted mean process.

Here, it is assumed that the number of said object image information is Icnt, and the weighting factor corresponding to this object image information is wght (Icnt). The number of these image information is N.

The texture information of a polygon is formed of a plurality of pixels. Here, attention is focused on the pixel of one texture information. The position of this pixel projected on the object image information is obtained. The image information (pixel value of the projected position, i.e. color, density, or luminance) of that projected portion is subjected to the weighted mean process over all of the object image information, i.e. for N object image information. That value is taken as the pixel value of the texture information of interest. Assuming that the image information of the projected portion is V (Icnt), the weighted mean process corresponds to computation represented by the following equation.

$$[\Sigma wght(Icnt) \times v(Icnt)]/\Sigma wght(Icnt) \qquad (5)$$

This process is carried out for all the pixels corresponding to the texture information of the polygon. Then, the value of variable Ecnt is incremented by 1 (step S254).

Then, the value of count variable Ecnt is compared with the number of three-dimensional shape constituent elements Emax (step S2516).

When the value of variable Ecnt is smaller than the value of Emax, control returns to the process of step S2501. Thus, the weighted mean process of the texture information has been carried for all the three-dimensional shape constituent elements.

When the value of count variable Ecnt is equal to or greater than the number of three-dimensional shape constituent elements Emax (step S2516), the process of storing the texture information into color information storage unit 240 ends (step S2518).

More specifically, the texture information assignment method of the fourth embodiment is first carried out by the correspondence setting of a reference image information number (label number) for each polygon. The result of the weighted mean process according to the area of the three-dimensional shape constituent element projected on each reference image information for the reference image information corresponding to a predetermined number (for example, the current corresponding reference image information number and the preceding and succeeding images) of the reference image information number including the related reference image information number is assigned as the texture information of that three-dimensional shape constituent element.

By the weighted mean process of texture information from a predetermined number of reference image information, texture information for a corresponding polygon can be obtained. Therefore, texture information improved in texture continuity can be assigned to the relevant polygon.

For example, even in the case where the glossiness included in the color information for the relevant polygon in the reference image information picked up from a certain direction is particularly high due to the effect of illumination and the like when a real object is shot, the influence can be reduced by the weighted mean process.

A similar effect can be achieved by operating computer 130 with a medium in which the program from step S2500 to step S2518 is recorded as shown in FIG. 19.

Fifth Embodiment

The fourth embodiment applies texture information to a corresponding polygon from a predetermined number of adjacent reference image information after assignment of the reference image number that acquires the texture information is completed for each polygon.

However, from the standpoint of attaching great importance on the texture continuity, assignment of a reference image number for each polygon so as to set minimum the energy function E does not necessarily have to be carried out.

The texture information assignment method of the fifth embodiment is directed to assign texture information for a polygon (three-dimensional shape constituent element) from a plurality of reference image information having the texture information for that three-dimensional shape constituent element for each polygon.

For example, texture information can be assigned to a relevant polygon (three-dimensional shape constituent element) from all the reference image information having the texture information for that three-dimensional shape constituent element with respect to each polygon. Alternatively, reference image information can be selected at random or in an orderly manner regularly from the image information including the texture information for a relevant three-dimensional shape constituent element with respect to each polygon (three-dimensional shape constituent element), and assign texture information to the relevant polygon therefrom.

Figure 20:
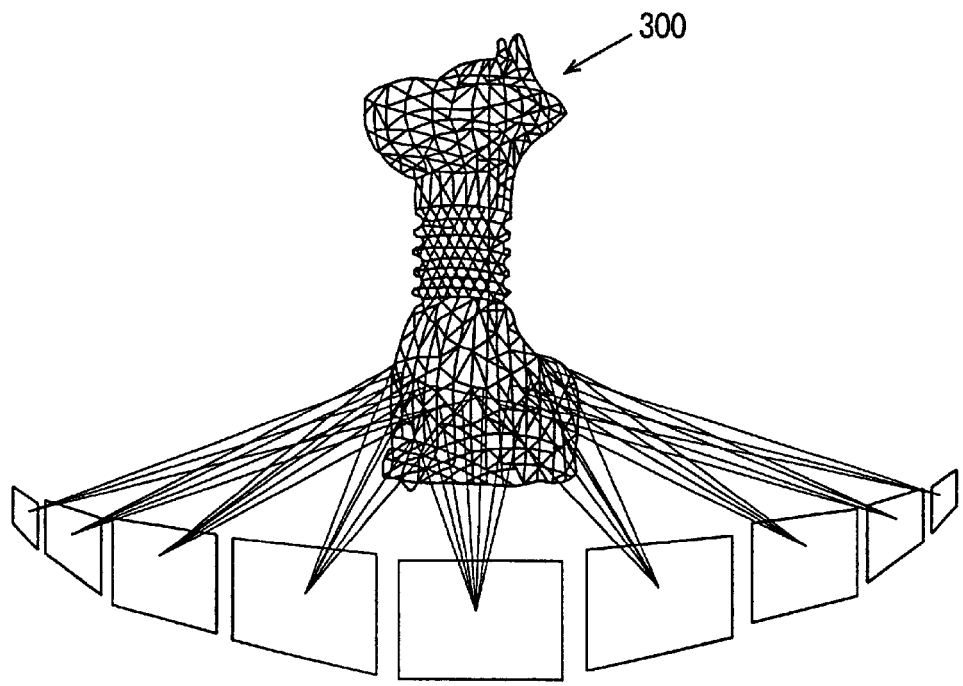
FIG. 20 is a diagram representing the concept of the texture information assignment method according to a fifth embodiment of the present invention.

FIG. 20 represents the concept of the texture information assignment method to a polygon. Texture information is assigned to the relevant polygon from all the reference image information that includes the texture information for the three-dimensional shape constituent element.

As described in the fourth embodiment, texture information corresponding to the original polygon shape is stored in color information storage unit 240 irrespective of the shape of the polygon projected on each reference image information.

When a particular polygon i is of interest, texture information can be acquired by carrying out the weighted mean process according to the projection area from all the reference image information having a projection area that is not 0.

Figure 21:
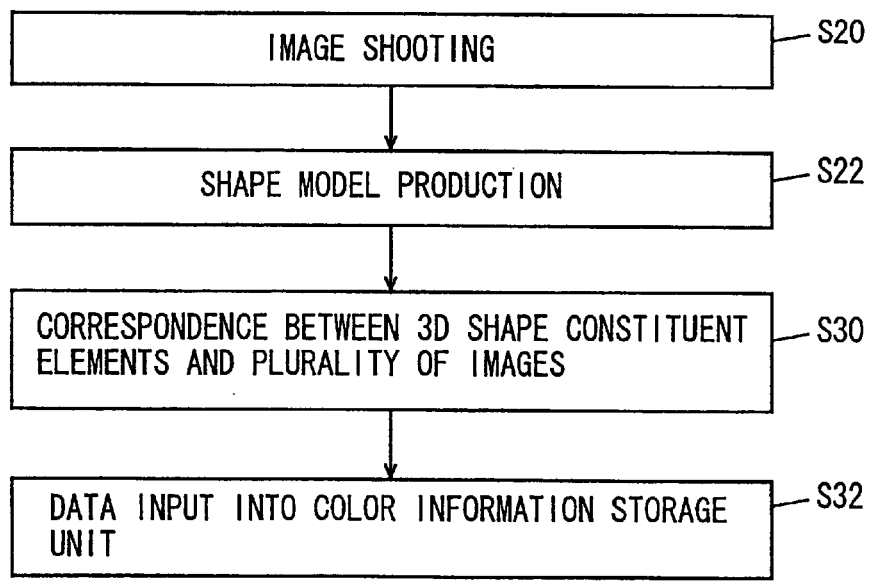
FIG. 21 is a flow chart showing a flow of the process of the texture information assignment method according to the fifth embodiment of the present invention.

FIG. 21 represents a flow chart of such a texture information assignment method.

After a plurality of images are shot with respect to an actual object (step S20 and shape model generation step S22), correspondence is set between each three-dimensional shape constituent element and the reference image information that has a projection area of the relevant three-dimensional shape constituent element that is not 0 (step S30).

By carrying out the weighted mean process according to the projected area for color information storage unit 240 according to the above correspondence, texture information is accumulated for each three-dimensional shape constituent element (step S32).

In the texture information assignment method of the fifth embodiment, the weighted mean process for a plurality of reference images information is carried out with the area of a three-dimensional shape constituent element projected on each of the plurality of reference images information as the weighting factor for every three-dimensional shape constituent element. The result of the weighted mean process obtained for each three-dimensional shape constituent element is assigned as the texture information to each three-dimensional shape constituent element.

By assigning texture information on each three-dimensional shape constituent element from all the reference image information that includes texture information, texture continuity is further improved.

Even in the case where the information of the reference image shot from a certain direction is considerably high in glossiness than in the information of a reference image shot from another direction due to the effect of illumination and the like, this influence of the texture information in the particular direction can be suppressed by applying the weighted mean process on the texture information from all the relating reference image information.

The present application is not limited to the above-described first to fifth embodiments in which texture information is assigned after converting shape model 300 into polygon data. The plane direction of the surface can be computed for the shape model 300 represented in voxels to assign the texture information.

It is to be noted that assigning texture information after conversion into polygon data is advantageous in that the amount of operation can be reduced significantly since the plane (polygon) oriented in the same direction can be processed at one time.

Sixth Embodiment

Figure 22:
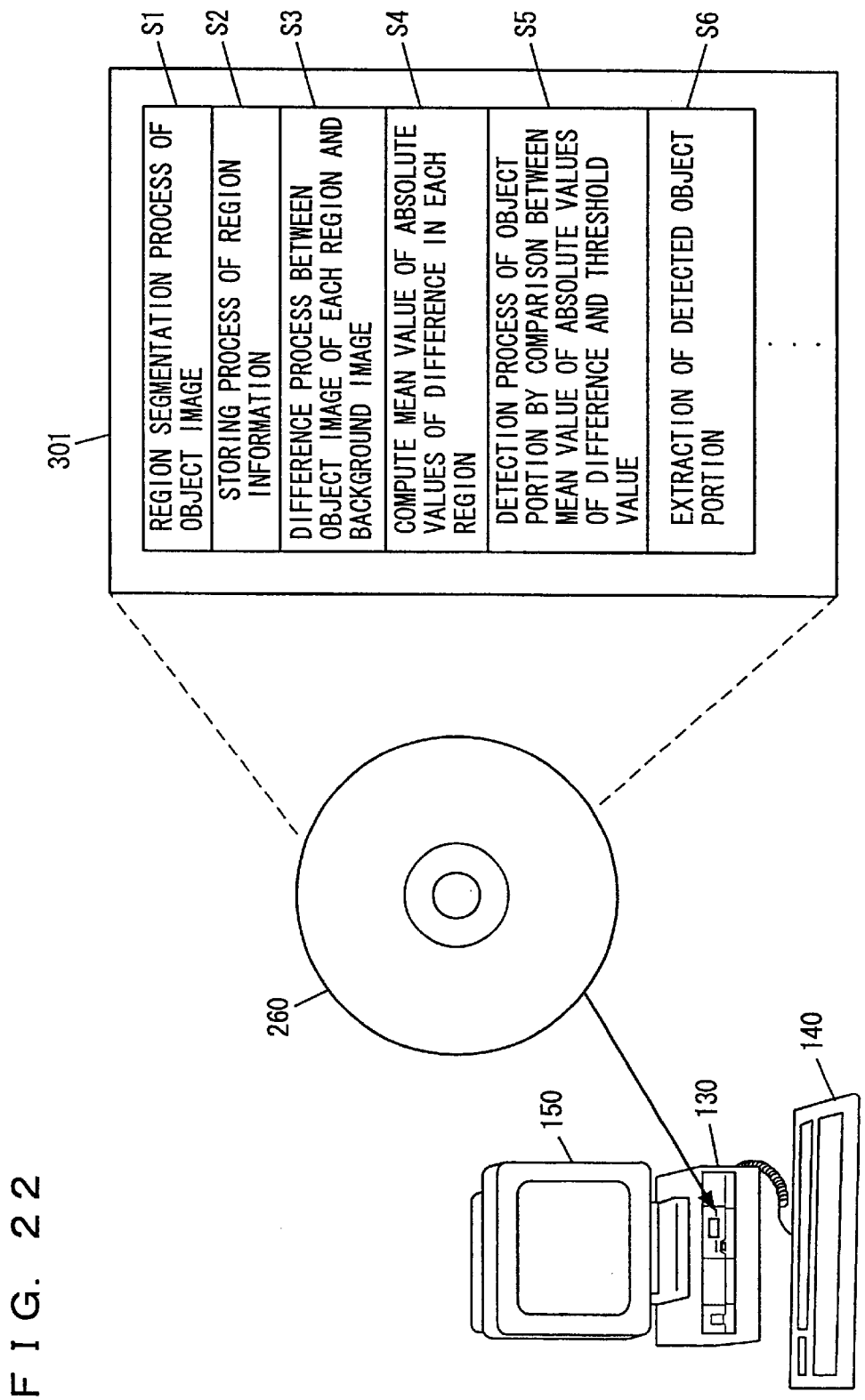
FIG. 22 is a diagram showing the entire structure of an object extraction apparatus (image cut out apparatus) according to a sixth embodiment of the present invention.

FIG. 22 shows an entire structure of an object extraction apparatus (image cut out apparatus) according to a sixth embodiment of the present invention. Referring to FIG. 22, the object extraction apparatus includes a computer 130. Computer 130 detects and extracts an object portion in the object image according to a program 301 recorded in a CD-ROM 260. Program 301 includes a step S1 of carrying out the region segmentation process of an object image, a step S2 of the storage process of region information, a step S3 of the difference process between the object image and the background image for each region, a step S4 of obtaining the mean value of the absolute values of difference in each region, a step S5 of the detection process of an object portion by comparison between the mean value of absolute values of difference and a threshold value, and a step S6 of extracting the detected object portion. The details of steps S1–S6 will be described afterwards.

Figure 23:
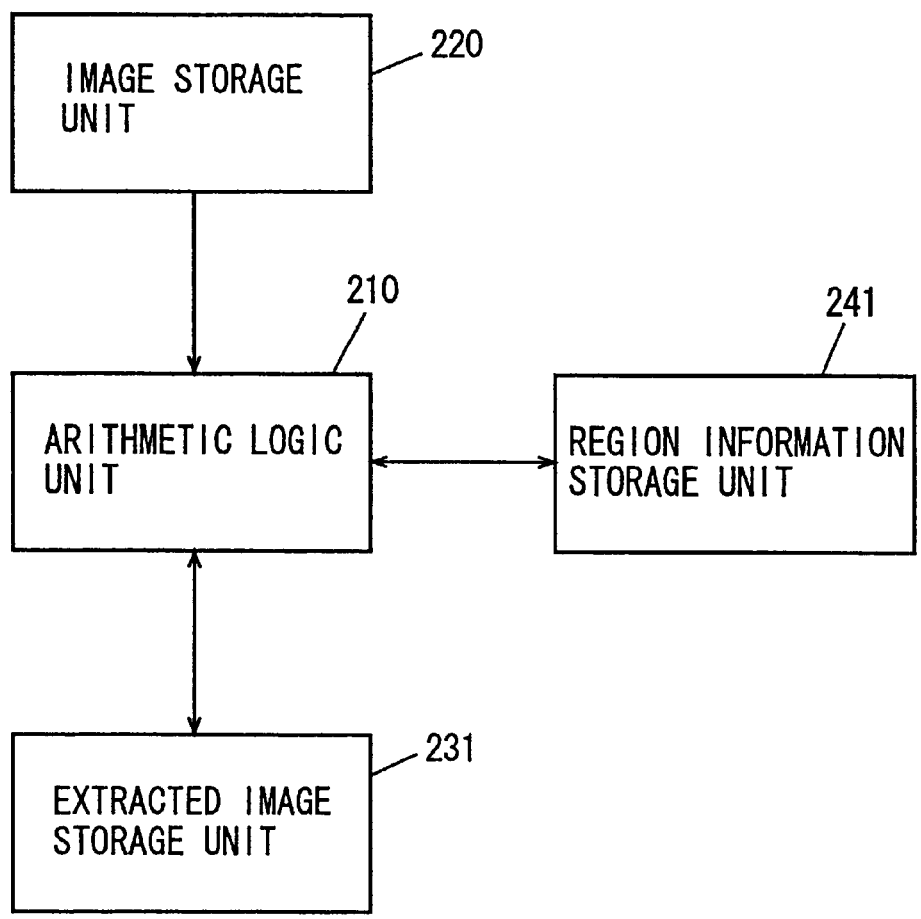
FIG. 23 is a block diagram schematically showing an object extraction apparatus (image cut out apparatus) according to the sixth embodiment of the present invention.

FIG. 23 is a block diagram schematically showing an object extraction apparatus (image cut out apparatus) according to a sixth embodiment of the present invention. Referring to FIG. 23, computer 130 corresponding to an object extraction apparatus includes an image storage unit 220, an arithmetic logic unit 210, a region information storage unit 241, and an extracted image storage unit 231. The details of the units of 220, 210, 231, and 241 will be described afterwards.

Figure 24:
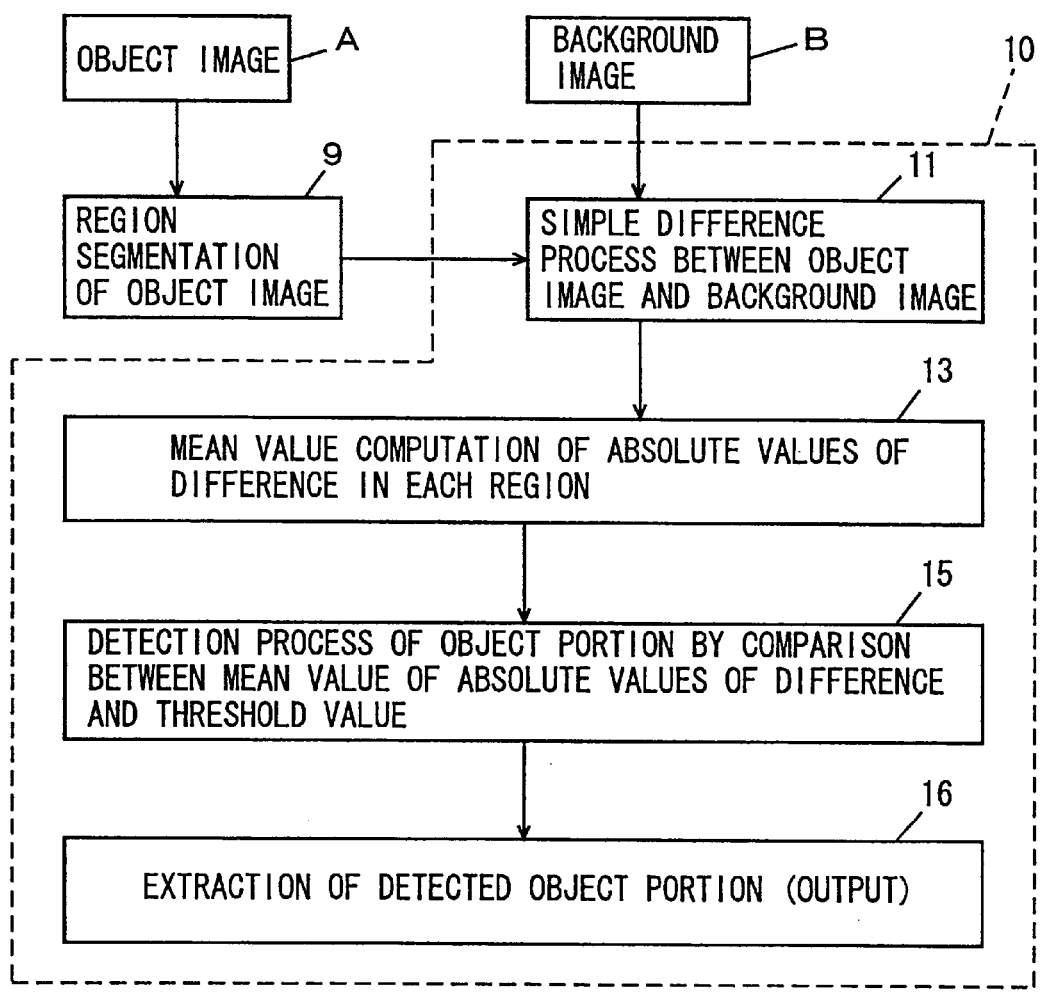
FIG. 24 is a block diagram schematically showing the arithmetic logic unit of FIG. 22.

FIG. 24 is a block diagram schematically showing arithmetic logic unit 210 of FIG. 23. Referring to FIG. 24, arithmetic logic unit 210 includes a region segmentation unit 9 and an extraction unit 10. Extraction unit 10 includes a difference process unit 11, a mean value output unit 13, a threshold value process unit 15 and an object portion extraction unit 16. An object image A is obtained by shooting an object of interest together with the background by a pickup apparatus such as a camera. Background image B is obtained by shooting only the background of the object of interest by a pickup apparatus such as a camera. Background image B and object image A are stored in image storage unit 220 of FIG. 23. Although the background to be shot is generally located behind the object of interest, some may be located in front of the object of interest.

Region segmentation unit 9 divides object image A into a plurality of regions (step S1 of program 301 in FIG. 22). The information associated with region segmentation is stored in region information storage unit 241 of FIG. 23 (step S2 of program 301 in FIG. 22). Difference processing unit 11 carries out the difference process between object image A and background image B in the region level obtained by region segmentation unit 9 to acquire the difference (step S3 of program 301 of FIG. 22). The difference is the difference in color information between object image A and background image B obtained on a pixel-by-pixel basis. Mean value output unit 13 obtains the absolute value of the difference to output the mean value of the absolute values of the difference in region level (step S4 of program 301 of FIG. 22). In other words, mean value output unit 13 provides the mean value of the absolute values of the difference for every region. Threshold value processing unit 15 compares the mean value of the absolute values of the difference in each region with a threshold value to detect a region having a mean value of absolute values of the difference greater than the threshold value as the object portion (step S5 of program 301 in FIG. 22). The threshold value is set empirically. Object portion extraction unit 16 extracts the object portion detected by threshold value processing unit 15 (step S6 of program 301 of FIG. 22). In other words, object portion extraction unit 16 outputs the object portion detected by threshold value processing unit 15. The image of the extracted object portion is stored in extracted image storage unit 231 of FIG. 23.

The region division carried out by region segmentation unit 9 will be described in detail now. Region segmentation is carried out by the generally employed edge extension method, region edge common usage method, Facet model method as described in, for example, "Recent Tendency in Image Processing Algorithm", pp. 227–233, Shin Gijitsu Communications, O plus E, edited by Takagi et al. Here, the edge extension method will be described. First, the edge intensity and edge direction is computed for each pixel from the first-order differential. Secondly, an edge element having the maximum value and that is greater than a predetermined value (called strong edge element) is extracted by the maximal value suppression process and threshold process for the edge intensity. At this stage, the strong edge element is not necessarily continuous. Thirdly, the edge is extended with the strong edge element that is the end point as the origin. This is the edge extension method.

Figure 25A:
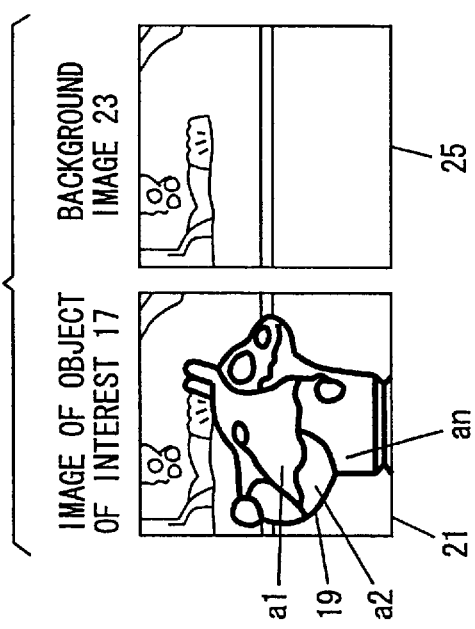
FIGS. 25A–25C are diagrams to describe in detail the process carried out by the difference processing unit, the mean value output unit, and the threshold value processing unit of FIG. 24.
Figure 25B:
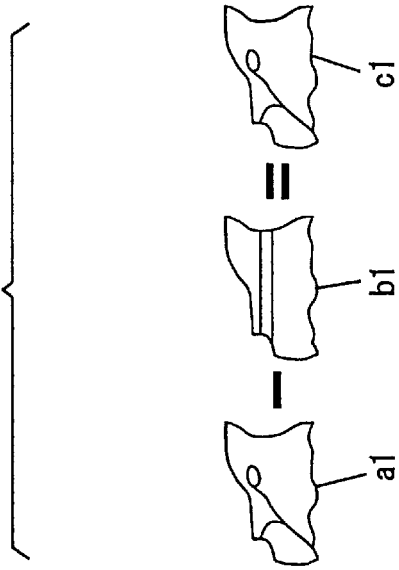
Figure 25C:
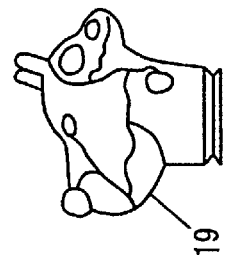

FIGS. 25A–25C are diagrams to describe in detail the process of difference processing unit 11, mean value output unit 13, threshold value processing unit 15, and object portion extraction unit 16 of FIG. 24. Referring to FIG. 25A, object image 17 is formed of an object portion 19 and a background portion 21. Background image 23 is formed of only background 25. Object image 17 is divided into a plurality of regions a1–an by region segmentation unit 9 of FIG. 24.

The operation of difference processing unit 11 of FIG. 24 will be described with region a1 as the target. Referring to FIG. 25B, the difference in color information between each pixel of region a1 and each pixel of region B1 of background 25 corresponding to region a1 is obtained. Accordingly, a set of difference c1 in region a1 is obtained. Mean value output unit 13 of FIG. 24 obtains the absolute value of the difference forming the difference set c1, and obtains the mean value of the absolute values of the difference. Threshold value processing unit 15 of FIG. 24 compares the mean value of the absolute values of the difference forming difference set c1 with the threshold value. When the mean value is equal to or greater than the threshold value, region a1 corresponding to difference set c1 is detected as the object portion. Difference processing unit 11, mean value output unit 13 and threshold value processing unit 15 carry out the above-described difference process, output process of the mean value of the absolute values of difference, and the threshold value process for all regions a-an. Object portion extraction unit 16 extracts the object portion detected by threshold value processing unit 15 from object image 17. FIG. 25C shows object portion 19 extracted as described above. Therefore, the unwanted portions such as background portion 21 is removed. When any object located in front of the target object is included in object image 17, that portion will be removed as an unwanted area.

According to the object extraction apparatus of the sixth embodiment of the present invention, the object image is divided into a plurality of regions, the mean value of the absolute values of the difference is obtained on a region-by-region basis, and a region having an mean value equal to or greater than the threshold value is extracted as the object portion. Therefore, according to the apparatus, method, and program of object extraction of the sixth embodiment, a portion of the target object having a color identical to that of the background, if any, can be detected and extracted as an object portion at the pixel level as long as there is a color differing from that of the background at the region level. The task carried out manually can be reduced. Also, a special shooting environment in which a backboard of the same color must be used is dispensable.

Another example of the difference process carried out by difference processing unit 11 of FIG. 24 will be described hereinafter. In contrast to the above description in which the difference is obtained in the region level, difference processing unit 11 can obtain the difference, not in the region level, but by the difference process between the entire object image and the entire background image. Then, mean value output unit 13 provides an mean value of the absolute values of the difference in the region level obtained at region segmentation unit 9.

Alternatively, the mean value of the pixels in each region of the object image can be computed. Then, the absolute value of the difference between that mean value and the mean value of the pixels in the region of the background image corresponding to that region is computed. By comparing the absolute value of the difference with a predetermined value, the region having an absolute value of difference equal to or greater than the predetermined value can be extracted as the object portion.

Although region segmentation is effected on the basis of an edge in the above sixth embodiment, the present invention can be carried out with the portion of the same color as the same region. Also, a plurality of region segmentation methods can be combined.

Although a color image was taken as an example in the above sixth embodiment, the present invention is applicable to a black and white image. Also, density information (luminance signal level) can be used instead of the above color information (color signal level).

Although a region that is equal to or greater than the threshold value is directly taken as the object portion in the above sixth embodiment, the present invention is not limited to the process carried out only one. For example, the object portion detected by the first process can be taken as a provisional object portion, and the remainder as a provisional background portion. Then, the brightness of the provisional background portion in the object image is compared with the brightness of the region of the background image corresponding to the provisional background portion to detect change in the illumination status between the background image and the input image. Accordingly, the luminance in the object image can be corrected uniformly to carry again the same process.

Although the value of the threshold value is constant in the sixth embodiment, the value of the threshold can be modified to differ between the center area and the peripheral area of the image. Alternatively, the value of the threshold can be modified according to the area size of the region. Alternatively, the value of the threshold value can be modified according to whether there is an object portion in the neighborhood or not if the process is to be carried out again.

Although the above sixth embodiment averages the absolute value of the difference in each region and compares the obtained value with a threshold value, determination can be made in another way. For example, determination can be made whether the region is an object portion or not taking into account the degree of variation of the values of difference.

Although the object portion is eventually extracted in the sixth embodiment, the present invention is not limited to this. For example, the invention is applicable to determine whether there is an object or not, as well as the extraction process. Such determination can be used in the application of sensing an intruder for a building monitor system.

Seventh Embodiment

Figure 26:
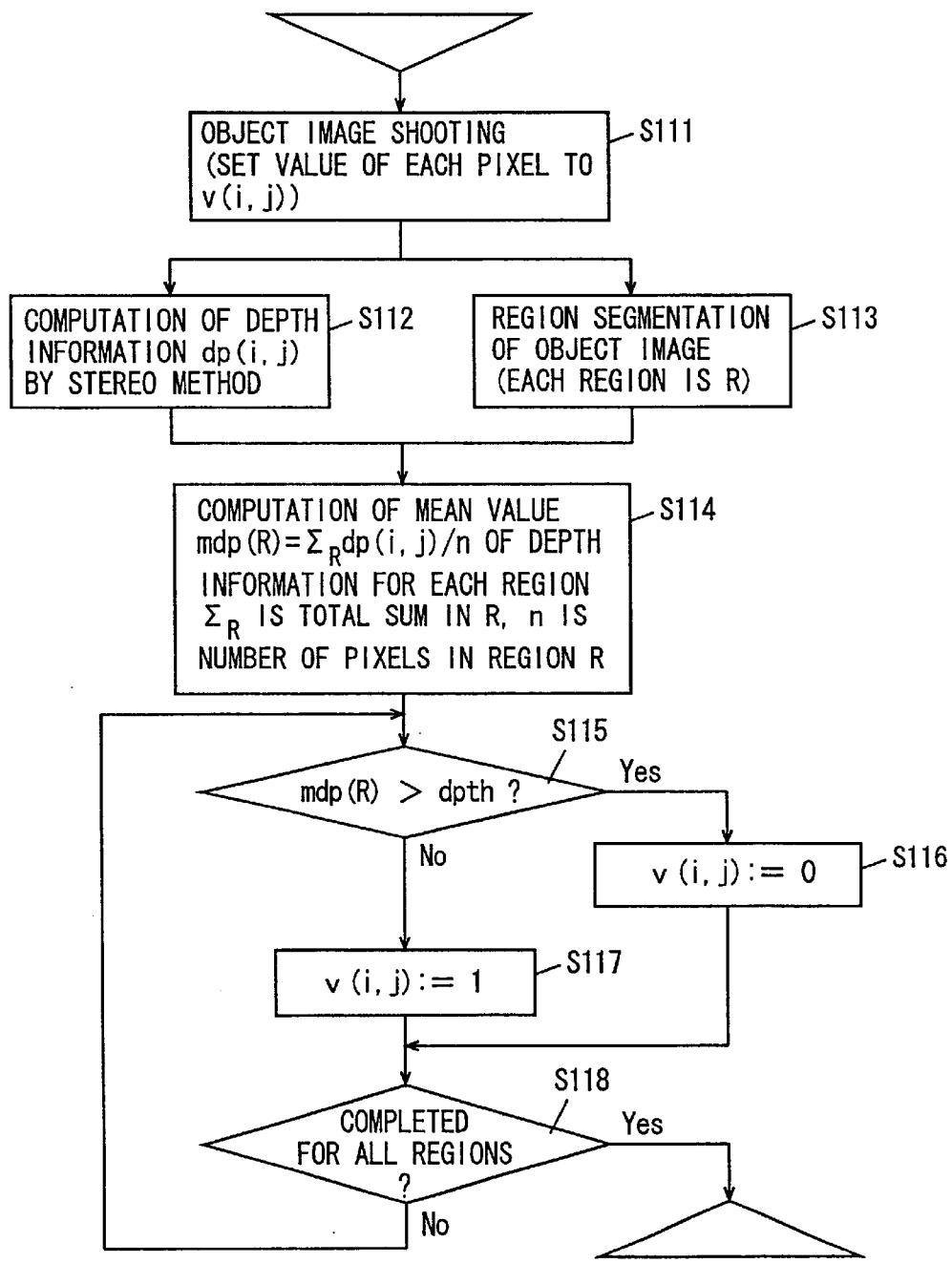
FIG. 26 is a flow chart showing main components of an object extraction apparatus according to a seventh embodiment of the present invention.

FIG. 26 is a flow chart of the entire structure of the object extraction apparatus according to a seventh embodiment of the present invention. Steps S112–S118 of FIG. 26 corresponds to the program for computer 130 of extracting an object portion with the background portion removed from the object image obtained by shooting an object of interest. This program is recorded in CD-ROM 260.

This program includes a step S112 of computing the depth information dp (i, j) of the object image obtained at step S111 for every pixel (i, j) by the stereo method, a step S113 of dividing the object image into a plurality of regions R, a step S114 of computing mean value mdp (R) of depth information for every region R, a step S115 of comparing mean value mdp (R) of the depth information with a predetermined threshold value dpth, a step S116 of removing as the background portion a region R if mean value mdp (R) of the depth information is greater than threshold value dpth, more specifically, setting value v (i, j) of each pixel in that region R to 0, a step S117 of extracting region R as the object portion when mean value mdp (R) of the depth information is smaller than threshold value dpth, specifically setting value v (i, j) of each pixel in region R to 1, and a step S118 of determining whether the process of steps S115–S117 is carried out for all the regions R. Here, luminance (density), color information, or a combination thereof can be used as the value of the pixel.

The operation of the object extraction apparatus according to the seventh embodiment of the present invention will be described with reference to the flow chart of FIG. 26.

At step S111, an object of interest is shot together with the background using a digital still camera and the like to obtain an object image. This object image is stored in image storage unit 220 in computer 130. Accordingly, v (i, j) is obtained as the value of each pixel (i, j). Although a still camera that shoots a still picture is used, a video camera, a digital camera, or the like that shoots a motion picture can be used instead.

At step S112, the depth information dp (i, j) of each pixel (i, j) is computed according to the stereo method and the like. This stereo method is disclosed in, for example, "Computer Vision", Prentice Hall, pp. 88–93 by D. H. Ballard et al. According to the stereo method, an object of interest is shot from two viewpoints remote by a predetermined distance. A corresponding point between the two obtained object images is determined to compute the depth information dp (i, j) using the reverse projection transformation method or the simple triangulation method. An application of the stereo method is disclosed in, for example, Japanese Patent Laying-Open No. 8-331607. Although the stereo method is employed to compute the depth information, the shape-from-motion method based on the motion, the iterative improvement method, (one kind of relaxation method) taking into consideration both the similarity and continuity, and the like can be used instead.

At step S113 parallel to step S112, the shot object image is divided into a plurality of regions R as in the above sixth embodiment. The depth information computation of step S12 and the region segmentation of step S13 do not have to be carried out at the same time. Computation of the depth information can be followed by the region segmentation, or vice versa.

FIG. 27A shows the object image divided into a plurality of regions R. FIG. 27B shows an image with the depth information represented by the luminance of the pixel. A pixel of a higher luminance indicates that the distance from the shooting portion is closer whereas a pixel of lower luminance indicates that the distance from the shooting position is more distant. Therefore, the object portion is bright and the background portion is dark.

At step S114, the mean value mdp R) of the depth information is computed for each region R according to the following equation (6).

$$mdp(R) = \frac{\sum_R dp(i, j)}{n} \quad (6)$$

ΣR: total sum in region R
n: number of pixels in region R

At step S115, the computed mdp (R) of the depth information is compared with a threshold value dpth. This threshold value dpth is determined in advance empirically.

When mean value mdp (R) of depth information is greater than threshold value dpth, the value v (i, j) of all the pixels within that region R is set to 0. In other words, that region R is removed from the object image as the background portion. When mean value mdp (R) of the depth information is smaller than threshold value dpth, the value v (i, j) of all the pixels in that region R is set to 1 at step S117. In other words, that region R is extracted as the object portion from the object image.

At step S118, determination is made whether the process of steps S115–S117 has been carried out for all the regions R. When the above process has been carried out from all the regions R, an object as shown in FIG. 27C is obtained.

According to the seventh embodiment, the mean value of the depth information is computed for every region R of the object image, and a region having a mean value smaller than the predetermined threshold value is extracted as the object portion. Therefore, by removing only the background portion from the object image, the object portion can be properly cut out with the contour thereof as shown in FIG. 27C. Furthermore, it is not necessary to shoot only the background of the object of interest as an additional step since the depth information is used.

Eight Embodiment

FIG. 28 is a flow chart showing the main components of an object extraction apparatus according to an eighth embodiment of the present invention. In FIG. 28, steps S222, S224–S227 are stored in CD-ROM 260 as a program of removing the background portion from the object image to extract the object portion according to an object image obtained by shooting an object of interest and a plurality of background images obtained by shooting only the background of the object of interest a plurality of times.

This program includes a step S222 of computing for every pixel the mean value m (i, j) and the standard deviation σ (i, j) of pixels located at the same coordinates in the plurality of background images obtained at step S221, a step S224 of computing an absolute value |v (i, j)−m (i, j)| (simply referred to as "difference" hereinafter) of the difference between value v (i, j) of each pixel in the object image obtained at step S223 and the mean value m (i, j) of the pixels in the background images corresponding to that pixel, and comparing that difference |v (i, j)−m (i, j)| with k times the standard deviation σ (i, j), a step S225 of setting, when difference |v (i, j)−m (i, j)| is greater than kσ (i, j), value (i, j) of that pixel to 0 to remove that pixel as the background portion, a step S226 of, when difference |v (i, j)−m (i, j)| is greater than kσ (i, j), extracting that pixel as an object portion, i.e. setting value v (i, j) of that pixel to 1, and step S227 of determining whether the process of step S224–S226 has been carried out for all the pixels.

The operation of the object extraction apparatus of the eighth embodiment will be described with reference to FIG. 28.

At step S221, only the background of an object of the interest is shot for a plurality of times using a digital still camera from the same viewpoint to obtain a plurality of background images. Taking into consideration the accuracy, the number of background images to be obtained is preferably at least 3. Taking into consideration the simplicity, this number of background images is preferably ten.

At step S222, the mean value m (i, j) and the standard deviation σ (i, j) of the pixels located at the same coordinate in the plurality of background images are computed for each pixel according to the following equations (7) and (8). Even in the case where an abnormal value is obtained as the pixel value of the background image due to variation in the conversion characteristics of the A/D converter of A/D converting the image signal, variation in the illumination characteristic, jitter, and the like, a stable background image can be obtained since the average of the pixel values is computed.

$$m(i, j) = \frac{\sum v(i, j)}{N} \quad (7)$$

$$\sigma(i, j) = \sqrt{\frac{\sum v(i, j)^2}{N} - \left(\frac{\sum v(i, j)}{N}\right)^2} \quad (8)$$

Here, N is the number of pixels in all the regions R of the object image.

At step S223, an object of image is shot to obtain an object image. Here, v (i, j) is obtained as the value of each pixel of the object image.

At step S224, the difference |v (i, j)−m (i, j)| between value v (i, j) of each pixel in the object image and mean value m (i, j) of pixels of the background images corresponding to that pixel is computed.

When the difference |v (i, j)−m (i, j)| is smaller than kσ (i, j), value v (i, j) of that pixel is set to 0 at step S225. As a result, that pixel is removed from the object image as the background portion. When difference |v (i, j)−m (i, j)| is greater than kσ (i, j), value v (i, j) of the pixel is set to 1 at step S226. As a result, that pixel is extracted as the object portion from the object image. Here, k is preferably approximately 3.

At step S227, determination is made whether the process of steps S224–S226 has been carried out for all the pixels. When the above process has been carried out for all the pixels, this program ends.

According to the above eighth embodiment, the mean value of pixels is computed according to the plurality of background images. Therefore, the effect of the conversion characteristic of the A/D converter for A/D converting the image signal and the illumination characteristics can be alleviated. Furthermore, since the standard deviation of the pixels in a plurality of background images is used as the threshold value to determine between an object image and a background image, an appropriate threshold value can be set automatically. Thus, the object portion can be properly extracted by removing only the background portion from the object image.

Ninth Embodiment

Figure 29:
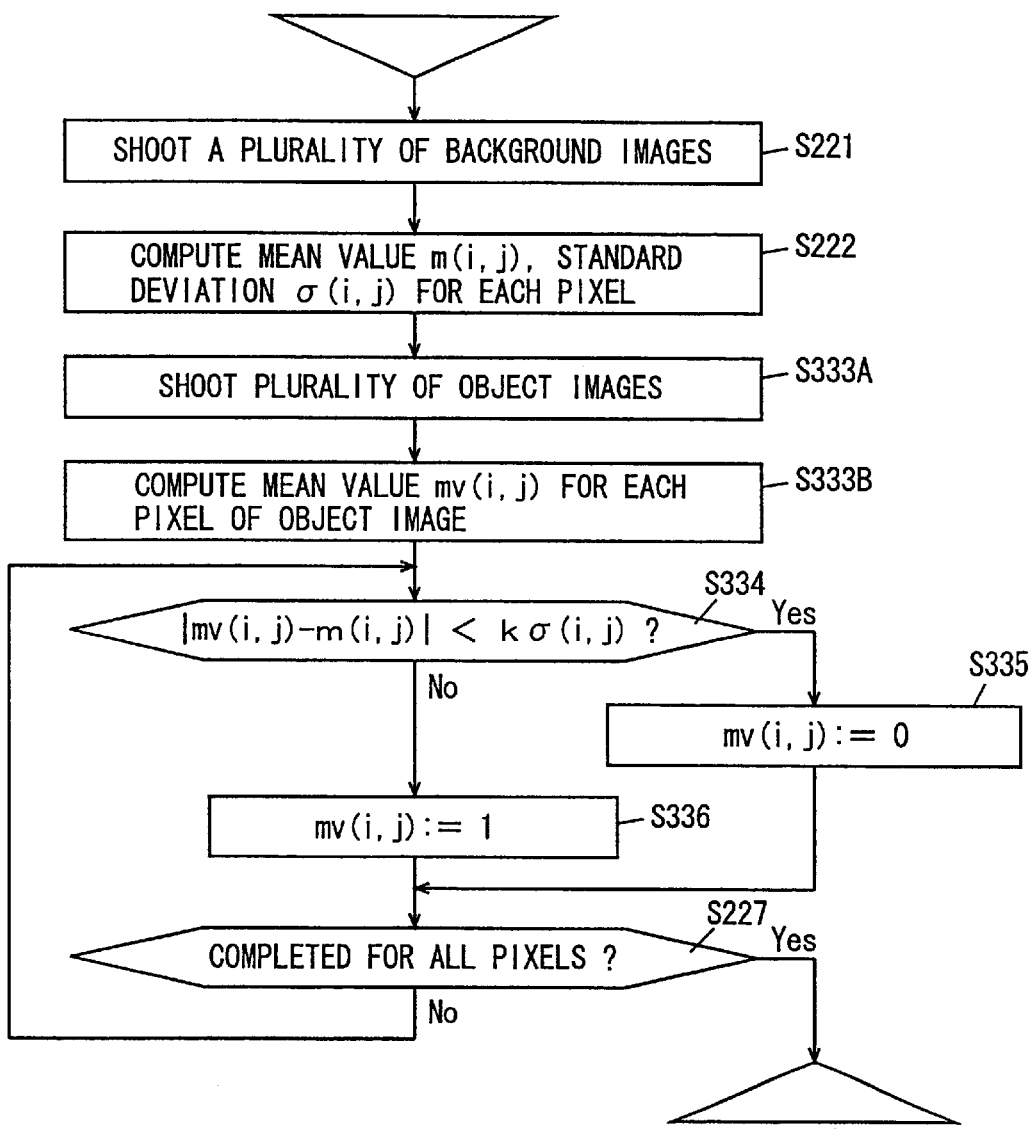
FIG. 29 is a flow chart showing main components of an object extraction apparatus according to a ninth embodiment of the present invention.

FIG. 29 is a flow chart showing the main components of an object extraction apparatus according to a ninth embodiment of the present invention. In FIG. 29, steps S222, S333B–S336, and S227 are a program of having computer 130 remove the background portion from the object image to extract the object portion according to an object image obtained by shooting an object of interest and a plurality of background images obtained by shooting only the background of the object of interest for a plurality of times. This program is stored in CD-ROM 260.

Although the object image is shot only once to obtain one object image at step S223 in the previous eighth embodiment, the object of image is shot a plurality of times at step S333A of the ninth embodiment to obtain a plurality of object images. Therefore, a step S333B is provided to compute mean value mv (i, j) of the pixels located at the same coordinate at the plurality of object images for each pixel. In steps S334–S336, the mean value mv (i, j) of the pixels is used instead of value v (i, j) of the pixel shown in FIG. 28. Therefore, mean value mv (i, j) of the pixels located at the same coordinate in the plurality of object images obtained at step S333A is computed for each pixel.

At step S334, the difference |mv (i, j)−m (i, j)| between mean value mv (i, j) of each pixel in the object image and the mean value m (i, j) of the pixels in the background image corresponding to that pixel is computed. That difference |mv (i, j)−m (i, j)| is compared with kσ (i, j).

When difference |mv (i, j)−m (i, j)| is smaller than kσ (i, j), mean value mv (i, j) of that pixel in the object image is set to 0 at step S335. As a result, that pixel is removed as the background portion. When difference |mv (i, j)−m (i, j)| is greater than kσ (i, j), mean value mv (i, j) of the pixel of the object image is set to 1 at step S336. As a result, that pixel is extracted as the object portion from the object image.

According to the above ninth embodiment, a plurality of object images obtained by shooting the target object for a plurality of times is used. Therefore, a robust object image can be obtained similar to that of the background image. Thus, the object portion is extracted more accurately with the background portion removed from the object image.

Tenth Embodiment

Figure 30:
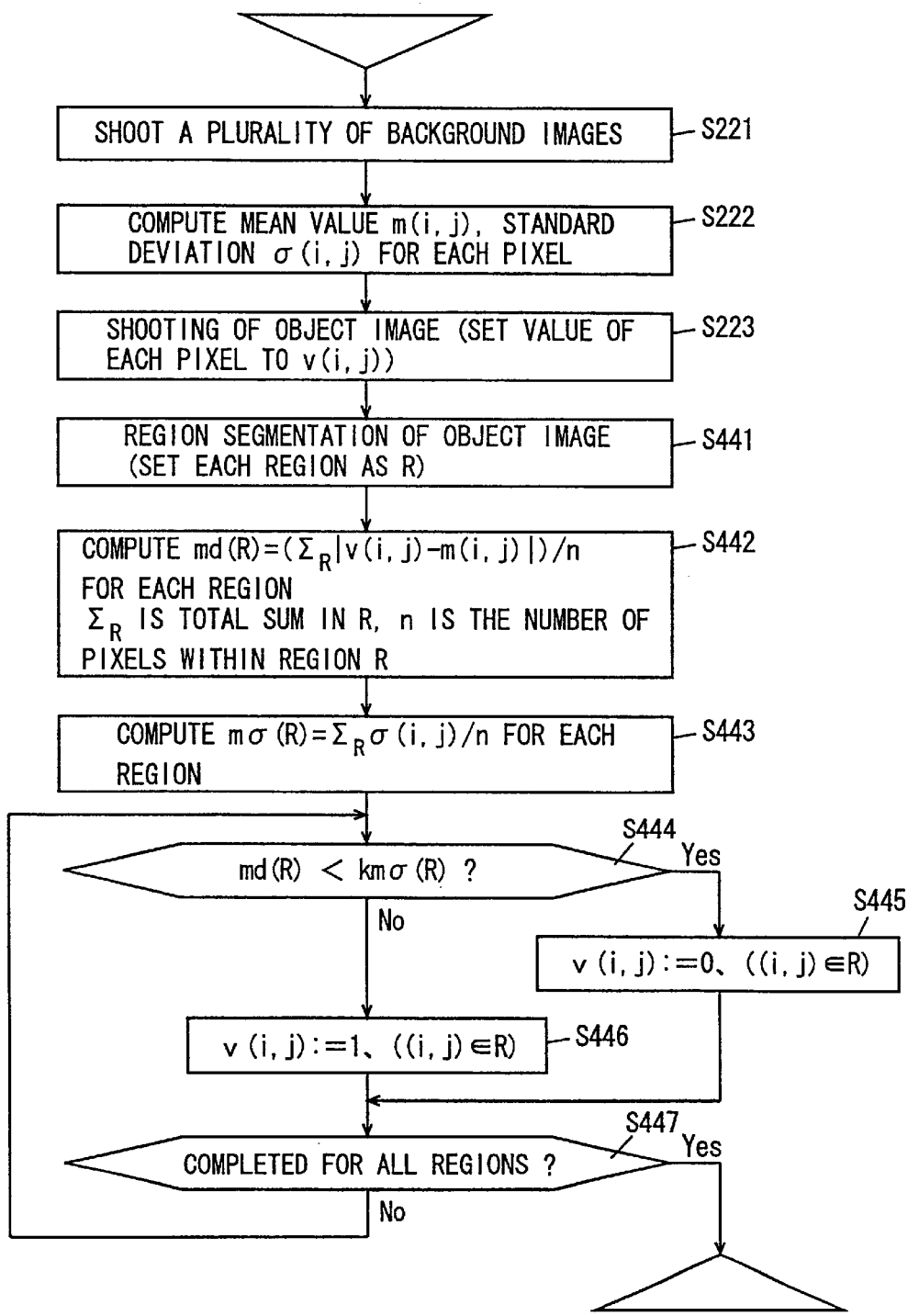
FIG. 30 is a flow chart showing main components of an object extraction apparatus according to a tenth embodiment of the present invention.

FIG. 30 is a flow chart showing the main components of an object extraction apparatus according to a tenth embodiment of the present invention. In FIG. 30, steps S222, S441–S447 are a program to have computer 130 remove the background portion from the object image to extract an object portion according to an object image obtained by shooting an object of interest and a plurality of background images obtained by shooting only the background of the object of the interest for a plurality of times. The program is stored in CD-ROM 260.

In contrast to the fifth embodiment of FIG. 28 where the object image is processed for each pixel, the object image of the present tenth embodiment is divided into a plurality of regions R, which are processed individually.

The program includes a step S441 dividing the object image obtained at step S223 into a plurality of regions R, a step S442 computing the difference between value v (i, j) of each pixel in each region R of the object image and mean value m (i, j) of the corresponding pixels in region R of the background image corresponding to that region R, and computing the mean value md (R) of the difference represented by the following equation (9) for each region R, and a step S443 computing for each region R the mean value mσ (R) of the standard deviation computed at step S223 according to the following equation (10).

$$md(R) = \frac{\sum_R |v(i, j) - m(i, j)|}{n} \quad (9)$$

-continued $$m\sigma(R) = \frac{\sum_R \sigma(i, j)}{n} \quad (10)$$

At steps S444-S446, the mean value md (R) of the difference is used instead of difference |v (i, j)–m (i, j)| of FIG. 28. Also, mean value σ (R) of the standard deviation is used instead of standard deviation σ (i, j). The object image obtained at step S223 is divided into a plurality of regions R at step S441.

At step S442, the difference |v (i, j)–m (i, j)| between value v (i, j) of each pixel in each region of the object image and mean value m (i, j) of corresponding pixels in region R of the background images corresponding to that region R is computed. A mean value md (R) of difference is computed for each region R.

At step S443, mean value mσ (R) of the standard deviation σ (i, j) obtained at step S222 is computed for each region R.

At step S444, the difference mean value md (R) is compared with kmσ (R). When the difference mean value md (R) is smaller than kmσ (R), value v (i, j) of all the pixels in that region R is set to 0 at step S445. As a result, region R is removed from the object image as the background portion. When difference mean value md (R) is greater than kmσ (R), value v (i, j) of the pixels in that region R are all set to 1 at step S446. As a result, that region R is extracted as an object portion from that object image.

At step S447, determination is made whether the process of steps S444–S446 is carried out for all regions R. When the above process has been carried out for all the regions R, the program ends.

According to the above tenth embodiment, the object of interest is divided into a plurality of regions R, the mean value md (R) of the difference between the value of each pixel in each region R of the object image and the mean value of the corresponding pixels in region R of the background image corresponding to that region R is computed for each region R, and a region having the difference mean value md (R) greater than k times the mean value mσ (R) of the standard deviation. Therefore, the object portion can be extracted more correctly with the background portion removed from the object image.

Although it is preferable to compute the difference between value v (i, j) of each pixel in each region R of the object image and mean value m (i, j) of the corresponding pixels in region R of the background image corresponding to that region R at step S442, it is also possible to compute mean value mv (i, j) of the pixels in each region of the object image and then compute the absolute value of the difference between the mean value of the pixels in each region R of the object image and the mean value m (i, j) of the pixels in region R of the background image corresponding to that region R. In this case, value v (i, j) of each pixel in region R of the object image is replaced with mean value mv (i, j) of the pixels in each region R of the object image in the flow chart of FIG. 30.

Alternatively, mean value mv (R) of the pixels in each region R of the object pixel is computed, and mean value mm (R) in region R of mean values m (i, j) for each pixel in region R of the background image corresponding to region R to obtain an absolute value of the difference thereof. An object portion can be extracted on the basis of this value. In this case, |mv (R)–mm (R)| is computed as md (R) in obtaining md (R) at step S442.

Eleventh Embodiment

Figure 31:
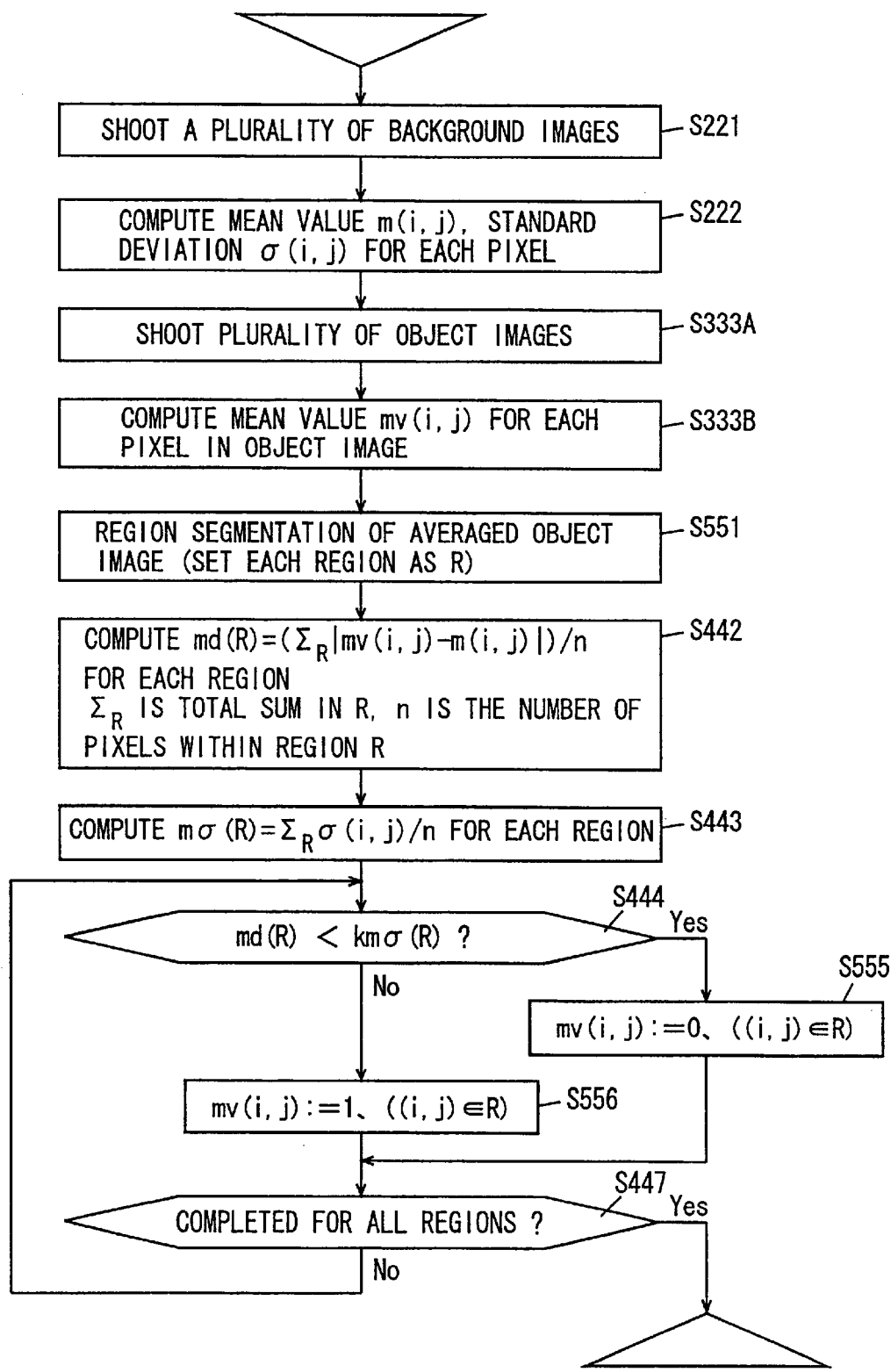
FIG. 31 is a flow chart showing main components of an object extraction apparatus according to an eleventh embodiment of the present invention.

FIG. 31 is a flow chart showing main components of an object extraction apparatus according to an eleventh embodiment of the present invention. In contrast to the previous tenth embodiment where the object of interest is shot one time to obtain one object image at step S223, the object of interest is shot for a plurality of times from the same view point at step S333A similar to the ninth embodiment to obtain a plurality of object images in the present eleventh embodiment. Therefore, an object image that is the average of the plurality of object images is segmented into a plurality of regions R at step S551. Therefore, in steps S555 and S556, mean value mv (i, j) of the pixels is used instead of value v (i, j) of the pixel.

According to the present eleventh embodiment, a plurality of object images is obtained by shooting an object of interest for a plurality of times from the same viewpoint. Therefore, variation in the conversion characteristics of the A/D converter and illumination characteristic at the time of shooting of an object of interest is alleviated. An object portion can be extracted more properly by removing the background portion from the object image.

Twelfth Embodiment

A three-dimensional model generation apparatus according to a twelfth embodiment of the present invention includes, similar to the first embodiment of FIG. 3, includes a turntable 110, a camera 120, and a computer 130. Here, a robot arm and the like can be used instead of turntable 110. In other words, a component that can alter the direction of the object of interest can be used instead of turntable 110.

Figure 32:
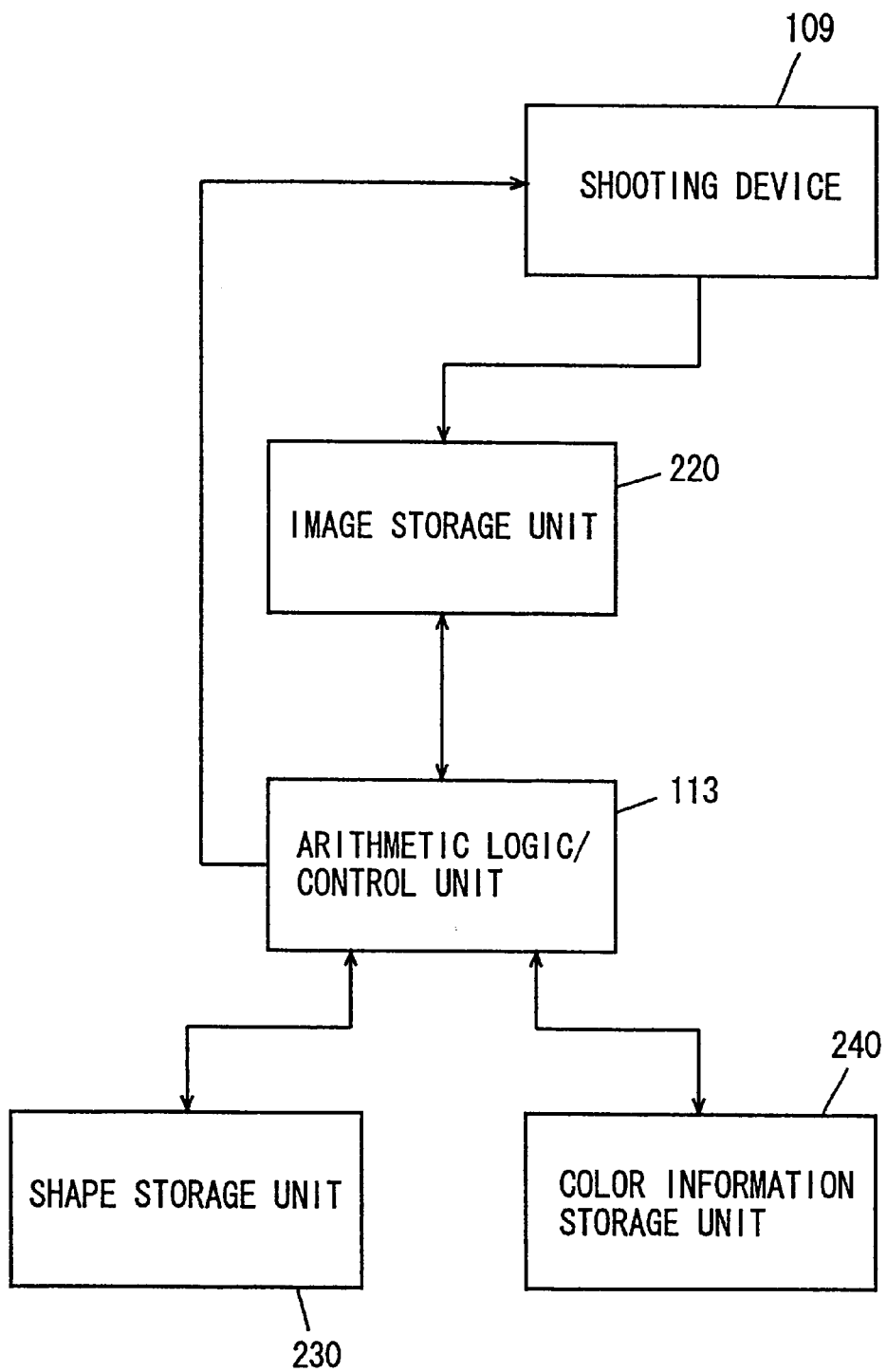
FIG. 32 is a block diagram schematically showing a three-dimensional model generation apparatus according to a twelfth embodiment of the present invention.

FIG. 32 is a block diagram schematically showing this three-dimensional model generation apparatus. Referring to FIG. 32, the three-dimensional model generation apparatus includes a pickup unit 109, an image storage unit 220, an arithmetic logic/control unit 113, a shape storage unit 230, and a color information storage unit 240. Pickup unit 109 includes turntable 110 and camera 120 of FIG. 3. Image storage unit 220, arithmetic logic/control unit 113, shape storage unit 230, and color information storage unit 240 are included in computer 130 of FIG. 3.

Figure 33:
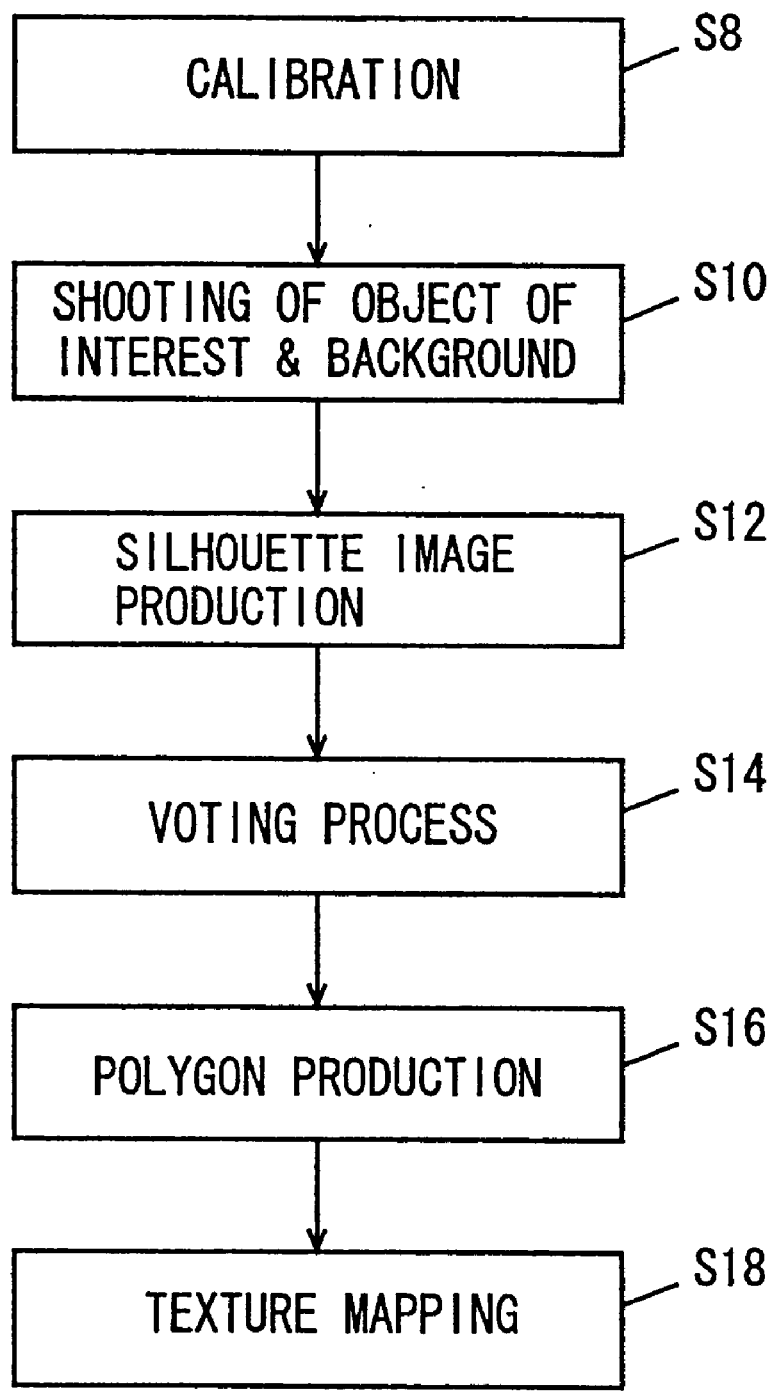
FIG. 33 is a flow chart showing a flow of the process in the three-dimensional model generation apparatus of FIG. 32.

FIG. 33 is a diagram for describing the flow of the process of the three-dimensional model generation apparatus of FIG. 3. FIGS. 6A–6E are diagrams for describing the specific process of three-dimensional model generation apparatus of FIG. 3. FIG. 6A corresponds to the shooting operation of the object of interest and background of step S2 in FIG. 33. FIG. 6B corresponds to generation of a silhouette image at step S12 of FIG. 33. FIG. 6C corresponds to the voting process at step S14 of FIG. 33. FIG. 6D corresponds to generation of a polygon at step S16 of FIG. 33. FIG. 6E is a diagram to describe texture mapping at step S18 of FIG. 33.

Description will be provided hereinafter with reference to FIGS. 3, 6A–6E, 32 and 33. At step S8, calibration is carried out. Calibration in the twelfth embodiment refers to the process of obtaining the internal parameter (respective ratio) of camera 120, and the position relationship between camera 120 and turntable 110. At step S10, an object of interest and the background are shot. Only the background is shot without the object of interest placed on turntable 110 to obtain one background image. Also, target object 100 is placed on turntable 110 to be rotated. Target object 100 is shot together with the background at every predetermined angle by camera 120 to result in object images A1–An. For example, target object 100 is rotated for every 10° to obtain 36 object images A1–A36. The following description is provided corresponding to the case of obtaining a three-dimensional model 29 on the basis of 36 obtained object images A1–A36. Here, the position and angle of depression (or angle of elevation) is fixed. Camera 120 and turntable 110 are under control of arithmetic logic/control unit 113. The background image and object image obtained at step S10 are stored in image storage unit 220. At the twelfth embodiment, shooting is effected with the camera fixed and the object of interest rotated. In order to reduce the shooting times of the background, the background is shot only once to obtain one background image. However, to obtain a background image of higher reliability, the background can be shot two or more times to obtain two or more background images.

In the case where target object 100 is shot from a plurality of directions about target object 100 including the background with camera 120 fixed and target object 100 rotated, shooting of the background is required only once. However, when target object 100 is shot including the background from a plurality of directions about target object 100 with target object 100 fixed and camera 120 moved about target object 100, shooting of the background must be carried out a plurality of times.

At step S12, a silhouette generation unit not shown provides a silhouette image. More specifically, a difference process is carried out between each of object images A1–A36 and the background image to result in a plurality of silhouette images B1–Bn. Since there are 36 object images A1–A36, 36 silhouette images are obtained. Here, the difference process (the process obtaining the difference) refers to obtaining the difference between the color information of the object image and the color information of the background image for each pixel. At step S12, a voting unit not shown carries out the voting process. On the basis of the plurality of silhouette images B1–B36, a voting process on the cylindrical coordinate system voting space 251 is carried out. A threshold processing unit (three-dimensional shape acquirement unit) not shown sets the portion with the score of the votes exceeding a threshold value as the three-dimensional shape (existing region) of target object 100.

Although the orthogonal coordinate system voxel space can be used as the voxel space, it is preferable to use the cylindrical coordinate system voxel space 251. This is because the memory capacity can be suppressed while favorable acquirement of the shape can be effected.

At step S16, a plurality of three-dimensional shape constituent elements (for example, a polygon such as a triangular patch; for the sake of simplification, the three-dimensional shape constituent element is represented as a polygon hereinafter) 27 on the basis of the three-dimensional shape of target object 100 obtained at step S14. The three-dimensional shape of target object 100 obtained at step S14 is represented by a plurality of polygons 27. The three-dimensional shape represented by polygons 27 is stored in shape storage unit 230. At step S18, the texture corresponding to each polygon 27 generated at step S16 is obtained from the object image to be mapped on each polygon 27. The texture (color information) is stored in color information storage unit 240. The process of steps S12–S18 is carried out by arithmetic logic/control unit 113. The silhouette generation unit, the voting unit, and the threshold processing unit are included in arithmetic logic/control unit 113. Details of the calibration of step S18, the voting process of step S14, and polygon generation of step S12, and step S16 are set forth in the following.

Calibration

Figure 34:
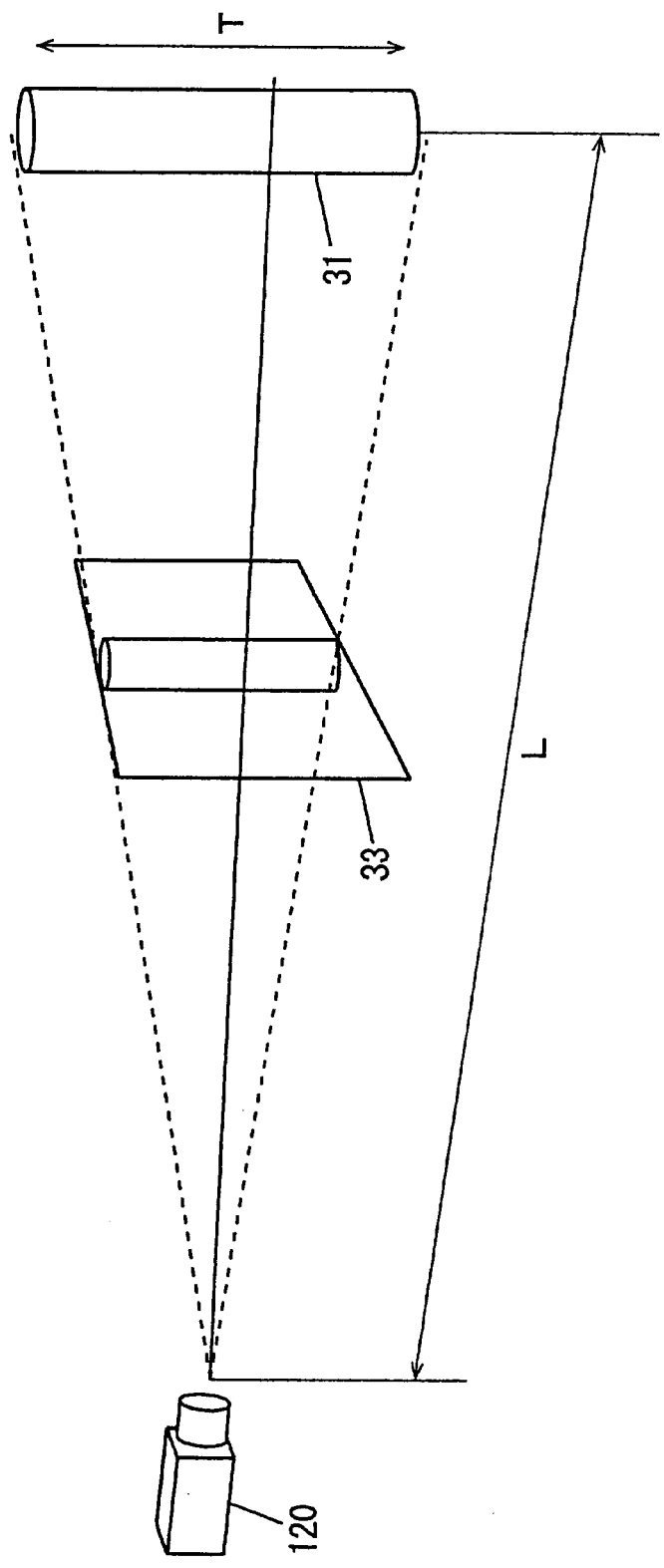
FIG. 34 is a diagram for describing the perspective ratio obtained at step S8 of FIG. 33.

As the calibration, the internal parameter (perspective ratio) of camera 120, and the position relationship between camera 120 and turntable 110 are obtained. First, the internal parameter (perspective ratio) of camera 120 will be described. FIG. 34 is a diagram to describe the internal parameter (perspective ratio) of camera 120. Referring to FIG. 34, a reference block 31 is shot by camera 120. Here, shooting is effected so that reference block 31 exactly fits a screen 33. The distance L between camera 120 and reference block 31 is measured here. Also, the height T of reference block 31 is measured. The perspective ratio is the height T of reference block 31 divided by distance L. In other words, the perspective ratio is represented as T/L. In the perspective representation, the size of an object projected on a screen is enlarged/shrunk according to the distance from the view point to the object. The parameter determining that ratio of enlargement/shrinkage is the perspective ratio.

Figure 35A:
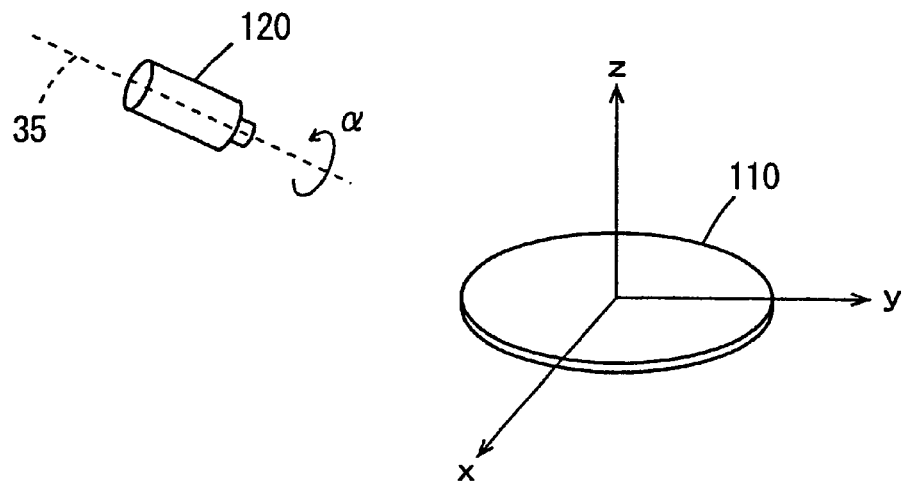
FIGS. 35A–35C are diagrams to describe the position relationship between the camera and the turntable obtained at step S8 in FIG. 33.
Figure 35B:
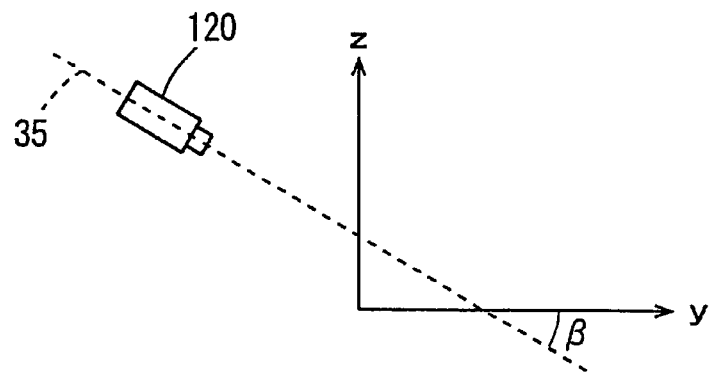
Figure 35C:
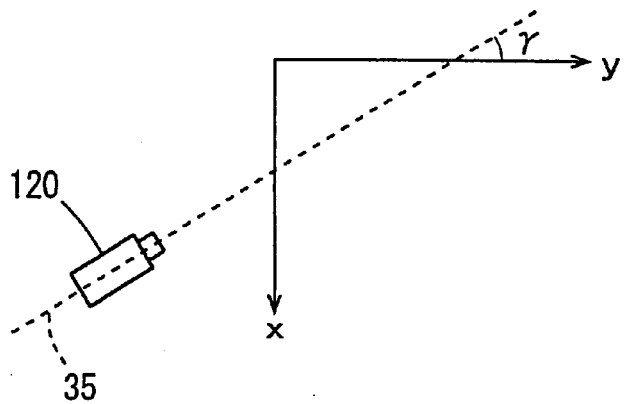

Measurement of the position relationship between camera 120 and turntable 110 is described hereinafter. FIGS. 35A–35C are diagrams to describe the measurement of the position relationship between a camera and a turntable. FIG. 35A shows a camera 120 placed at the coordinate system (xyz coordinate system) of turntable 110. Referring to FIG. 35A, the position $(x_0, y_0, z_0)$ of camera 120 is obtained using the coordinate system (xyz coordinate system) of turntable 110. Also, the angle of rotation $\alpha$ about the optical axis 35 of camera 120 is obtained. FIG. 35B shows the orthogonal projection on plane yz of camera 120 of FIG. 35A. Referring to FIG. 35B, the angle $\beta$ between optical axis 35 of camera 120 and the y axis is obtained. FIG. 35C shows the orthogonal projection on plane xy of camera 120 of FIG. 35A. Referring to FIG. 35C, the angle $\gamma$ between optical axis 35 and the y axis of camera 120 is obtained.

More specifically, the position of camera 120 based on the coordinate system (xyz coordinate system) of turntable 110 and angles $\alpha$, $\beta$, and $\gamma$ are obtained as the position relationship between camera 120 and the turntable 110. In the present twelfth embodiment, angles $\alpha$ and $\gamma$ are set to approximately 0°. Here, angle $\beta$ is the angle of depression of camera 120 with respect to turntable 110. This angle $\beta$ is also referred to as the angle of depression of camera 120 with respect to an object of interest placed on turntable 110. Here, the angle of depression includes a negative angle of depression, i.e. angle of elevation.

Since the angle of depression of the camera with respect to a target object is obtained as the calibration in the present twelfth embodiment, a three-dimensional model 29 can be generated on the basis of an object image obtained by shooting a target object with this angle of depression. In other words, a three-dimensional model 29 is generated, not only based on the object image obtained by shooting an object of interest from the horizontal direction (a direction parallel to the xy plane), but also on the basis of an object image obtained by shooting the target object from an above oblique direction. Therefore, sufficient color information can be obtained, including the upper portion of the target object that could not be obtained from only an object shot from the horizontal direction. Stereoscopic model 29 can be generated of high accuracy since a local concave portion of the object of interest can be recognized.

Voting Process

Figure 36:
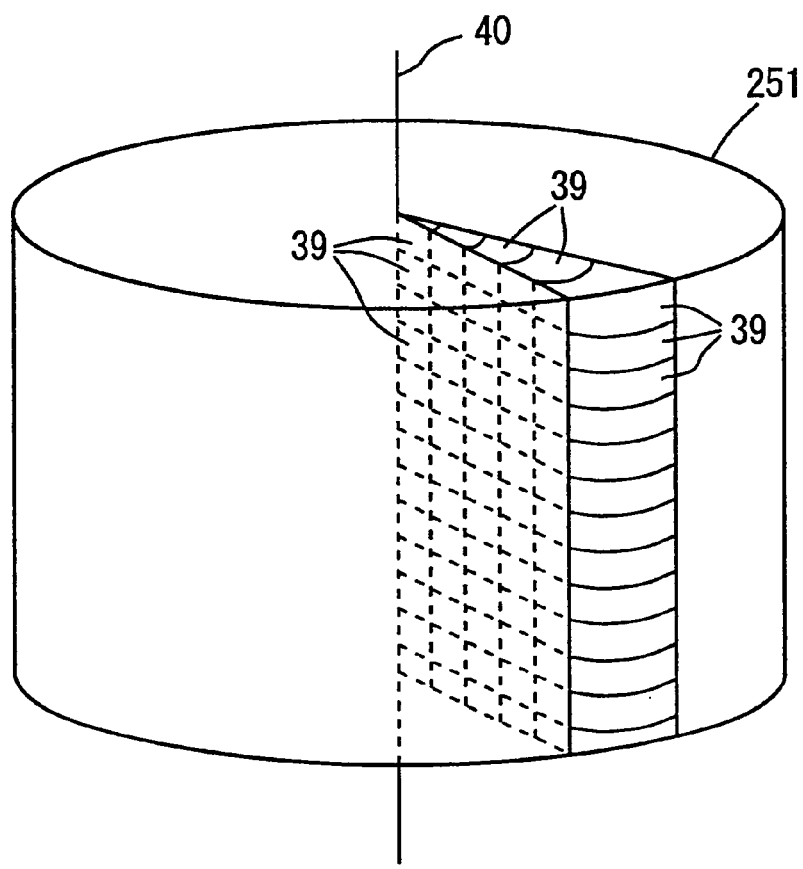
FIG. 36 is a diagram for describing a voxel in the cylindrical coordinate system voxel space used at step S14 of FIG. 33.

Details of a voting process at step S14 of FIG. 33 will be described. FIG. 36 is a diagram for describing a cylindrical coordinate system voxel space 251 for the voting process. Referring to FIG. 36, cylindrical coordinate system voxel space 251 includes a plurality of voxels 39. For the sake of describing a voxel in cylindrical coordinate system voxel space 251, cylindrical coordinate system voxel space 251 of FIG. 36 is considered as a circular cylinder with a center axis 40. This circular cylinder 25 is cut at a plurality of planes perpendicular to center axis 40. Also, circular cylinder 25 is cut at a plurality of planes including and in parallel to center axis 40. Furthermore, circular cylinder 25 is cut at a plurality of rotary planes centered about center axis 40. Each element of circular cylinder 25 obtained by cutting circular cylinder 25 corresponds to each voxel 39 in cylindrical coordinate system voxel space 251.

Figure 37:
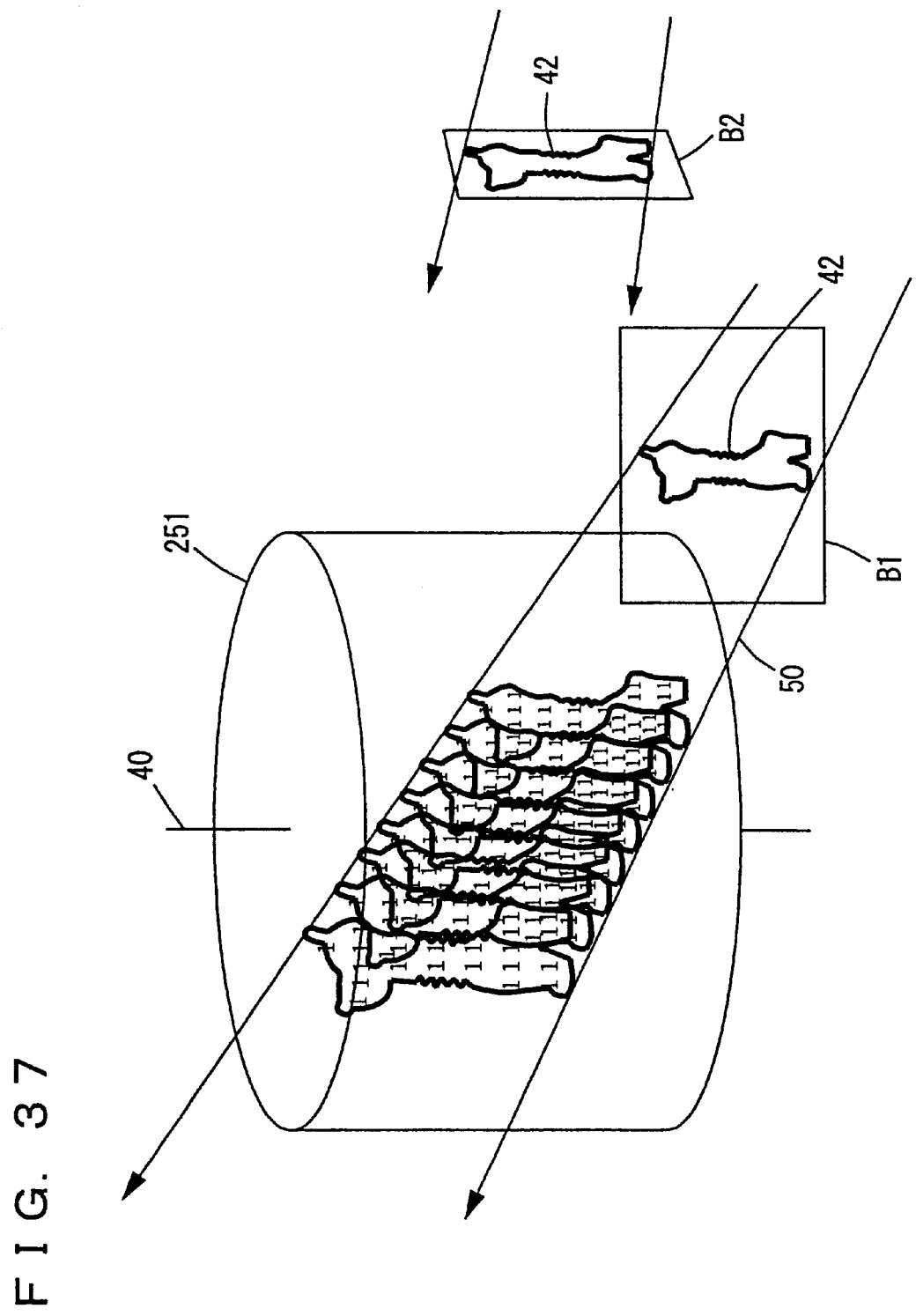
FIG. 37 is a diagram for describing the voting process at step S14 of FIG. 33.

FIG. 37 is a diagram to describe the voting process. A voting process is carried out on cylindrical coordinate system voxel space 251 on the basis of 36 silhouette images B1–B36 obtained at step S12 of FIG. 33. In FIG. 37, only two silhouette images B1 and B2 are shown.

Attention is focused on hypothetical existing region 50. FIG. 7 is a diagram to describe a hypothetical existing region. In FIG. 7, only one silhouette image B1 is shown. Referring to FIGS. 37 and 7, a hypothetical existing region 50 is a conical region with projection center 51 of the camera as the vertex and object image 42 (contour of target object 100) of silhouette image B1 as a cross sectional shape with respect to silhouette image B1. A hypothetical existing region can be defined similarly for the other silhouette images B2–B36. Target object 100 inevitably resides within this hypothetical existing region.

Referring to FIG. 36, the vote point of "1" is applied to all voxels 39 in hypothetical existing region 50 in the voting process. This voting process is carried out for all silhouette images B1–B36. For example, voxel 39 that resides at the overlapping portion of all the hypothetical existing regions corresponding to the 36 silhouette images B1–B36 has the vote score of "36".

At step S10 of FIG. 33, an object of interest is shot for every 10° to obtain 36 object images. 36 silhouette images B1–B36 are generated at step S12. Therefore, the vertex of the hypothetical existing region (corresponding to the projection center of camera) is located for every 10° around center axis 40. The position of the vertex (corresponding to the projection center of camera) of the hypothetical existing region is determined according to the calibration result of step S8 of FIG. 33. In other words, the position relationship between silhouette images B1–B36 and the vertex (corresponding to projection center of camera) of a corresponding hypothetical existing region is determined by the perspective ratio. More specifically, the breadth angle of the cone which is the hypothetical existing region is determined. By the position relationship between camera 120 and turntable 110, the position relationship between the vertex (corresponding to projection center of camera) of the hypothetical existing region corresponding to silhouette images B1–B36 and cylindrical coordinate system voxel space 251 is determined.

Figure 38:
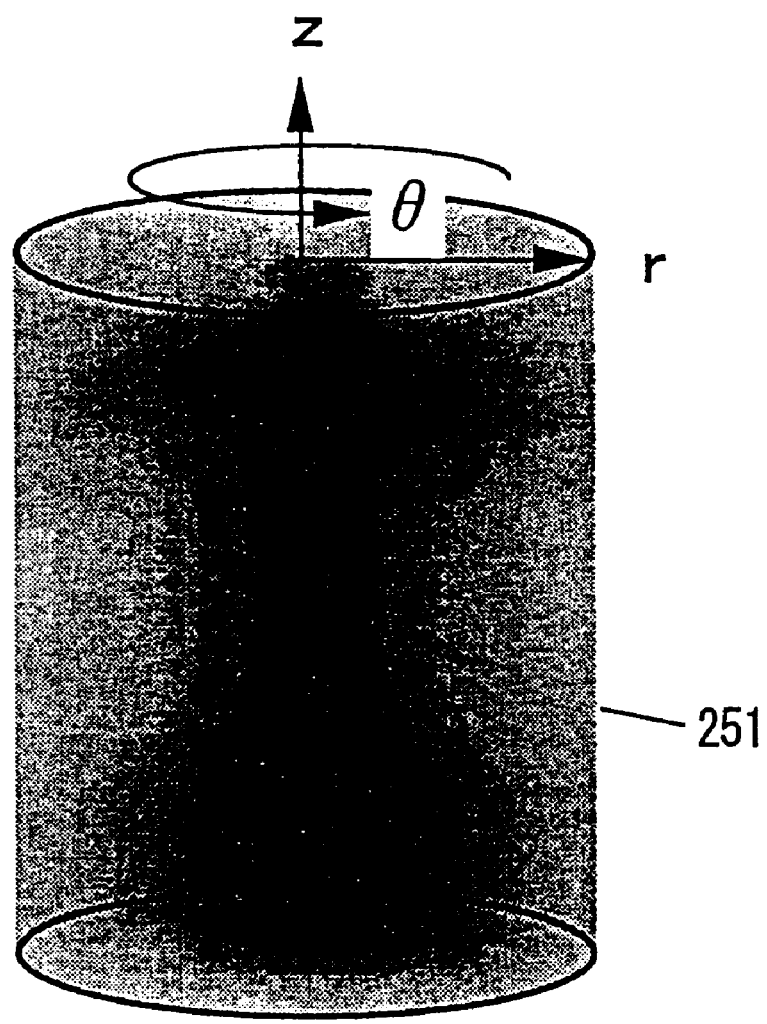
FIG. 38 shows the results of the voting process at step S14 of FIG. 33.

FIG. 38 shows the result of the voting process. Referring to FIG. 38, the dark color portion has the value of a high vote score whereas the light color portion has the value of a low vote score. The z axis of FIG. 38 corresponds to central axis 40 of FIG. 37.

Following the voting process on all silhouette images B1–B36, a threshold process is carried out. More specifically, the region of a voxel 39 having a vote score equal to or higher than a predetermined threshold value is set as the existing region of target object 100. This shape of the existing region is the three-dimensional shape of target object 100. If the threshold value is "32" for example, the shape of a region where voxel 39 has a vote score of at least "32" corresponds to the three-dimensional shape of target object 100.

In the twelfth embodiment, the three-dimensional shape of an object of interest is obtained by the voting process.

Therefore a three-dimensional model 29 of high accuracy can be generated even if there are some improper images in the plurality of silhouette images used in the voting process. Conventionally, a three-dimensional shape is obtained by the logical AND operation of a plurality of hypothetical existing regions. When an object image in the silhouette image is not correct and the contour of the object of interest is not represented properly so that there is a partial missing portion in the shape of the object of interest, that missing portion could not be represented in a three-dimensional shape of the object of interest. Here, the existing region of an object of interest in voxel space 251 is estimated by the voting process. If the existing probability of the object of interest in voxel space 251 can be obtained, the existing region of the object of interest can be estimated by a process other than the voting process.

Polygon Generation

Figure 39A:
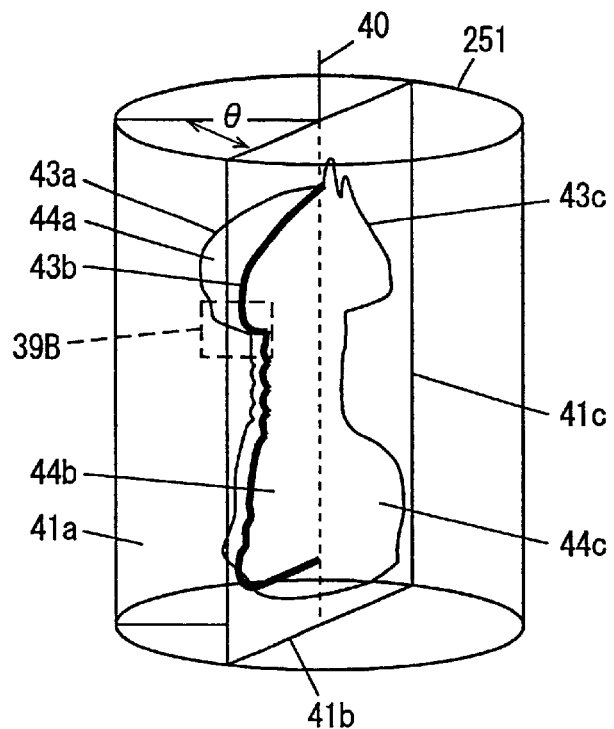
FIG. 39A is a diagram to describe the specific contents of polygon generation at step S16 of FIG. 33.
Figure 39B:
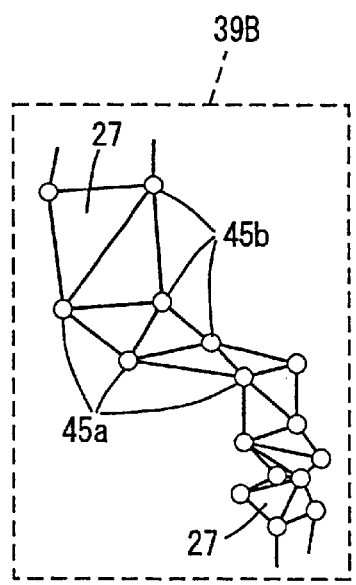
FIG. 39B is an enlargement view of the 39B portion in FIG. 39A.
Figure 40:
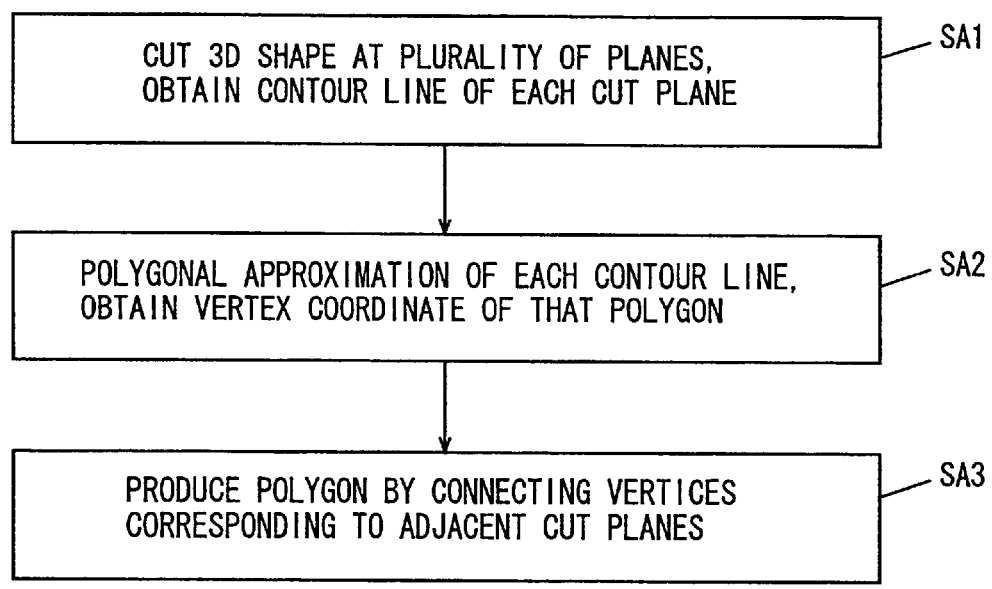
FIG. 40 is a diagram for describing the flow of polygon generation at step S16 of FIG. 33.

FIGS. 39A and 39B are diagrams for specifically describing polygon generation at step S16 of FIG. 33. FIG. 40 is a diagram for describing the flow of the polygon generation step of S16 of FIG. 33. FIG. 39B shows a polygon obtained on the basis of contour lines 43A and 43B residing in a portion 39B in FIG. 39A. At step SA1 referring to FIGS. 39A and 40, the three-dimensional shape (refer to FIG. 38) of target object 100 obtained according to the result of the voting process is cut by a cross section not shown at a plurality of planes (in FIG. 39A, only three planes 41a, 41b and 41c are shown) to obtain the contour line (in FIG. 39A, only three contour lines 43a, 43b and 43c are shown) of each cut up plane (in FIG. 39A, only three cut planes 44a, 44b and 44c are shown). At step S10 of FIG. 33, an object of interest is shot for every 10° to obtain an object image, and at step S12, silhouette images B1–B36 for every 10° are generated. Therefore, the three-dimensional shape of target object 100 is cut up at a plurality of planes for every 10° about center axis 40. In other words, the three-dimensional shape of target object 100 is cut up with a plurality of planes so that adjacent planes are at an angle θ of 10°. Each plane that cuts up the three-dimensional shape of target object 100 is a plane including center axis 40.

At step SA2, a polygonal approximation unit not shown approximates each contour line of each cut up plane with a polygon to obtain the coordinate of the vertex of that polygon. As this polygonal approximation method, the method disclosed in, for example, "An Iterative Procedure for the Polygonal Approximation of Plane Curves", CGIP, Vol. 1, pp. 244–256, 1972 by U. Ramer, can be employed. Then, a connection unit not shown connects adjacent vertices of each cut up plane with a straight line. At step SA3, vertices corresponding to the contour line of each cut up plane are connected between adjacent cut up planes to generate a polygon. In the polygonal approximation of step SA2, the number of polygons that are eventually generated can be controlled by setting the approximation precision variable.

The process of steps SA2 and SA3 will be described with reference to FIG. 39B. At step SA2, contour lines 43a and 43b are approximated with a polygon, and the coordinates of vertices 45a and 45b of the polygon are obtained. As to the plurality of vertices 45a obtained by the polygonal approximation of contour line 43a, adjacent vertices 45a are connected with a straight line. A similar process is carried out for a plurality of vertices 45b obtained by the polygonal approximation of contour line 43b. Here, vertex 45a corresponds to contour line 43a and vertex 45b corresponds to contour line 43b. At step S3, vertex 45a corresponding to contour line 43a of cut plane 44a and vertex 45b corresponding to contour line 43b of cut plane 44b are connected with a straight line to generate polygon 27. The local most proximity point connection strategy and global shortest connection strategy are known as methods to connect vertices 45a and 45b with a straight line.

According to the local most proximity point connection strategy, the vertices that are most closest to each other of the vertex obtained by polygonal approximation of one contour line of an adjacent cut plane and the vertex obtained by polygonal approximation of the other contour line in the adjacent cut plane is connected with a straight line. According to the global shortest connection strategy, the vertex obtained by polygonal approximation of one contour line of an adjacent cut plane and the vertex obtained by polygonal approximation of the other contour line of the adjacent cut plane are connected with a straight line so that the sum of the length between vertices become minimum.

Figure 41:
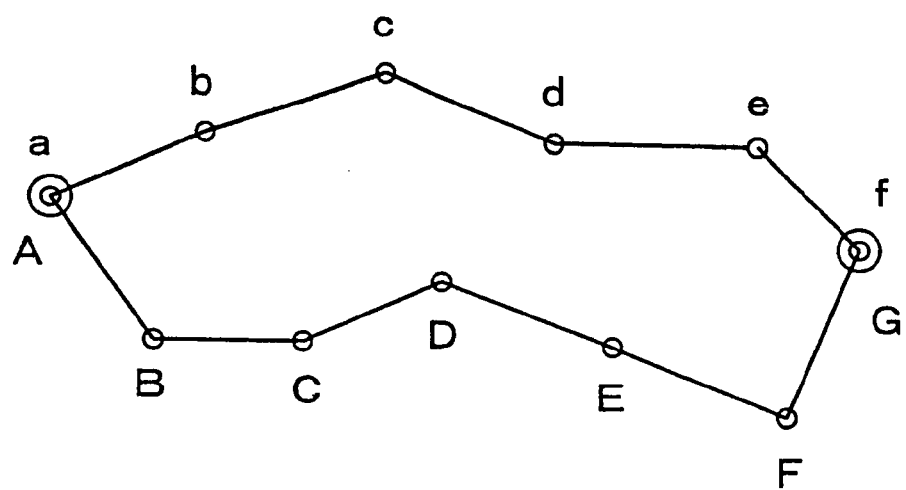
FIG. 41 is a diagram showing the relationship between vertices corresponding to the contour lines of adjacent cut out planes obtained at step SA2 of FIG. 40.

Details of the local most proximity point connection strategy will be provided. FIG. 41 shows the relationship of vertices corresponding to the contour lines of adjacent cut planes. Here, a cut plane Scnt and a cut plane Scnt+1 are taken as examples of adjacent cut planes. Referring to FIG. 41, vertices a, b, c, d, e and f are obtained by polygonal approximation of the contour lines of cut plane Scnt. Vertices A, B, C, D, E, F and G are obtained by polygonal approximation of the contour lines of cut plane Scnt+1. Since it is premised that the polygon is generated using cylindrical coordinate system voxel space 251, vertex a and vertex A are the same points, and vertex f and vertex G are the same points.

FIG. 42 is a diagram for describing the local most proximity point connection strategy. Referring to FIG. 42, the horizontal direction corresponds to vertices a–f of cut plane Scnt whereas the vertical direction corresponds to vertices A–G of cut plane Scnt+1. The number at each lattice point (the number in the circle) represents the distance between vertices a–f (FIG. 41) corresponding to the contour line of cut plane Scnt and vertices A–G (FIG. 41) corresponding to the contour lines of cut plane Scnt+1. For example, at the crossing between d and D (the lattice point determined by d and D), the distance between vertex d and vertex D of FIG. 41 is indicated. More specifically, the distance between vertices d and D of FIG. 41 is "2".

Referring to FIGS. 41 and 42, first an initial polygon is generated according to the local most proximity point connection strategy. The following two methods are known as this initial polygon generation method. The first method connects vertices b and B with a straight line unconditionally. In the second method of initial polygon generation, those with the shortest distance among the distances between vertices b and B, a and C, and A and c is selected, and vertices thereof are connected with a straight line. In the examples of FIGS. 41 and 42, vertices b and B are selected and a straight line is connected therebetween in both the above two initial polygon generation methods.

Connection between vertices c and B or vertices b and C is considered. Since the distance between vertices b and C is shorter than the distance between vertices c and B, vertices b and C are connected with the straight line. Then, connection between vertices c and C or vertices b and D is considered. Since the distance between vertices b and D and the distance between vertices c and C are equal, either can be connected. Here, vertices b and D are connected with a straight line. Then, connection between vertices c and D or vertices b and E is considered. Since the distance between vertices c and D is shorter than the distance between vertices b and E, vertices c and D are connected with a straight line.

Figure 43:
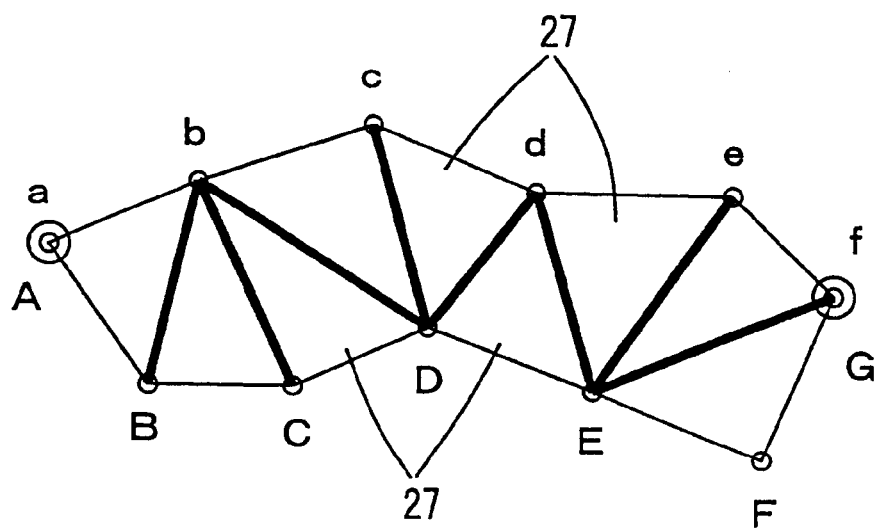
FIG. 43 shows a polygon obtained by the local most proximity point connection strategy at step SA3 of FIG. 40.

By repeating this process, the vertex corresponding to the contour line of cut plane Scnt and the vertex corresponding to the contour line of cut plane Scnt+1 are connected with the straight line. More specifically, at each lattice point of FIG. 42, the distance between the vertices corresponding to the lattice point located at the right is compared with the distance of the vertices corresponding to the lattice point located below. The vertices corresponding to a lattice point where the shortest distance is indicated is connected with a straight line. FIG. 43 shows polygons obtained by connecting vertices a–f and vertices A–G of FIG. 41 by the local most proximity point connection strategy. Components similar to those of FIG. 41 have the same reference characters allotted, and their description will not be repeated. Referring to FIG. 43, vertices a–f and vertices A–G are connected according to the local most proximity point connection strategy to form polygons (triangular patch) 27.

Figure 44:
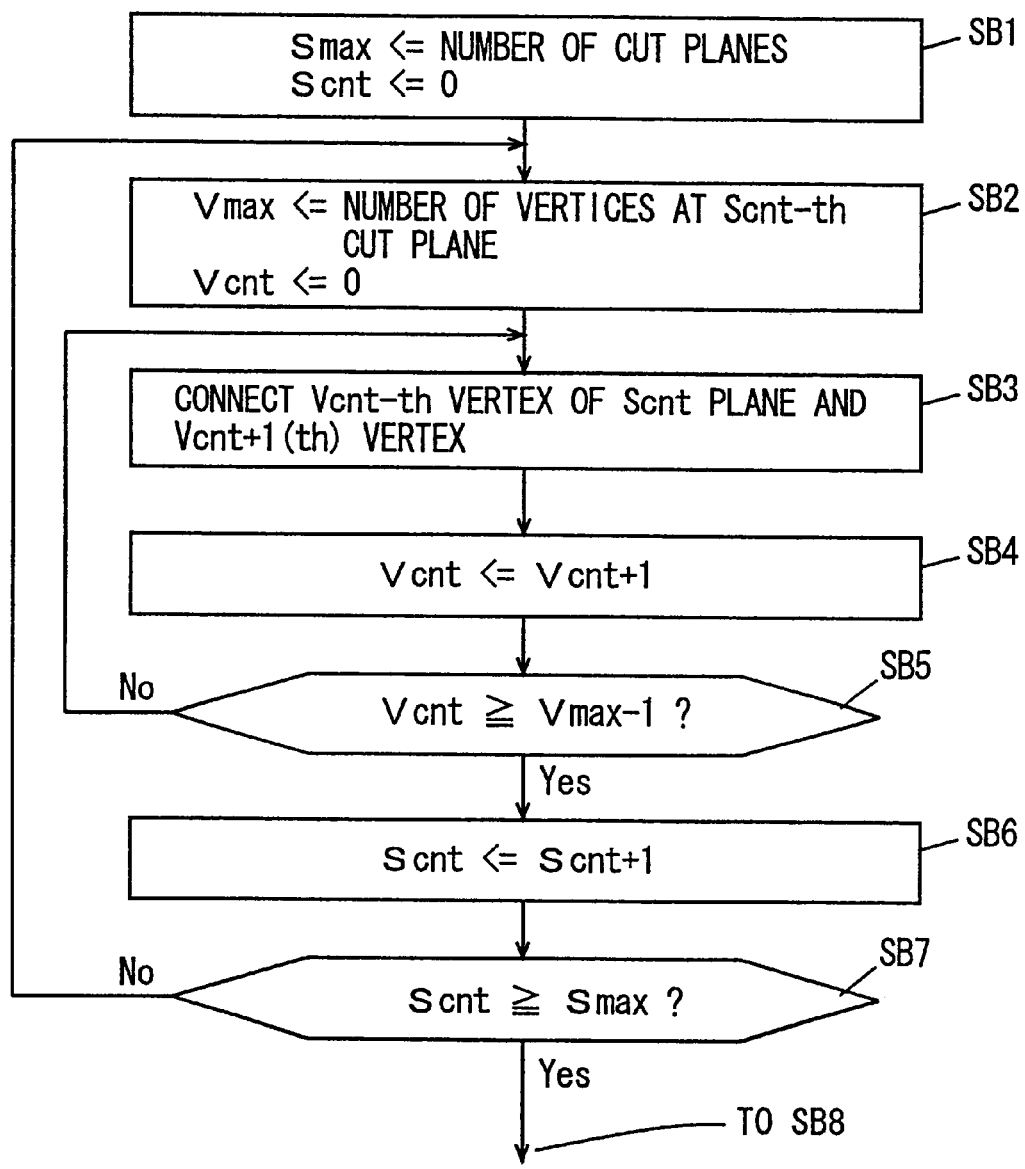
FIG. 44 shows a part of the flow of the polygon generation by the local most proximity point connection strategy at step SA3 of FIG. 40.
Figure 45:
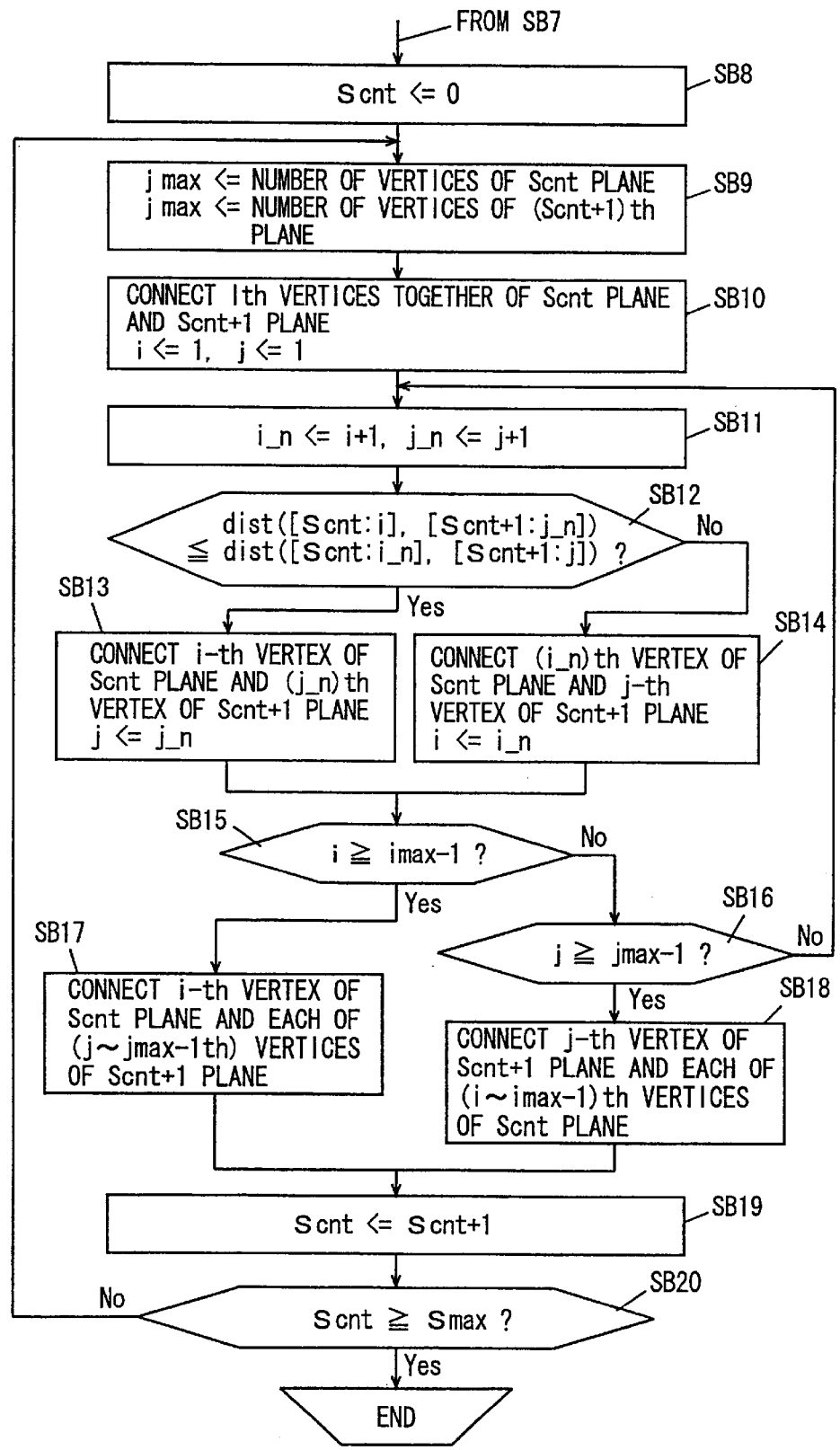
FIG. 45 shows the remaining part of the flow of the polygon generation by the local most proximity point connection strategy at step SA3 of FIG. 40.

FIG. 44 is a diagram for describing a part of the polygon generation flow according to the local most proximity point connection strategy. FIG. 45 is a diagram for describing the remaining part of the polygon generation flow according to the local most proximity point connection strategy. Here, the method of connecting the first vertices together unconditionally (the first method of initial polygon generation) is employed. At step SB1 of FIG. 44, the number of cut planes obtained at step SA1 of FIG. 40 is inserted into variable Smax. Also, "0" is inserted into variable Scnt. At step SB2, the vertex number at the Scnt-th cut plane is inserted into variable Vmax. "0" is inserted into variable Vcnt. At step SB3, the Vcnt-th vertex at the Scnt-th cut plane is connected with the (Vcnt+1)th vertex at the Scnt-th cut plane. As for vertices a–f and A–G of FIG. 41, vertices a and A are the 0-th vertices, vertices b and B are the first vertices, and vertices c and C are the third vertices. At step SB4, Vcnt+1 is inserted into variable Vcnt. When variable Vcnt is equal or greater than Vmax–1 at step SB5, control proceeds to step SB6. When variable Vcnt is smaller than Vmax–1 at step-SB5, control proceeds to step SB3. At step SB6, Scnt+1 is inserted into variable Scnt. When variable Scnt is at least Smax at step SB7, control proceeds to step SB8 of FIG. 45. When variable Scnt is smaller than Smax at step SB7, control proceeds to step SB2.

At step SB8 of FIG. 45, "0" is inserted into variable Scnt. At step SB9, the vertex number at the Scnt-th cut plane is inserted into variable imax. Then, the vertex number at the (Scnt+1)th cut plane is inserted into variable jmax. At step SB10, the initial polygon is generated. Here, the method of connecting the first vertices with each other unconditionally is employed (first method of initial polygon generation). The first vertex of the Scnt-th cut plane is connected with the first vertex of the (Scnt+1)th cut plane. Then, "1" is inserted into variable i. "1" is inserted into variable j. At step SB11, i+1 is inserted into variable i__n, and j+1 is inserted into variable j__n. At step SB12, dist ([Scnt:i], [Scnt+1:i j__n]) implies the distance between the i-th vertex of the Scnt-th cut plane and the (j__n)th vertex of the (Snct+1)th cut plane. Also, dist ([Scnt: i__n], [Scnt+1:j]) implies the distance between the (i__n)th vertex of the Scnt-th cut plane and the j-th vertex of the (Scnt+1)th cut plane. When the distance between the i-th vertex of the Scnt-th cut plane and the (j__n)th vertex of the (Scnt+1)th cut plane is equal to or less than the distance between the (i__n)th vertex of the Scnt-th cut plane and the j-th vertex of the (Scnt+1)th cut plane at step SB12, control proceeds to step SB13. Otherwise, to step SB14.

At step SB13, the i-th vertex of the Scnt-th cut plane is connected with the (j__n)th vertex of the (Scnt+1)th cut plane. Then, j__n is inserted into variable j. At step SB14, the (i_n)th vertex of the Scnt-th cut plane is connected with the j-th vertex of the (Scnt+1)th cut plane. Then, i_n is inserted into variable i. When variable i is equal to or greater than imax−1 at step SB15, control proceeds to step SB17. When variable i is smaller than imax−1, control proceeds to step SB16. At step SB17, the i-th vertex of the Scnt-th cut plane is connected with each of (j~j max−1)th vertices of the (Scnt+1)th cut plane. When variable j is equal or greater than jmax−1 at step SB16, control proceeds to step SB18. When variable j is smaller than jmax−1, control proceeds to step SB11. At step SB18, the j-th vertex of the (Scnt+1)th cut plane is connected with each of the (i~imax−1)th vertices of the Scnt-th cut plane. At step SB19, Scnt+1 is inserted into variable Scnt. When variable Scnt is smaller than Smax at step SB20, control proceeds to step SB9. When variable Scnt is equal to or greater than Smax, the process ends. Here, there are cut planes from 0 to Smax−1. There is the case where the vertex of the Smax-th cut plane must be considered in the event that Scnt is Smax−1 of FIG. 45. In this case, the Smax-th cut plane is assumed to be identical to the 0-th cut plane.

Polygon generation according to the global shortest connection strategy will be described in detail hereinafter with reference to FIG. 42. A path with lattices point aA (crossing point between a and A) as the starting point and lattice point fG (crossing point between f and G) as the end point will be considered. Every time a lattice point is crossed, the value of the distance assigned to the passed lattice point is added as the penalty. The path with the smallest penalty score is obtained. In other words, the shortest path out of the plurality of paths from lattice point Aa to lattice point fG is obtained. Such a shortest path is obtained using the round robin method, branch-and-bound method, Dijkstra algorithm, A* algorithm and the like. In FIG. 42, the path indicated by the bold solid line is the shortest penalty path (shortest path). The vertices (refer to FIG. 41) corresponding to the lattice points located on the shortest penalty path (shortest path) are connected. For example, shortest penalty path (bold solid line) passes through lattice points b and B. Therefore, vertices b and B of FIG. 41 are connected. FIG. 43 shows polygons obtained by connecting with a straight line vertices a–f and vertices A–G of FIG. 41 by the global shortest connection strategy.

Figure 46:
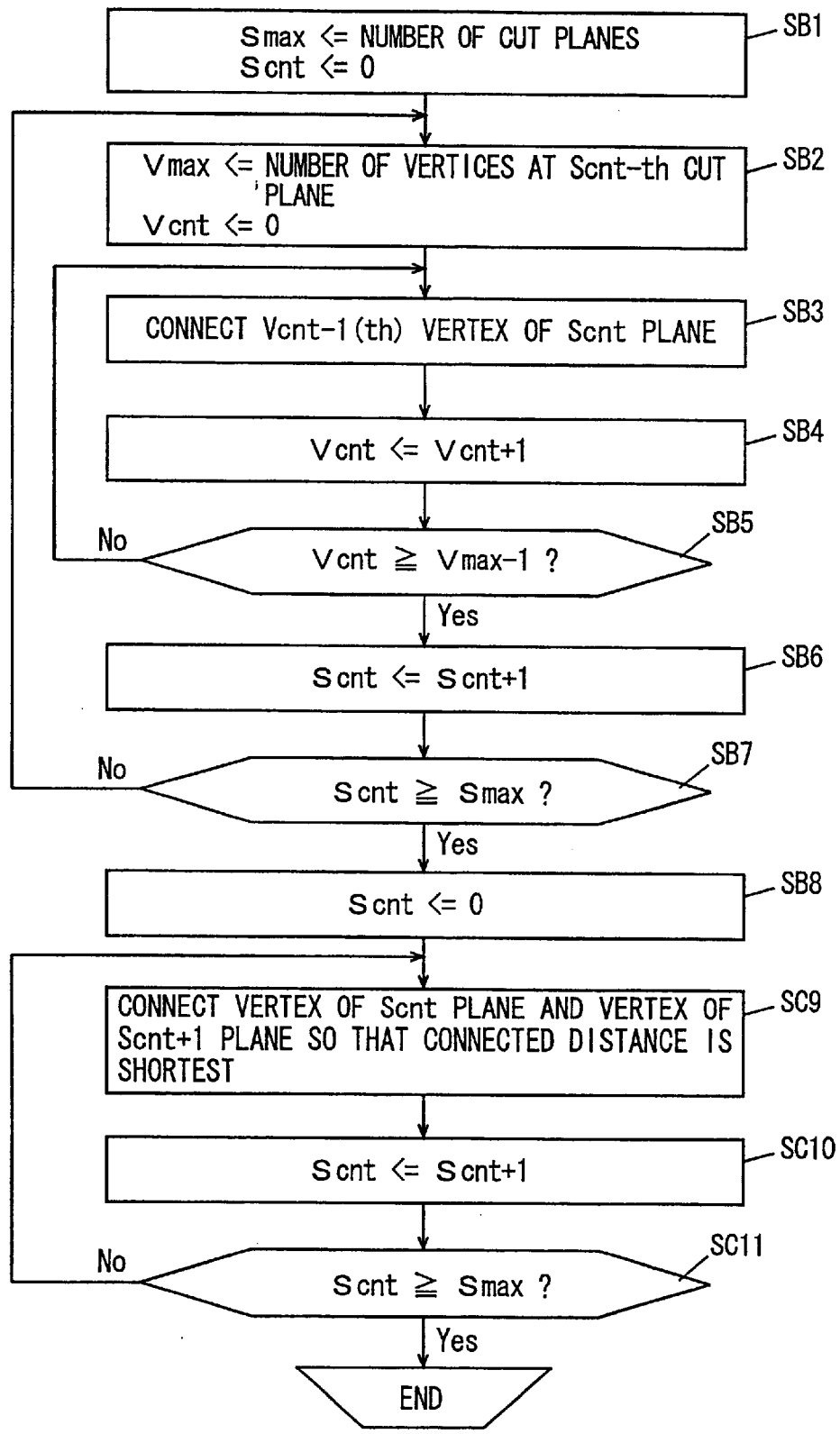
FIG. 46 is a diagram for describing the flow of polygon generation by the global shortest connection strategy at step SA3 of FIG. 40.

FIG. 46 is a diagram to describe the polygon generation flow by the global shortest connection strategy. Steps similar to those of FIGS. 44 and 45 have the same reference character allotted, and their description will be appropriately omitted. At step SC9 of FIG. 46, the vertex of the Scnt-th cut plane and the vertex of the (Scnt+1)th cut plane are connected so that the connected distance is shortest. At step SC10, Scnt+1 is inserted into variable Scnt. When variable Scnt is smaller than Smax at step SC11, control proceeds to step SC9. When variable Scnt is equal to or greater than Smax, the process ends.

According to the twelfth embodiment, a three-dimensional shape of an object of interest is obtained using a cylindrical coordinate system voxel space 251. The three-dimensional shape is cut by a plurality of planes along the center axis of cylindrical coordinate system voxel space 251. A shape model 300 is generated according to the contour line of the cut plane. Therefore, the amount of data for generating a shape model is smaller than that for generating three-dimensional model 300 using an orthogonal coordinate system voxel space. Therefore, high speed processing is allowed. A polygon that forms shape model 300 is generated using polygonal approximation and the local most proximity point connection strategy or the global shortest connection strategy. Therefore, the amount of data is smaller than that of the conventional art that cuts the three-dimensional shape of an object of interest by a plurality of planes perpendicular to the axis of rotation to generate shape model 300. Therefore, the processing speed can be further improved. In other words, shape model 300 can be generated in real time. Furthermore, a polygon 27 forming shape model 300 is generated using polygonal approximation and the local most proximity point connection strategy or the global shortest connection strategy. Therefore, the amount of data is reduced to allow faster processing.

The present twelfth embodiment has the following advantages in addition to the advantages described in the foregoing. The present twelfth embodiment can have the manual task reduced than the case where a shape model is generated using a three dimensional digitizer. Furthermore, measurement using laser is not carried out in the twelfth embodiment. Therefore, the material of the object of interest is not limited, and restriction in the shooting environment such as the requirement of measurement in a dark room can be reduced. According to the twelfth embodiment, three-dimensional model 29 can be generated with the simple structure of turntable 110, camera 120, and computer 130. Furthermore, in the twelfth embodiment, a silhouette image is generated by difference processing, which is used to produce shape model 300. Therefore, a special shooting environment such as a backboard of the same color is dispensable.

Although generation of a three-dimensional model 29 using one camera and a turntable to shoot an object of interest for every 10° has been described, the number of cameras, the moving means of the shooting viewpoint, and the step of the shooting angle are not limited to those described above. An object of interest can be shot using a plurality of cameras to generate three-dimensional model 29. This provides the advantage that a shape of high accuracy can be acquired. As the moving means of the shooting viewpoint, a turntable under manual control or a robot arm can be used. The variation step of the shooting angle can be set more smaller in a complicated object, and the angle varied in a stepped manner of the shooting angle can be varied depending upon the direction. In other words, rotation at a finer step can be effected in the direction of a complicated outer shape for shooting. When the variation step of the shooting angle of the object of interest is to be modified, modification is also carried out of the cut plane to reconstruct shape model 300 represented by polygons cut from voxel space 251. The shooting angle and the cut plane are set in association. Accordingly, the contour information from the silhouette image obtained by shooting can be reflected at high accuracy on the polygon data.

Figure 47:
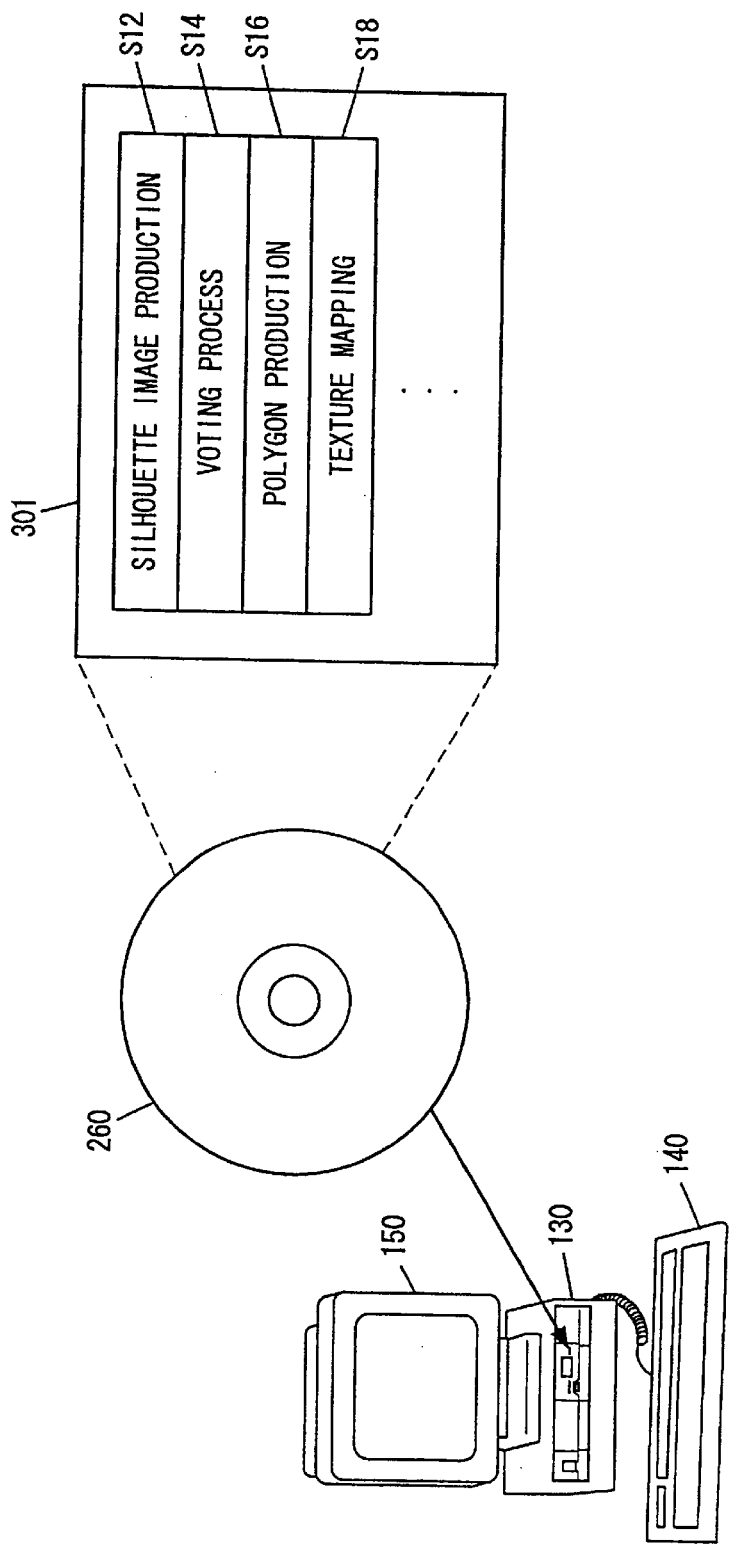
FIG. 47 shows a CD-ROM in which a program is recorded to generate a three-dimensional model of an object of interest by the computer of FIG. 3.

FIG. 47 shows a CD-ROM in which program 301 for having computer 130 of FIG. 3 generate a three-dimensional model 29 of an object of interest is recorded. Referring to FIG. 47, computer 130 generates a three-dimensional model 29 of an object of interest according to program 301 recorded in CD-ROM 260. Program 301 recorded in CD-ROM 260 includes step S12 generating a silhouette image of an object of interest, step S14 of a voting process, step S16 of polygon generation, and step S18 of texture mapping.

The present invention is not limited to the polygonal approximation technique of a cross section in reconstructing a shape model 300 represented in polygons of a shape model of voxel representation. For example, a shape model represented by a meta-ball can be used instead of shape model 300 represented in a wire frame. In the twelfth embodiment, a polygon is generated carrying out voting process on voxel space 251 according to a silhouette image. A silhouette image can be transformed into a polygon using the polygonal approximation method. In this case, correction by manual operation is required since a silhouette image is not accurate.

What is claimed is:

1. A texture information assignment method for a shape model comprising the steps of:

describing a shape of an object of interest as a shape model by a set of a plurality of three-dimensional shape constituent elements; and assigning texture information for said shape model to each said three-dimensional shape constituent element on the basis of a plurality of object image information captured by shooting said object of interest from different viewpoints, according to both a texture information amount for said three-dimensional shape constituent element of said each object image information and texture continuity between said three-dimensional shape constituent elements, wherein said step of assigning texture information comprises the step of assigning texture information for said shape model from said object image information corresponding to each said three-dimensional shape constituent element so as to minimize an evaluation function that decreases in accordance with increase of said texture information amount and that decreases in accordance with improvement in the texture continuity between said three-dimensional shape constituent elements.

2. A texture information assignment method according to claim 1, wherein said evaluation function has said texture continuity represented as a function of difference in a shooting position and a shooting direction of respective said object image information between a three-dimensional shape constituent element of interest and a three-dimensional shape constituent element adjacent thereto.

3. The texture information assignment method according to claim 1, wherein said evaluation function has said texture continuity represented as a function that increases in accordance with increase of difference between a label number assigned to a three-dimensional shape constituent element of interest and a label number assigned to a three-dimensional shape constituent element adjacent to said three-dimensional shape constituent element of interest when said object image information is captured according to change in position and a label number corresponding to the change in position is assigned to each object image information.

4. The texture information assignment method according to claim 1, wherein said evaluation function has said texture continuity represented as a function that increases in accordance with increase of difference between a label number assigned to a three-dimensional shape constituent element of interest and a label number assigned to a three-dimensional shape constituent element adjacent to said three-dimensional shape constituent element of interest when said object image information is captured according to regular change in position and a label number is assigned to each object image information.

5. The texture information assignment method according to claim 1, wherein said evaluation function has said texture information amount represented as a function of an area of said three-dimensional shape constituent element projected on said each object image information each for said three-dimensional shape constituent element.

6. The texture information assignment method according to claim 1, wherein said evaluation function has said texture information amount represented as a function of a matching degree between a direction of a surface normal of said each three-dimensional shape constituent element and a direction in which said each object image information is captured each for said three-dimensional shape constituent element.

7. The texture information assignment method according to claim 1, wherein said evaluation function is represented as a linear combination of a total sum for all three-dimensional shape constituent elements of the difference between a label number assigned to the i-th (i: natural number) three-dimensional shape constituent element and a label number assigned to a three-dimensional shape constituent element adjacent to said i-th three-dimensional shape constituent element, and a total sum for all three-dimensional shape constituent elements of an area of said i-th three-dimensional shape constituent element projected on said object image information corresponding to the label number assigned to said i-th three-dimensional shape constituent element.

8. A texture information assignment method for a shape model comprising the steps of:

describing a shape of an object of interest as a shape model by a set of plurality of three-dimensional shape constituent elements;

when a plurality of object image information are captured according to change in position and a label number corresponding to change in position is assigned to said each object image information, relating correspondence between said three-dimensional shape constituent element and said label number so as to minimize an evaluation function that decreases in accordance with increase of a texture information amount for said each three-dimensional shape constituent element and that decreases in accordance with improvement in texture continuity of texture information respectively assigned to said each three-dimensional shape constituent element and a three-dimensional shape constituent element adjacent thereto; and assigning texture information to said three-dimensional shape constituent element by carrying out a weighted mean process according to an area of said three-dimensional shape constituent element projected on said each object image information on the basis of object image information corresponding to said related label number and the object image information corresponding to a predetermined number of label numbers including said related label number.

9. A texture information assignment method for a shape model comprising the steps of:

describing a shape of an object of interest as a shape model by a set of a plurality of three-dimensional shape constituent elements;

when a plurality of object image information are captured in accordance with regular change in position and a label number is assigned to each said object image information, relating correspondence between each said three-dimensional shape constituent element and said label number so as to minimize an evaluation function that decreases in accordance with increase of a texture information amount corresponding to said each three-dimensional shape constituent element, and that decreases in accordance with improvement in texture continuity of texture information respectively assigned to said each three-dimensional shape constituent element and a three-dimensional shape constituent element adjacent thereto; and assigning texture information to said three-dimensional shape constituent element by carrying out a weighted mean process according to an area of said three-dimensional shape constituent element projected on said each object image information on the basis of the object image information corresponding to said related label number and the object image information corresponding to a predetermined number of label numbers including said related label number.

10. A texture information assignment method for a shape model comprising the steps of:

capturing a plurality of object image information by shooting an object of interest from different viewpoints;

describing a shape of said object of interest as a shape model by a set of a plurality of three-dimensional shape constituent elements; and assigning, to each said three-dimensional shape constituent element, texture information obtained by carrying out a weighted mean process for a plurality of said object images information according to an area of said three-dimensional shape constituent element projected on said plurality of object image information respectively.

11. A medium storing a program for causing a computer to assign texture information to a shape model, said program comprising the steps of:

describing a shape of an object of interest as a shape model by a set of a plurality of three-dimensional shape constituent elements; and assigning texture information for said shape model to each said three-dimensional shape constituent element on the basis of a plurality of object image information captured by shooting said object of interest from different viewpoints, according to both a texture information amount for said three-dimensional shape constituent element of said each object image information and texture continuity between said three-dimensional shape constituent elements, wherein said step of assigning texture information comprises the step of assigning texture information for said shape model from said object image information corresponding to each said three-dimensional shape constituent element so as to minimize an evaluation function that decreases in accordance with increase of said texture information amount and that decreases in accordance with improvement in the texture continuity between said three-dimensional shape constituent elements.

12. The medium storing the texture information assignment program according to claim 11, wherein said evaluation function has said texture continuity represented as a function of difference in a shooting position and shooting direction of respective said object image information between a three-dimensional shape constituent element of interest and a three-dimensional shape constituent element adjacent thereto.

13. The medium storing the texture information assignment program according to claim 11, wherein said evaluation function has said texture continuity represented as a function that increases in accordance with increase of difference between a label number assigned to a three-dimensional shape constituent element of interest and a label number assigned to a three-dimensional shape constituent element adjacent to said three-dimensional shape constituent element of interest when said object image information is captured according to change in position and a label number corresponding to change in position is assigned to each object image information.

14. The medium storing the texture information assignment program according to claim 11, wherein said evaluation function has said texture continuity represented as a function that increases in accordance with increase in difference of a label number assigned to a three-dimensional shape constituent element of interest and a label number assigned to a three-dimensional shape constituent element adjacent to said three-dimensional shape constituent element of interest when said object image information is captured in accordance with regular change in position and a label number is assigned to each object image information.

15. The medium storing the texture information assignment program according to claim 11, wherein said evaluation function has said texture information amount represented as a function of an area of said three-dimensional shape constituent element projected on said each object image information each for said three-dimensional shape constituent element.

16. The medium storing the texture information assignment program according to claim 11, wherein said evaluation function has said texture information amount represented as a function of a matching degree between a direction of a surface normal of said each three-dimensional shape constituent element and a direction in which said each object image information is captured each for said three-dimensional shape constituent element.

17. The medium storing the texture information assignment program according to claim 11, wherein said evaluation function is represented as a linear combination of a total sum for all three-dimensional shape constituent elements of the difference between a label number assigned to the i-th (i: natural number) three-dimensional shape constituent element and a label number assigned to a three-dimensional shape constituent element adjacent to said i-th three-dimensional shape constituent element, and a total sum for all three-dimensional shape constituent elements of an area of said i-th three-dimensional shape constituent element projected on said object image information corresponding to the label number assigned to said i-th three-dimensional shape constituent element.

18. A medium storing a program for causing a computer to assign texture information to a shape model, said program comprising the steps of:

describing a shape of an object of interest as a shape model by a set of a plurality of three-dimensional shape constituent elements;

when a plurality of object image information are captured according to change in position and a label number corresponding to change in position is assigned to said each object image information, relating correspondence between said each three-dimensional shape constituent element and said label number so as to minimize an evaluation function that decreases in accordance with increase of a texture information amount for said each three-dimensional shape constituent element and that decreases in accordance with improvement in texture continuity of texture information assigned to said each three-dimensional shape constituent element and a three-dimensional shape constituent element adjacent thereto; and assigning texture information to said three-dimensional shape constituent element by carrying out a weighted mean process according to an area of said three-dimensional shape constituent element projected on said each object image information on the basis of object image information corresponding to said related label number and the object image information corresponding to a predetermined number of label numbers including said related label number.

19. A medium storing a program for causing a computer to assign texture information to a shape model, said program comprising the steps of:
describing a shape of an object of interest as a shape model by a set of a plurality of three-dimensional shape constituent elements;
when a plurality of object image information is captured in accordance with regular change in position and a label number is assigned to said each object image information, relating correspondence between each said three-dimensional shape constituent element and said label number so as to minimize an evaluation function that decreases in accordance with increase of a texture information amount corresponding to said each three-dimensional shape constituent element, and that decreases in accordance with improvement in texture continuity of texture information respectively assigned to said each three-dimensional three-dimensional shape constituent element and a three-dimensional shape constituent element adjacent thereto; and
assigning texture information to said three-dimensional shape constituent element by carrying out a weighted mean process according to an area of said three-dimensional shape constituent element projected on said each object image information on the basis of the object image information corresponding to said related label number and the object image information corresponding to a predetermined number of label numbers including said related label number.

20. A medium storing a program for causing a computer to assign texture information to a shape model, said program comprising the steps of:
capturing a plurality of object image information by shooting an object of interest from different viewpoints;
describing a shape of said object of interest as a shape model by a set of a plurality of three-dimensional shape constituent elements; and
assigning, to each said three-dimensional shape constituent element, texture information obtained by carrying out a weighted mean process for a plurality of said object image information according to an area of said three-dimensional shape constituent element projected on said plurality of object images information respectively.

21. A texture information assignment apparatus for a shape model, comprising:
means for describing a shape of an object of interest as a shape model by a set of plurality of three-dimensional shape constituent elements; and
means for assigning texture information for said shape model each for said three-dimensional shape constituent element on the basis of a plurality of object image information captured by shooting said object of image from different viewpoints, according to both a texture information amount for said three-dimensional shape constituent element of said each object image information and texture continuity between said three dimensional shape constituent elements, wherein
said means for assigning texture information assigns texture information for said shape model from said object image information corresponding to each said three-dimensional shape constituent element so as to minimize an evaluation function that decreases in accordance with increase of said texture information amount and that decreases in accordance with improvement in the texture continuity between said three-dimensional shape constituent elements.

22. The texture information assignment apparatus according to claim 21, wherein said evaluation function has said texture continuity represented as a function of difference in a shooting position and shooting direction of respective said object image information between a three-dimensional shape constituent element of interest and a three-dimensional shape constituent element adjacent thereto.

23. The texture information assignment apparatus according to claim 21, wherein said evaluation function has said texture continuity represented as a function that increases in accordance with increase of difference between a label number assigned to a three-dimensional shape constituent element of interest and a label number assigned to a three-dimensional shape constituent element adjacent to said three-dimensional shape constituent element of interest when said object image information is captured according to change in position and a label number corresponding to the change in position is assigned to each object image information.

24. The texture information assignment apparatus according to claim 21, wherein said evaluation function has said texture continuity represented as a function that increases in accordance with increase of difference between a label number assigned to a three-dimensional shape constituent element of interest and a label number assigned to a three-dimensional shape constituent element adjacent to said three-dimensional shape constituent element of interest when said object image information is captured according to regular change in position and a label number is assigned to each object image information.

25. The texture information assignment apparatus according to claim 21, wherein said evaluation function has texture information amount represented as a function of an area of said three-dimensional shape constituent element projected on said each object image information each for said three-dimensional shape constituent element.

26. The texture information assignment apparatus according to claim 21, wherein said evaluation function has said texture information amount represented as a function of a matching degree between a direction of a surface normal of said each three-dimensional shape constituent element and a direction in which said each object image information is captured each for said three-dimensional shape constituent element.

27. The texture information assignment apparatus according to claim 21, wherein said evaluation function is represented as a linear combination of a total sum for all three-dimensional shape constituent elements of the difference between a label number assigned to the i-th (i: natural number) three-dimensional shape constituent element and a label number assigned to a three-dimensional shape constituent element adjacent to said i-th three-dimensional shape constituent element, and a total sum for all three-dimensional shape constituent elements of an area of said i-th three-dimensional shape constituent element projected on said object image information corresponding to the label number assigned to said i-th three-dimensional shape constituent element.

28. A texture information assignment apparatus for a shape model, comprising:
means for describing a shape of an object of interest as a shape model by a set of a plurality of three-dimensional shape constituent elements;

means for relating, when a plurality of object images information are captured according to change in position and a label number corresponding to change in position is assigned to said each object image information, correspondence between said three-dimensional shape constituent element and said label number so as to minimize an evaluation function that decreases in accordance with increase of a texture information amount for said each three-dimensional shape constituent element and that decreases in accordance with improvement in texture continuity of texture information respectively assigned to said each three-dimensional shape constituent element and a three-dimensional shape constituent element adjacent thereto; and means for assigning texture information to said three-dimensional shape constituent element by carrying out a weighted means process according to an area of said three-dimensional shape constituent element projected on said each object image information on the basis of the object image information corresponding to said related label number and the object image information corresponding to a predetermined number of label numbers including said related label number.

29. A texture information assignment apparatus for a shape model, comprising:

means for describing a shape of an object of interest as a shape model by a set of a plurality of three-dimensional shape constituent elements;

means for relating, when a plurality of object image information are captured in accordance with regular change in position and a label number is assigned to each said object image information, correspondence between each said three-dimensional shape constituent element and said label number so as to minimize an evaluation function that decreases in accordance with increase of a texture information amount corresponding to said each three-dimensional shape constituent element, and that decreases in accordance with improvement in texture continuity of texture information respectively assigned to said each three-dimensional shape constituent element and a three-dimensional shape constituent element adjacent thereto; and means for assigning texture information to said three-dimensional shape constituent element by carrying out a weighted means process according to an area of said three-dimensional shape constituent element projected on said each object image information on the basis of object image information corresponding to said related label number and object image information corresponding to a predetermined number of label numbers including said related label number.

30. The texture information assignment apparatus for a shape model comprising:

means for capturing a plurality of object image information by shooting an object of interest from different viewpoints;

means for describing a shape of said object of interest as a shape model by a set of a plurality of three-dimensional shape constituent elements; and means for assigning, to each said three-dimensional shape constituent element, texture information obtained by carrying out a weighted mean process for a plurality of said object image information according to an area of said three-dimensional shape constituent element projected on said plurality of object image information respectively.

* * * * *

UNITED STATES PATENT AND TRADEMARK OFFICE
CERTIFICATE OF CORRECTION

PATENT NO.     : 6,847,371 B2
DATED          : January 25, 2005
INVENTOR(S)    : Yukinori Matsumoto et al.

It is certified that error appears in the above-identified patent and that said Letters Patent is hereby corrected as shown below:

Title page,
Item [62], Related U.S. Application Data, change "Division of application No. 09/254,127, filed as application No. PCT/JP97/02997 on Aug. 28, 1997." to -- Division of application No. 09/254,127, filed November 1, 1999, filed as application No. PCT/JP97/02997 on Aug. 28, 1997. --.

Signed and Sealed this

Sixth Day of September, 2005

JON W. DUDAS
*Director of the United States Patent and Trademark Office*